(12) United States Patent
Liu et al.

(10) Patent No.: US 12,342,761 B2
(45) Date of Patent: * Jul. 1, 2025

(54) OUTDOOR MOVING DEVICE

(71) Applicant: Nanjing Chervon Industry Co., Ltd., Nanjing (CN)

(72) Inventors: Qian Liu, Nanjing (CN); Toshinari Yamaoka, Nanjing (CN); Zhen Wang, Nanjing (CN); Fangjie Nie, Nanjing (CN); Dezhong Yang, Nanjing (CN); Yangzi Liu, Nanjing (CN); Li Li, Nanjing (CN); Ju Li, Nanjing (CN); Changhai Lu, Nanjing (CN)

(73) Assignee: Nanjing Chervon Industry Co., Ltd., Nanjing (CN)

( * ) Notice: Subject to any disclaimer, the term of this patent is extended or adjusted under 35 U.S.C. 154(b) by 179 days.

This patent is subject to a terminal disclaimer.

(21) Appl. No.: 18/185,502

(22) Filed: Mar. 17, 2023

(65) Prior Publication Data

US 2023/0225252 A1 Jul. 20, 2023

Related U.S. Application Data

(63) Continuation-in-part of application No. 17/825,298, filed on May 26, 2022, now Pat. No. 11,653,598, (Continued)

(30) Foreign Application Priority Data

Dec. 28, 2017 (CN) .......................... 201711457168.5
Aug. 6, 2018 (CN) .......................... 201810885961.3
Jun. 25, 2021 (CN) .......................... 202110714441.8

(51) Int. Cl.
*A01D 69/02* (2006.01)
*A01D 34/64* (2006.01)
(Continued)

(52) U.S. Cl.
CPC ............. *A01D 69/02* (2013.01); *A01D 34/64* (2013.01); *A01D 34/78* (2013.01); *A01D 2101/00* (2013.01)

(58) Field of Classification Search
CPC ........ A01D 69/02; A01D 34/64; A01D 34/78; A01D 2101/00
(Continued)

(56) References Cited

U.S. PATENT DOCUMENTS 3,732,671 A    5/1973  Allen
3,823,367 A    7/1974  Kaye
(Continued)

FOREIGN PATENT DOCUMENTS

CN    102388720 A    3/2012
CN    102422750 A    4/2012
(Continued)

OTHER PUBLICATIONS

Non-final Office Action from U.S. Appl. No. 18/191,590, dated Jun. 14, 2023, 11 pp.
(Continued)

*Primary Examiner* — Hau V Phan
(74) *Attorney, Agent, or Firm* — Greenberg Traurig, LLP

(57) ABSTRACT

An outdoor moving device includes a main body, a first energy storage device, a second energy storage device, and a connection assembly. The first energy storage device is capable of supplying power to the outdoor moving device and includes at least one first energy storage unit. The second energy storage device is capable of supplying power to the outdoor moving device and includes at least one second energy storage unit. The connection assembly is used for mounting the second energy storage device to the main body. The first energy storage device is detachably mounted to the main body, the first energy storage device is detach-
(Continued)

able from the main body to supply power to another power tool, the first energy storage unit includes a first positive electrode made of a first material, and the second energy storage unit includes a second positive electrode made of a second material.

20 Claims, 31 Drawing Sheets

Related U.S. Application Data which is a continuation of application No. 16/909,549, filed on Jun. 23, 2020, now Pat. No. 11,696,531, which is a continuation of application No. PCT/CN2018/123856, filed on Dec. 26, 2018, application No. 18/185,502, filed on Mar. 17, 2023 is a continuation of application No. 18/170,817, filed on Feb. 17, 2023, now Pat. No. 11,917,945, which is a continuation of application No. PCT/CN2022/098357, filed on Jun. 13, 2022.

(51) Int. Cl.
*A01D 34/78* (2006.01)
*A01D 101/00* (2006.01)

(58) Field of Classification Search
USPC .......................................................... 56/11.9
See application file for complete search history.

(56) References Cited

U.S. PATENT DOCUMENTS

| | | | |
|---|---|---|---|
| 3,850,259 A | 11/1974 | Ikeda | |
| 4,876,846 A | 10/1989 | Torras | |
| 5,540,037 A | 7/1996 | Lamb et al. | |
| 5,727,372 A | 3/1998 | Kanitz | |
| 5,794,422 A | 8/1998 | Reimers | |
| 5,809,756 A | 9/1998 | Scag | |
| 5,934,053 A | 8/1999 | Fillman | |
| 5,946,894 A | 9/1999 | Eavenson | |
| 6,082,082 A | 7/2000 | Hunter | |
| 6,082,084 A | 7/2000 | Reimers | |
| 6,490,849 B1 | 12/2002 | Scag | |
| 6,571,542 B1* | 6/2003 | Fillman | B60L 50/66 56/10.2 A |
| 6,591,593 B1 | 7/2003 | Brandon | |
| 6,688,089 B2 | 2/2004 | Velke | |
| 6,826,895 B2 | 12/2004 | Lida et al. | |
| 6,856,895 B2 | 2/2005 | Hashida | |
| 7,392,869 B2 | 7/2008 | Carlson | |
| 7,578,116 B1 | 8/2009 | Howell | |
| 7,594,377 B1 | 9/2009 | Jansen | |
| 7,596,636 B2 | 9/2009 | Gormley | |
| 7,610,975 B1 | 11/2009 | Gust | |
| 7,610,986 B2 | 11/2009 | Ohashi | |
| 7,661,486 B2 | 2/2010 | Turner | |
| 7,673,712 B2 | 3/2010 | Iida | |
| 7,686,108 B2 | 3/2010 | Piontek | |
| 7,712,294 B2 | 5/2010 | Wright | |
| 7,721,517 B2 | 5/2010 | Hunt | |
| 7,731,398 B2 | 6/2010 | Probasco | |
| 7,735,592 B2 | 6/2010 | Bellot | |
| 8,191,342 B2 | 6/2012 | Ishii | |
| 8,429,885 B2 | 4/2013 | Rosa | |
| 8,572,939 B2 | 11/2013 | Koike | |
| 8,653,786 B2 | 2/2014 | Baetica | |
| 8,794,660 B1 | 8/2014 | Stover | |
| 9,010,077 B2 | 4/2015 | Elder | |
| 9,210,839 B2 | 12/2015 | Schygge | |
| 9,226,444 B2 | 1/2016 | Schygge | |
| 9,282,695 B2 | 3/2016 | Goto | |
| 9,296,306 B2 | 3/2016 | Schygge | |
| 9,357,695 B2 | 6/2016 | Higashikawa | |
| 9,535,695 B2 | 1/2017 | Mylius | |
| 9,686,909 B2 | 6/2017 | Schygge | |
| 9,699,965 B2 | 7/2017 | Schygge | |
| 9,705,332 B2* | 7/2017 | Oudalov | H02J 3/32 |
| 9,711,767 B2 | 7/2017 | Juenger | |
| 9,867,331 B1 | 1/2018 | Siudyla | |
| 9,949,436 B2 | 4/2018 | Ito | |
| 10,029,551 B2 | 7/2018 | Ito | |
| 10,093,169 B1 | 10/2018 | Keller | |
| 10,098,278 B2 | 10/2018 | Velderman | |
| 10,868,435 B2 | 12/2020 | Hoppel | |
| 10,980,173 B2 | 4/2021 | Becke et al. | |
| 11,081,893 B2 | 8/2021 | Chow | |
| 11,653,598 B2 | 5/2023 | Liu | |
| 11,696,531 B2 | 7/2023 | Liu | |
| 11,839,177 B2* | 12/2023 | Liu | A01D 34/64 |
| 11,839,178 B2* | 12/2023 | Liu | A01D 34/64 |
| 11,910,752 B2* | 2/2024 | Liu | A01D 34/64 |
| 11,917,945 B2* | 3/2024 | Yang | B60L 50/64 |
| 2003/0029149 A1 | 2/2003 | Fillman | |
| 2004/0050026 A1 | 3/2004 | Heal et al. | |
| 2006/0058897 A1 | 3/2006 | Senda | |
| 2006/0059879 A1 | 3/2006 | Edmond | |
| 2006/0059880 A1 | 3/2006 | Angott | |
| 2006/0091858 A1 | 5/2006 | Johnson | |
| 2007/0125054 A1 | 6/2007 | Dong et al. | |
| 2007/0125056 A1 | 6/2007 | Edmond | |
| 2008/0034722 A1 | 2/2008 | Wright | |
| 2008/0264026 A1 | 10/2008 | Ishii et al. | |
| 2009/0260901 A1 | 10/2009 | Ishii | |
| 2011/0289896 A1 | 12/2011 | Sasahara | |
| 2012/0186887 A1 | 7/2012 | Moriguchi | |
| 2012/0235642 A1* | 9/2012 | Mao | B60L 3/04 320/112 |
| 2012/0238403 A1 | 9/2012 | Koike | |
| 2013/0014966 A1 | 1/2013 | Tozawa | |
| 2013/0097984 A1 | 4/2013 | Elder | |
| 2013/0239533 A1 | 9/2013 | Juenger | |
| 2014/0015451 A1 | 1/2014 | Funabashi et al. | |
| 2014/0137528 A1 | 5/2014 | Schygge | |
| 2014/0144117 A1 | 5/2014 | Schygge | |
| 2014/0144177 A1 | 5/2014 | Stallman | |
| 2014/0165524 A1 | 6/2014 | Schygge | |
| 2014/0244090 A1 | 8/2014 | Schygge | |
| 2014/0259804 A1 | 9/2014 | Eavenson, Sr. | |
| 2015/0240773 A1 | 8/2015 | Koenen et al. | |
| 2015/0359174 A1 | 12/2015 | Ito | |
| 2015/0366130 A1 | 12/2015 | Bergström | |
| 2016/0014954 A1 | 1/2016 | Dwyer | |
| 2016/0183451 A1 | 6/2016 | Conrad | |
| 2016/0198630 A1 | 7/2016 | Skoog | |
| 2016/0242356 A1 | 8/2016 | Verderman et al. | |
| 2016/0338266 A1 | 11/2016 | Yamaoka | |
| 2017/0013780 A1 | 1/2017 | Ito | |
| 2017/0055443 A1 | 3/2017 | Fujii | |
| 2017/0136864 A1 | 5/2017 | Ito | |
| 2017/0196164 A1* | 7/2017 | Bryant | A01D 34/008 |
| 2017/0263914 A1 | 9/2017 | Ito | |
| 2017/0265381 A1 | 9/2017 | Kuriyagawa | |
| 2017/0335818 A1 | 11/2017 | Dwyer | |
| 2017/0366817 A1 | 12/2017 | Hashimoto | |
| 2019/0075724 A1 | 3/2019 | Becke et al. | |
| 2019/0160972 A1 | 5/2019 | Zeiler | |
| 2020/0170184 A1 | 6/2020 | Velderman | |
| 2020/0267903 A1 | 8/2020 | Gao | |
| 2020/0315095 A1 | 10/2020 | Liu et al. | |
| 2022/0408648 A1 | 12/2022 | Yang | |
| 2022/0408649 A1 | 12/2022 | Yang | |
| 2022/0410762 A1 | 12/2022 | Yang | |
| 2023/0202314 A1 | 6/2023 | Yang | |

FOREIGN PATENT DOCUMENTS

| | | |
|---|---|---|
| CN | 103053265 B | 4/2013 |
| CN | 103125212 A | 6/2013 |
| CN | 102422750 B | 7/2013 |
| CN | 103518487 A | 1/2014 |
| CN | 203423971 U | 2/2014 |

(56) References Cited

FOREIGN PATENT DOCUMENTS

| | | |
|---|---|---|
| CN | 103813918 A | 5/2014 |
| CN | 103970039 A | 8/2014 |
| CN | 105850340 A | 8/2016 |
| CN | 106471990 A | 3/2017 |
| CN | 206260323 U | 6/2017 |
| CN | 107205337 A | 9/2017 |
| CN | 109557910 A | 4/2019 |
| CN | 209710730 U | 12/2019 |
| DE | 212015000289 U1 | 7/2017 |
| EP | 0262285 B1 | 8/1991 |
| EP | 2110295 B1 | 2/2012 |
| EP | 2543244 A1 | 1/2013 |
| EP | 2724604 A1 | 4/2014 |
| EP | 2793346 | 10/2014 |
| EP | 2534938 B1 | 10/2015 |
| EP | 3219188 | 9/2017 |
| EP | 3079182 B1 | 9/2018 |
| FR | 2252802 B1 | 10/1976 |
| WO | 9520868 W | 8/1995 |
| WO | 2013009325 A1 | 1/2013 |
| WO | 2013/102023 A1 | 7/2013 |
| WO | 2016074239 A1 | 5/2016 |
| WO | 2016094475 A2 | 6/2016 |
| WO | 2016109860 A2 | 7/2016 |
| WO | 2017013602 A1 | 1/2017 |
| WO | 2017145093 A1 | 8/2017 |
| WO | 2017173944 A1 | 10/2017 |
| WO | 2018031719 A1 | 2/2018 |
| WO | 2018102338 A1 | 6/2018 |
| WO | 2020/147841 A1 | 7/2020 |

OTHER PUBLICATIONS

Non-final Office Action from U.S. Appl. No. 18/191,698, dated Jun. 14, 2023, 13 pp.
Non-final Office Action from U.S. Appl. No. 18/191,776, dated Jun. 15, 2023, 11 pp.
Non-final Office Action from U.S. Appl. No. 18/170,817, dated Jun. 16, 2023, 13 pp.
Communication pursuant to Rule 114(2) EPC for EP application No. 22151071.2, dated May 12, 2023, 2 pp.
Office Action from Canadian application No. 3,193,671, dated Jun. 28, 2024, 7 pp.
ISA/CN, International Search Report issued on PCT application No. CN2018/123856, dated Mar. 22, 2019, 4 pages.
ISA/CN, English translation of International Search Report issued on PCT application No. CN2018/123856, dated Mar. 22, 2019, 2 pages.
ISA/CN, Written Opinion issued on PCT application No. CN2018/123856, dated Mar. 22, 2019, 3 pages.
ISA/CN, English translation of Written Opinion issued on PCT application No. CN2018/123856, dated Mar. 22, 2019, 4 pages.
EPO, extended European Search Report issued on European patent application No. 18894932.5, dated Dec. 3, 2020, 3 pages.
EPO, extended European Search Report issued on European patent publication No. 3827659A1, dated Aug. 24, 2021, 8 pages.
CIPO, office action issued on Canadian patent application No. 3,087,294, dated Sep. 26, 2022, 3 pages.
USPTO, non-final office action issued on U.S. Appl. No. 17/825,298, dated Aug. 5, 2022, 13 pages.
USPTO, non-final office action issued on U.S. Appl. No. 16/909,549, dated Jul. 8, 2022, 14 pages.
ISA/CN, Int. Search Report issued on PCT application No. PCT/CN2022/098357, dated Sep. 21, 2022, 5 pages.
ISA/CN, English translation of Int. Search Report issued on PCT application No. PCT/CN2022/098357, dated Sep. 21, 2022, 4 pages.
ISA/CN, Written Opinion issued on PCT application No. PCT/CN2022/098357, dated Sep. 21, 2022, 3 pages.
ISA/CN, English translation of Written Opinion issued on PCT application No. PCT/CN2022/098357, dated Sep. 21, 2022, 3 pages.
EPO, partial European search report issued on European patent application No. 22178263.4, dated Nov. 25, 2022, 11 pages.
Office Action from Canadian application number 3,165,100, dated Sep. 21, 2023, 10 pp.
Office Action from Canadian application No. 3,165,100, dated Apr. 18, 2024, 9 pp.
Office Action from EP application No. 22151071.2, dated Sep. 13, 2023, 7 pp.
Non-final office action from U.S. Appl. No. 18/409,050, dated Dec. 13, 2024, 10 pp.
Information About the Result of Oral Proceedings held on Oct. 16, 2024 of EP application No. 18894932.5, dated Nov. 14, 2024, 19 pp.
Non-final Office Action from U.S. Appl. No. 17/835,527, dated May 5, 2025, 7 pp.

* cited by examiner

OUTDOOR MOVING DEVICE

RELATED APPLICATION INFORMATION

This application is a continuation-in-part of U.S. application Ser. No. 17/825,298, filed on May 26, 2022, which application is a continuation of U.S. application Ser. No. 16/909,549, filed on Jun. 23, 2020, which application is a continuation of International Application Number PCT/CN2018/123856, filed on Dec. 26, 2018, through which this application also claims the benefit under 35 U.S.C. § 119(a) of Chinese Patent Application No. CN 201711457168.5, filed on Dec. 28, 2017, and Chinese Patent Application No. CN 201810885961.3, filed on Aug. 6, 2018, which applications are incorporated herein by reference in their entirety.

This application is also a continuation of U.S. application Ser. No. 18/170,817, filed on Feb. 17, 2023, which application is a continuation of International Application Number PCT/CN2022/098357, filed on Jun. 13, 2022, through which this application also claims the benefit under 35 U.S.C. § 119(a) of Chinese Patent Application No. 202110714441.8, filed on Jun. 25, 2021, which applications are incorporated herein by reference in their entirety.

BACKGROUND

Outdoor moving devices are used for working outdoors, such as a utility vehicle, an agricultural machinery vehicle, a farmer's vehicle, a dune buggy, a golf cart, and a riding mower. When working outdoors, these devices need to carry some energy storage devices. The energy storage devices of the outdoor moving devices may be basically divided into two types: energy storage devices using gasoline, diesel, and other fuels, and electrical energy storage devices. The electrical energy storage devices are more environmentally friendly and save more energy than the fuels and thus are more attractive to users and manufacturers in recent years.

However, the electrical energy storage device of an outdoor moving device generally uses a built-in and fixedly mounted stationary battery as an energy storage device. Such energy storage device limits the maximum energy storage capacity of the outdoor moving device. Especially for a professional user, the outdoor moving device has too single a function to satisfy the requirements of the professional user for working outdoors for a relatively long time and for various working contents.

For example, as a garden tool, the riding mower is widely applied to the fields including lawn and vegetation trimming. The professional user needs to trim lawns, branches, and weeds near shrubs and blow fallen leaves during working. The energy storage device carried by the riding mower cannot satisfy the electrical energy and operation requirements of the user who deals with too many affairs. However, if the riding mower is only provided with some detachable batteries that are relatively large in volume and relatively high in cost, the stored energy cannot satisfy the requirement of a large outdoor moving device working outdoors for a relatively long time.

It is to be noted that the content described in the background of the present application does not represent the related art completely.

SUMMARY

An outdoor moving device includes a main body; a moving wheel set including moving wheels supporting the main body; a first energy storage device configured to be capable of supplying power to the outdoor moving device and including at least one first energy storage unit; a second energy storage device configured to be capable of supplying power to the outdoor moving device and including at least one second energy storage unit; and a connection assembly for mounting the second energy storage device to the main body. The first energy storage device is detachably mounted to the main body, the first energy storage device is further configured to be detachable from the main body to supply power to another power tool, the first energy storage unit includes a first positive electrode made of a first material, and the second energy storage unit includes a second positive electrode made of a second material.

In an example, the outdoor moving device further includes a moving electric motor for driving the moving wheel set to rotate, where the first energy storage device is configured to be capable of supplying power to the moving electric motor, and the second energy storage device is also configured to be capable of supplying power to the moving electric motor.

In an example, total energy of the second energy storage device is greater than total energy of the first energy storage device.

In an example, the total energy of the second energy storage device is greater than or equal to 1 kWh and less than or equal to 30 kWh.

In an example, the first energy storage device includes at least one battery pack detachably mounted to the main body, where the battery pack includes a battery pack housing and multiple first energy storage units disposed in the battery pack housing.

In an example, an energy density of the second energy storage unit is different from an energy density of the first energy storage unit.

In an example, the outdoor moving device further includes an electrical connection assembly for electrically connecting the second energy storage device to the moving electric motor, where the connection assembly and the electrical connection assembly are separated from each other.

In an example, the outdoor moving device further includes a functional assembly for implementing a tool function and a drive electric motor for driving the functional assembly, where the second energy storage device is further configured to be capable of supplying power to the drive electric motor.

In an example, the outdoor moving device further includes a functional assembly for implementing a tool function and a drive electric motor for driving the functional assembly, where the second energy storage device is further configured to be capable of supplying power to the drive electric motor, and the first energy storage device is configured to not supply power to the drive electric motor.

In an example, a ratio of total energy of the second energy storage device to total energy of the first energy storage device is greater than or equal to 1 and less than or equal to 50.

In an example, a ratio of total energy of the second energy storage device to total energy of the first energy storage device is greater than or equal to 2 and less than or equal to 20.

In an example, the second energy storage device is fixedly mounted to the main body.

In an example, a ratio of a maximum lifetime of the second energy storage device when the outdoor moving device is in a load-free operation state to a maximum lifetime of the first energy storage device when the outdoor moving device is in the load-free operation state is greater than or equal to 1 and less than or equal to 50.

In an example, a ratio of an energy density of the second energy storage unit to an energy density of the first energy storage unit is greater than or equal to 0.3 and less than or equal to 1.

In an example, the second energy storage device is detachably mounted to the main body through an auxiliary tool.

An outdoor moving device includes a main body; a moving wheel set including moving wheels supporting the main body; a first energy storage device configured to be capable of supplying power to the outdoor moving device and including at least one first energy storage unit; a second energy storage device configured to be capable of supplying power to the outdoor moving device and including at least one second energy storage unit; and a connection assembly for mounting the second energy storage device to the main body. The first energy storage device is detachably mounted to the main body, the first energy storage device is further configured to be detachable from the main body to supply power to another power tool, and total energy of the second energy storage device is greater than total energy of the first energy storage device.

A riding mower includes a housing; a seat mounted to the housing; a moving wheel set including moving wheels supporting the housing; a moving electric motor for driving the moving wheels to rotate; a mowing assembly including a mowing element for mowing grass; a drive electric motor for driving the mowing assembly to mow the grass; a first energy storage device configured to be capable of supplying power to the moving electric motor and including at least one first energy storage unit; and a second energy storage device configured to be capable of supplying power to the moving electric motor and including at least one second energy storage unit. The second energy storage device is mounted to the housing, the first energy storage device is detachably mounted to the housing, the first energy storage device is further configured to be detachable from the housing to supply power to another power tool, the first energy storage unit includes a first positive electrode made of a first material, and the second energy storage unit includes a second positive electrode made of a second material.

An outdoor moving vehicle includes a main body; a moving wheel set including front moving wheels and rear moving wheels that support the main body; a moving electric motor for driving the moving wheel set to rotate; a first energy storage device configured to be capable of supplying power to the moving electric motor and including at least one first energy storage unit; a second energy storage device configured to be capable of supplying power to the moving electric motor and including at least one second energy storage unit; and a connection assembly for mounting the second energy storage device to the main body. The first energy storage device is detachably connected to the main body, total energy of the second energy storage device is greater than or equal to 1 kWh and less than or equal to 30 kWh, and a distance between the second energy storage device and an axle of the rear moving wheels in a front and rear direction is greater than or equal to 0 cm and less than or equal to 100 cm.

In an example, the first energy storage device is disposed on an upper side of the second energy storage device.

In an example, the first energy storage device is disposed on a front side of the second energy storage device.

In an example, the first energy storage device is disposed on a rear side of the second energy storage device.

In an example, a groove is surrounded by the second energy storage device, and the first energy storage device is at least partially disposed in the groove.

In an example, a distance between a center of gravity of the second energy storage device and the axle of the rear moving wheels in an up and down direction is greater than or equal to 0 cm and less than or equal to 50 cm.

In an example, a distance between the second energy storage device and the first energy storage device in the front and rear direction is greater than or equal to 0 cm and less than or equal to 200 cm.

In an example, an energy density of the second energy storage unit is different from an energy density of the first energy storage unit.

In an example, the outdoor moving device further includes a functional assembly for implementing a tool function and a drive electric motor for driving the functional assembly, where the second energy storage device is further configured to be capable of supplying power to the drive electric motor.

An outdoor moving vehicle includes a main body; a moving wheel set including front moving wheels and rear moving wheels that support the main body; a moving electric motor for driving the moving wheel set to rotate; a first energy storage device configured to be capable of supplying power to the moving electric motor and including at least one first energy storage unit; a second energy storage device configured to be capable of supplying power to the moving electric motor and including at least one second energy storage unit; and a connection assembly for mounting the second energy storage device to the main body. The first energy storage device is detachably connected to the main body, total energy of the second energy storage device is greater than or equal to 1 kWh and less than or equal to 30 kWh, and a distance between the second energy storage device and an axle of the front moving wheels in a front and rear direction is greater than or equal to 0 cm and less than or equal to 100 cm.

An outdoor moving device includes a main body; a moving wheel set including moving wheels supporting the main body; a first energy storage device configured to be capable of supplying power to the outdoor moving device and including at least one first energy storage unit; a second energy storage device configured to be capable of supplying power to the outdoor moving device and including at least one second energy storage unit; and a connection assembly for mounting the second energy storage device to the main body. The first energy storage device is detachably connected to the main body, total energy of the second energy storage device is greater than or equal to 1 kWh and less than or equal to 30 kWh, and the first energy storage device is disposed on an upper side of the second energy storage device.

An outdoor moving device includes a main body; a moving wheel set including moving wheels supporting the main body; a first energy storage device configured to be capable of supplying power to the outdoor moving device and including at least one first energy storage unit; a second energy storage device configured to be capable of supplying power to the outdoor moving device and including at least one second energy storage unit; and a connection assembly for mounting the second energy storage device to the main body. The first energy storage device is detachably connected to the main body, total energy of the second energy storage device is greater than or equal to 1 kWh and less than or equal to 30 kWh, and the first energy storage device is disposed on a front side of the second energy storage device.

An outdoor moving vehicle includes a main body; a moving wheel set including front moving wheels and rear moving wheels that support the main body; a moving electric motor for driving the moving wheel set to rotate; a first energy storage device configured to be capable of supplying power to the moving electric motor and including at least one first energy storage unit; a second energy storage device configured to be capable of supplying power to the moving electric motor and including at least one second energy storage unit; and a connection assembly for mounting the second energy storage device to the main body. The first energy storage device is detachably connected to the main body, the first energy storage unit includes a first positive electrode made of a first material, the second energy storage unit includes a second positive electrode made of a second material, and a distance between the second energy storage device and an axle of the rear moving wheels in a front and rear direction is greater than or equal to 0 cm and less than or equal to 100 cm.

An outdoor moving vehicle includes a main body; a moving wheel set including front moving wheels and rear moving wheels that support the main body; a moving electric motor for driving the moving wheel set to rotate; a first energy storage device configured to be capable of supplying power to the moving electric motor and including at least one first energy storage unit; a second energy storage device configured to be capable of supplying power to the moving electric motor and including at least one second energy storage unit; and a connection assembly for mounting the second energy storage device to the main body. The first energy storage device is detachably connected to the main body, the first energy storage unit includes a first positive electrode made of a first material, the second energy storage unit includes a second positive electrode made of a second material, and a distance between the second energy storage device and an axle of the front moving wheels in a front and rear direction is greater than or equal to 0 cm and less than or equal to 100 cm.

An outdoor moving device includes a main body; a moving wheel set including moving wheels supporting the main body; a first energy storage device configured to be capable of supplying power to the outdoor moving device and including at least one first energy storage unit, where the first energy storage device is detachably mounted to the main body, and the first energy storage device is further configured to be detachable from the main body to supply power to another power tool; a second energy storage device configured to be capable of supplying power to the outdoor moving device and including at least one second energy storage unit, where total energy of the second energy storage device is greater than total energy of the first energy storage device; a charging unit connected to the second energy storage device and the first energy storage device; and a controller for controlling the charging unit such that the second energy storage device charges the first energy storage device.

In an example, the outdoor moving device further includes a charging interface for a connection to an external power supply, where the charging unit is electrically connected to the charging interface, and the controller is configured to control the charging unit such that the external power supply charges the second energy storage device through the charging interface.

In an example, the controller is configured to control the charging unit such that the external power supply charges the first energy storage device through the charging interface.

In an example, the outdoor moving device further includes a moving electric motor for driving the moving wheel set to rotate and a discharging unit, where the discharging unit is electrically connected to the second energy storage device and the moving electric motor so that the second energy storage device supplies power to the moving electric motor.

In an example, the discharging unit is electrically connected to the first energy storage device and the moving electric motor so that the first energy storage device supplies power to the moving electric motor.

In an example, the outdoor moving device further includes an electrical energy output port for outputting power to an external device, where the electrical energy output port is electrically connected to the first energy storage device or the second energy storage device.

In an example, the outdoor moving device further includes a functional assembly for implementing a tool function and a drive electric motor for driving the functional assembly, where the second energy storage device is further configured to be capable of supplying power to the drive electric motor.

In an example, the second energy storage device is fixedly connected to the main body.

A riding mower includes a main body; a seat mounted to the main body; a moving wheel set including moving wheels supporting the main body; a moving electric motor for driving the moving wheels to rotate; a mowing assembly including a mowing element for mowing grass; a drive electric motor for driving the mowing assembly to mow the grass; a first energy storage device configured to be capable of supplying power to the moving electric motor and including at least one first energy storage unit, where the first energy storage device is detachably mounted to the main body, and the first energy storage device is further configured to be detachable from the main body to supply power to another power tool; a second energy storage device configured to be capable of supplying power to the moving electric motor and including at least one second energy storage unit, where total energy of the second energy storage device is greater than total energy of the first energy storage device; a charging unit connected to the second energy storage device and the first energy storage device; and a controller for controlling the charging unit such that the second energy storage device supplies power to the first energy storage device.

An outdoor moving device includes a main body; a moving wheel set including moving wheels supporting the main body; a first energy storage device configured to be capable of supplying power to the outdoor moving device and including at least one first energy storage unit, where the first energy storage device is detachably mounted to the main body, and the first energy storage device is further configured to be detachable from the main body to supply power to another power tool; a second energy storage device configured to be capable of supplying power to the outdoor moving device and including at least one second energy storage unit; a charging unit connected to the second energy storage device and the first energy storage device; and a controller for controlling the charging unit such that the second energy storage device supplies power to the first energy storage device. The first energy storage unit includes a first positive electrode made of a first material and the second energy storage unit includes a second positive electrode made of a second material.

An outdoor moving device includes a main body; a moving wheel set including moving wheels supporting the main body; a first energy storage device configured to be capable of supplying power to the outdoor moving device and including at least one first energy storage unit, where the first energy storage unit includes a first positive electrode made of a first material, the first energy storage device is detachably mounted to the main body, and the first energy storage device is further configured to be detachable from the main body to supply power to another power tool; a second energy storage device configured to be capable of supplying power to the outdoor moving device and including at least one second energy storage unit, where the second energy storage unit includes a second positive electrode made of a second material; a discharging unit electrically connected to the second energy storage device and the first energy storage device and having a first discharge mode and a second discharge mode, where when the discharging unit is in the first discharge mode, one of the first energy storage device or the second energy storage device supplies power to the outdoor moving device and another one of the first energy storage device or the second energy storage device does not supply power to the outdoor moving device; and when the discharging unit is in the second discharge mode, the first energy storage device supplies power to the outdoor moving device and the second energy storage device also supplies power to the outdoor moving device; and a controller configured to, when voltages of the second energy storage device and the first energy storage device are different, control the discharging unit to be in the first discharge mode and when the voltages of the second energy storage device and the first energy storage device are the same, control the discharging unit to be in the second discharge mode.

In an example, maximum discharge power of the second energy storage device is greater than or equal to 5 kW and less than or equal to 200 kW.

In an example, maximum discharge power of the first energy storage device is greater than or equal to 1 kW and less than or equal to 10 kW.

In an example, the second energy storage device is fixedly mounted to the main body.

An outdoor moving device includes a main body; a moving wheel set including moving wheels supporting the main body; a first energy storage device configured to be capable of supplying power to the outdoor moving device and including at least one first energy storage unit, where the first energy storage device is detachably mounted to the main body, and the first energy storage device is further configured to be detachable from the main body to supply power to another power tool; a second energy storage device configured to be capable of supplying power to the outdoor moving device and including at least one second energy storage unit, where total energy of the second energy storage device is greater than total energy of the first energy storage device; a discharging unit electrically connected to the second energy storage device and the first energy storage device and having a first discharge mode and a second discharge mode, where when the discharging unit is in the first discharge mode, one of the first energy storage device or the second energy storage device supplies power to the outdoor moving device and another one of the first energy storage device or the second energy storage device does not supply power to the outdoor moving device; and when the discharging unit is in the second discharge mode, the second energy storage device supplies power to the outdoor moving device and the first energy storage device also supplies power to the outdoor moving device; and a controller configured to, when voltages of the second energy storage device and the first energy storage device are different, control the discharging unit to be in the first discharge mode and when the voltages of the second energy storage device and the first energy storage device are the same, control the discharging unit to be in the second discharge mode.

An outdoor moving device includes a main body; a moving wheel set including moving wheels supporting the main body; a first energy storage device configured to be capable of supplying power to the outdoor moving device and including at least one first energy storage unit, where the first energy storage device is detachably mounted to the main body, and the first energy storage device is further configured to be detachable from the main body to supply power to another power tool; a second energy storage device configured to be capable of supplying power to the outdoor moving device and including at least one second energy storage unit, where total energy of the second energy storage device is greater than total energy of the first energy storage device; a discharging unit electrically connected to the second energy storage device and the first energy storage device; and a controller electrically connected to the discharging unit. The discharging unit has a first discharge mode and a second discharge mode, where when the discharging unit is in the first discharge mode, the second energy storage device supplies power to the outdoor moving device and the first energy storage device does not supply power to the outdoor moving device; and when the discharging unit is in the second discharge mode, the first energy storage device supplies power to the outdoor moving device and the second energy storage device does not supply power to the outdoor moving device. The controller is configured to, when remaining power of the second energy storage device is greater than a preset value, control the discharging unit to be in the first discharge mode and when the remaining power of the second energy storage device is less than the preset value, control the discharging unit to be in the second discharge mode.

An outdoor moving device includes a main body; a moving wheel set including moving wheels supporting the main body; a first energy storage device configured to be capable of supplying power to the outdoor moving device and including at least one first energy storage unit; a second energy storage device configured to be capable of supplying power to the outdoor moving device and including at least one second energy storage unit; a charging interface connected to an external power supply; and a charging unit electrically connected to the first energy storage device and the charging interface and electrically connected to the second energy storage device and the charging interface. The first energy storage device is detachably connected to the main body. A ratio of a maximum charge current at which the charging unit charges the second energy storage device to a maximum charge current at which the charging unit charges the first energy storage device is greater than or equal to 0.02 and less than or equal to 10.

In an example, the charging unit is configured to charge the first energy storage device to a preset state and then charge the second energy storage device.

In an example, the charging unit is configured to charge the second energy storage device to a first preset state and then charge the first energy storage device to a second preset state.

In an example, the charging unit is configured to continue charging the second energy storage device after charging the first energy storage device to the second preset state.

In an example, the second energy storage device is configured to be capable of charging the first energy storage device.

In an example, the maximum charge current at which the charging unit charges the first energy storage device is greater than or equal to 0.04 C and less than or equal to 4 C.

In an example, the maximum charge current at which the charging unit charges the second energy storage device is greater than or equal to 0.04 C and less than or equal to 4 C.

In an example, the outdoor moving device further includes a functional assembly for implementing a tool function and a drive electric motor for driving the functional assembly, where the second energy storage device is further configured to be capable of supplying power to the drive electric motor.

In an example, the outdoor moving device further includes a moving electric motor for driving the moving wheel set to rotate, where the second energy storage device is configured to be capable of supplying power to the moving electric motor, and the first energy storage device is configured to be capable of supplying power to the moving electric motor.

A riding mower includes a main body; a seat mounted to the main body; a moving wheel set including moving wheels supporting the main body; a moving electric motor for driving the moving wheels to rotate; a mowing assembly including a mowing element for mowing grass; a drive electric motor for driving the mowing assembly to mow the grass; a first energy storage device configured to be capable of supplying power to the moving electric motor and including at least one first energy storage unit; a second energy storage device configured to be capable of supplying power to the moving electric motor and including at least one second energy storage unit; a charging interface connected to an external power supply; and a charging unit electrically connected to the first energy storage device and the charging interface and electrically connected to the second energy storage device and the charging interface. The second energy storage device is fixedly connected to the main body, and the first energy storage device is detachably connected to the main body. A ratio of a maximum charge current at which the charging unit charges the second energy storage device to a maximum charge current at which the charging unit charges the first energy storage device is greater than or equal to 0.02 and less than or equal to 10.

An outdoor moving device includes a main body; a moving wheel set including moving wheels supporting the main body; a first energy storage device configured to be capable of supplying power to the outdoor moving device and including at least one first energy storage unit; a second energy storage device configured to be capable of supplying power to the outdoor moving device and including at least one second energy storage unit; a charging interface connected to an external power supply; and a charging unit electrically connected to the first energy storage device and the charging interface and electrically connected to the second energy storage device and the charging interface. The first energy storage device is detachably connected to the main body, the first energy storage unit includes a first positive electrode made of a first material, the second energy storage unit includes a second positive electrode made of a second material, and a ratio of a maximum charge current at which the charging unit charges the second energy storage device to a maximum charge current at which the charging unit charges the first energy storage device is greater than or equal to 0.02 and less than or equal to 10.

A tool system includes an outdoor moving device and an adapter. The outdoor moving device includes a main body; a moving wheel set including moving wheels supporting the main body; a first energy storage device configured to be capable of supplying power to the outdoor moving device and including at least one first energy storage unit, where the first energy storage device is coupled to the main body in a first mounting manner; a second energy storage device configured to be capable of supplying power to the outdoor moving device and including at least one second energy storage unit, where the second energy storage device is coupled to the main body in a second mounting manner different from the first mounting manner; and a charging circuit configured to be capable of being electrically connected to the first energy storage device and the second energy storage device to enable the second energy storage device to charge the first energy storage device. The first energy storage device is detachably mounted to the main body in the first mounting manner, the first energy storage device is configured to be detachable from the main body to supply power to another power tool, and the first energy storage device is further configured to be charged through the adapter after detached from the main body.

In an example, the second energy storage device is fixedly connected to the main body in the second mounting manner.

In an example, the second energy storage device is detachably connected to the main body through an auxiliary tool in the second mounting manner.

In an example, the main body includes a housing formed with a first accommodation cavity and a second accommodation cavity, where the first energy storage device is disposed in the first accommodation cavity and the second energy storage device is disposed in the second accommodation cavity.

In an example, the main body further includes a charging interface connectable to an external power supply, where the external power supply is capable of charging the first energy storage device and the second energy storage device through the charging interface.

In an example, total energy of the first energy storage device is greater than or equal to 100 Wh and less than or equal to 1500 Wh.

In an example, a ratio of total energy of the second energy storage device to total energy of the first energy storage device is greater than or equal to 1 and less than or equal to 50.

In an example, the outdoor moving device further includes a discharging unit electrically connected to the second energy storage device and the first energy storage device and having a first discharge mode and a second discharge mode, where when the discharging unit is in the first discharge mode, one of the first energy storage device or the second energy storage device supplies power to the outdoor moving device and another one of the first energy storage device or the second energy storage device does not supply power to the outdoor moving device, and when the discharging unit is in the second discharge mode, the second energy storage device supplies power to the outdoor moving device and the first energy storage device also supplies power to the outdoor moving device and a controller configured to, when voltages of the second energy storage device and the first energy storage device are different, control the discharging unit to be in the first discharge mode and when the voltages of the second energy storage device and the first energy storage device are the same, control the discharging unit to be in the second discharge mode.

In an example, the first energy storage unit includes a first positive electrode made of a first material and the second energy storage unit includes a second positive electrode made of a second material.

In an example, an energy density of the second energy storage unit is different from an energy density of the first energy storage unit.

In an example, the first energy storage device is disposed on an upper side of the second energy storage device.

In an example, the first energy storage device is disposed on a front side of the second energy storage device.

In an example, the first energy storage device is disposed on a rear side of the second energy storage device.

In an example, the outdoor moving device further includes a moving electric motor for driving the moving wheel set, where the first energy storage device is configured to be capable of supplying power to the moving electric motor, and the second energy storage device is configured to be capable of supplying power to the moving electric motor.

In an example, the first energy storage device includes a battery pack detachably mounted to the main body, the battery pack includes a battery pack interface, the main body is provided with a main body interface connectable to the battery pack interface, and the adapter is provided with an adapter interface connectable to the battery pack interface.

A tool system includes a riding mower and an adapter. The riding mower includes a main body including a frame, a seat mounted to the frame, an operating assembly for a user to operate, and a moving electric motor; a moving wheel set including moving wheels supporting the main body and configured to be capable of being driven by the moving electric motor; a first energy storage device configured to be capable of supplying power to the moving electric motor and including at least one first energy storage unit, where the first energy storage device is coupled to the main body in a first mounting manner; a second energy storage device configured to be capable of supplying power to the moving electric motor and including at least one second energy storage unit, where the second energy storage device is coupled to the main body in a second mounting manner different from the first mounting manner; and a charging circuit configured to be capable of being electrically connected to the first energy storage device and the second energy storage device to enable the second energy storage device to charge the first energy storage device. The first energy storage device is detachably mounted to the main body in the first mounting manner, the first energy storage device is configured to be detachable from the main body to supply power to another garden tool, and the first energy storage device is further configured to be charged through the adapter after detached from the main body.

In an example, the second energy storage device is fixedly connected to the main body in the second mounting manner.

In an example, the second energy storage device is detachably connected to the main body through an auxiliary tool in the second mounting manner.

In an example, the main body includes a housing formed with a first accommodation cavity and a second accommodation cavity, where the first energy storage device is disposed in the first accommodation cavity and the second energy storage device is disposed in the second accommodation cavity.

In an example, the main body further includes a charging interface connectable to an external power supply, where the external power supply is capable of charging the first energy storage device and the second energy storage device through the charging interface.

In an example, total energy of the first energy storage device is greater than or equal to 100 Wh and less than or equal to 1500 Wh.

In an example, a ratio of total energy of the second energy storage device to total energy of the first energy storage device is greater than or equal to 1 and less than or equal to 50.

In an example, the riding mower further includes a discharging unit electrically connected to the second energy storage device and the first energy storage device and having a first discharge mode and a second discharge mode, where when the discharging unit is in the first discharge mode, one of the first energy storage device or the second energy storage device supplies power to the riding mower and another one of the first energy storage device or the second energy storage device does not supply power to the riding mower, and when the discharging unit is in the second discharge mode, the second energy storage device supplies power to the riding mower and the first energy storage device also supplies power to the riding mower and a controller configured to, when voltages of the second energy storage device and the first energy storage device are different, control the discharging unit to be in the first discharge mode and when the voltages of the second energy storage device and the first energy storage device are the same, control the discharging unit to be in the second discharge mode.

In an example, the first energy storage unit includes a first positive electrode made of a first material and the second energy storage unit includes a second positive electrode made of a second material.

In an example, an energy density of the second energy storage unit is different from an energy density of the first energy storage unit.

In an example, the first energy storage device is disposed on an upper side of the second energy storage device.

In an example, the first energy storage device is disposed on a front side of the second energy storage device.

In an example, the first energy storage device is disposed on a rear side of the second energy storage device.

In an example, the first energy storage device includes a battery pack detachably mounted to the main body, the battery pack includes a battery pack interface, the main body is provided with a main body interface connectable to the battery pack interface, and the adapter is provided with an adapter interface connectable to the battery pack interface.

A tool system includes a riding mower and an adapter. The riding mower includes a main body including a frame, a seat mounted to the frame, an operating assembly for a user to operate, and a moving electric motor; a moving wheel set including moving wheels supporting the main body and configured to be capable of being driven by the moving electric motor; a first energy storage device configured to be capable of supplying power to the moving electric motor and including at least one first energy storage unit, where the first energy storage device is coupled to the main body in a first mounting manner; a second energy storage device configured to be capable of supplying power to the moving electric motor and including at least one second energy storage unit, where the second energy storage device is coupled to the main body in a second mounting manner different from the first mounting manner; and a charging circuit configured to be capable of being electrically connected to the first energy storage device and the second energy storage device to enable the second energy storage device to charge the first energy storage device. The first energy storage device is detachably mounted to the main body in the first mounting manner, the first energy storage device is configured to be detachable from the main body to supply power to another garden tool, and the first energy storage device is further configured to be charged through the adapter after detached from the main body.

In an example, the second energy storage device is fixedly connected to the main body in the second mounting manner.

In an example, the second energy storage device is detachably connected to the main body through an auxiliary tool in the second mounting manner.

In an example, the main body includes a housing formed with a first accommodation cavity and a second accommodation cavity, where the first energy storage device is disposed in the first accommodation cavity and the second energy storage device is disposed in the second accommodation cavity.

In an example, the main body further includes a charging interface connectable to an external power supply, where the external power supply is capable of charging the first energy storage device and the second energy storage device through the charging interface.

In an example, total energy of the first energy storage device is greater than or equal to 100 Wh and less than or equal to 1500 Wh.

In an example, a ratio of total energy of the second energy storage device to total energy of the first energy storage device is greater than or equal to 1 and less than or equal to 50.

In an example, the riding mower further includes a discharging unit electrically connected to the second energy storage device and the first energy storage device and having a first discharge mode and a second discharge mode, where when the discharging unit is in the first discharge mode, one of the first energy storage device or the second energy storage device supplies power to the riding mower and another one of the first energy storage device or the second energy storage device does not supply power to the riding mower, and when the discharging unit is in the second discharge mode, the second energy storage device supplies power to the riding mower and the first energy storage device also supplies power to the riding mower and a controller configured to, when voltages of the second energy storage device and the first energy storage device are different, control the discharging unit to be in the first discharge mode and when the voltages of the second energy storage device and the first energy storage device are the same, control the discharging unit to be in the second discharge mode.

In an example, the first energy storage unit includes a first positive electrode made of a first material and the second energy storage unit includes a second positive electrode made of a second material.

In an example, an energy density of the second energy storage unit is different from an energy density of the first energy storage unit.

In an example, the first energy storage device is disposed on an upper side of the second energy storage device.

In an example, the first energy storage device is disposed on a front side of the second energy storage device.

In an example, the first energy storage device is disposed on a rear side of the second energy storage device.

In an example, the first energy storage device includes a battery pack detachably mounted to the main body, the battery pack includes a battery pack interface, the main body is provided with a main body interface connectable to the battery pack interface, and the adapter is provided with an adapter interface connectable to the battery pack interface.

In an example, the first energy storage device is pluggably mounted to the main body in the first mounting manner and the second energy storage device is detachably mounted to the main body in the second mounting manner.

An outdoor tool device includes a main body; a first energy storage device configured to be capable of supplying power to the outdoor tool device and including at least one first energy storage unit; a second energy storage device configured to be capable of supplying power to the outdoor tool device and including at least one second energy storage unit; and a connection assembly for mounting the second energy storage device to the main body. The first energy storage device is detachably mounted to the main body, the first energy storage device is further configured to be detachable from the main body to supply power to another power tool, the first energy storage unit includes a first positive electrode made of a first material, and the second energy storage unit includes a second positive electrode made of a second material.

A riding mower includes a housing; a seat mounted to the housing; a moving wheel set including moving wheels supporting the housing; a moving electric motor for driving the moving wheels to rotate; a mowing assembly including a mowing element for mowing grass; a drive electric motor for driving the mowing assembly to mow the grass; a first energy storage device configured to be capable of supplying power to the moving electric motor or the drive electric motor; a second energy storage device configured to be capable of supplying power to the moving electric motor or the drive electric motor; and a controller configured to allow the riding mower to start when a sum of a capacity of the first energy storage device and a capacity of the second energy storage device is greater than or equal to 10 Ah.

In an example, the controller is configured to, when the capacity of the first energy storage device is greater than or equal to 10 Ah, control the riding mower to start.

In an example, the second energy storage device is mounted to a housing, the first energy storage device is detachably mounted to the housing, and the first energy storage device is further configured to be detachable from the housing to supply power to another power tool.

In an example, a full voltage of the first energy storage device is greater than a full voltage of the second energy storage device.

In an example, a temperature characteristic of the first energy storage device is different from a temperature characteristic of the second energy storage device.

In an example, the first energy storage device includes a first energy storage unit including a first positive electrode made of a first material, and the second energy storage device includes a second energy storage unit including a second positive electrode made of a second material.

A riding mower includes a housing; a seat mounted to the housing; a moving wheel set including moving wheels supporting the housing; a moving electric motor for driving the moving wheels to rotate; a mowing assembly including a mowing element for mowing grass; a drive electric motor for driving the mowing assembly to mow the grass; an energy storage device configured to be capable of supplying power to the moving electric motor or the drive electric motor and including a lithium iron phosphate battery; and a controller configured to, when a capacity of the energy storage device is greater than or equal to 10 Ah, allow the riding mower to start.

A riding lawn mower includes a housing; a seat mounted to the housing; a moving wheel set including moving wheels supporting the housing; a moving electric motor for driving the moving wheels to rotate; a mowing assembly including a mowing element for mowing grass; and a drive electric motor for driving the mowing assembly to mow the grass. The housing is formed with a first mounting portion and a second mounting portion, where the first mounting portion is used for mounting a first energy storage device configured to be capable of supplying power to the moving electric motor or the drive electric motor, and the second mounting portion is used for mounting a second energy storage device configured to be capable of supplying power to the moving electric motor or the drive electric motor. A controller is configured to, when a sum of a capacity of the first energy storage device in the first mounting portion and a capacity of the second energy storage device in the second mounting portion is greater than or equal to 10 Ah, allow the riding mower to start.

In an example, the first mounting portion or the second mounting portion is an accommodation cavity or a mounting surface or a mounting groove formed by the housing.

In an example, the first mounting portion is disposed on an upper side of the second mounting portion.

In an example, the first mounting portion is disposed on a front side of the second mounting portion.

In an example, the first mounting portion is disposed on a rear side of the second mounting portion.

In an example, the first energy storage device includes at least one first energy storage unit, and the second energy storage device includes at least one second energy storage unit, where the first energy storage unit includes a first positive electrode made of a first material, and the second energy storage unit includes a second positive electrode made of a second material.

An outdoor moving device includes a main body; a moving wheel set including moving wheels supporting the main body; a moving electric motor for driving the moving wheel set to rotate; a first energy storage device including at least one first energy storage unit; a second energy storage device including at least one second energy storage unit; a connection assembly for mounting the second energy storage device to the main body; a discharging unit electrically connected to the first energy storage device and the moving electric motor so that the first energy storage device supplies power to the moving electric motor and electrically connected to the second energy storage device and the moving electric motor so that the second energy storage device supplies power to the moving electric motor; and a controller configured to, when a voltage of the at least one first energy storage unit is less than or equal to a first voltage threshold, control the discharging unit to limit power supply from the first energy storage device and when a voltage of the at least one second energy storage unit is less than or equal to a second voltage threshold, control the discharging unit to limit power supply from the second energy storage device. The first energy storage device is detachably mounted to the main body, the first energy storage device is further configured to be detachable from the main body to supply power to another power tool, and a difference between the second voltage threshold and the first voltage threshold is less than or equal to 1 V.

In an example, the difference between the second voltage threshold and the first voltage threshold is less than or equal to 0.5 V.

In an example, the controller is configured to, when half of a voltage of two of the at least one first energy storage unit is less than or equal to the first voltage threshold, control the discharging unit to limit the power supply from the first energy storage device.

In an example, the controller is configured to, when half of a voltage of one of the at least one first energy storage unit is less than or equal to the first voltage threshold, control the discharging unit to limit the power supply from the first energy storage device.

In an example, the controller is configured to, when half of a voltage of one of the at least one second energy storage unit is less than or equal to the first voltage threshold, control the discharging unit to limit the power supply from the second energy storage device.

In an example, the first energy storage device includes the at least one first energy storage unit, and the second energy storage device includes the at least one second energy storage unit, where the first energy storage unit includes a first positive electrode made of a first material, and the second energy storage unit includes a second positive electrode made of a second material.

An outdoor moving device includes a main body; a moving wheel set including moving wheels supporting the main body; a moving electric motor for driving the moving wheel set to rotate; a first energy storage device including at least one first energy storage unit; a second energy storage device including at least one second energy storage unit; a discharging unit electrically connected to the first energy storage device and the moving electric motor so that the first energy storage device supplies power to the moving electric motor and electrically connected to the second energy storage device and the moving electric motor so that the second energy storage device supplies power to the moving electric motor; and a controller configured to, when a voltage of the at least one first energy storage unit is less than or equal to a first voltage threshold, control the discharging unit to limit power supply from the first energy storage device and when a voltage of the at least one second energy storage unit is less than or equal to a second voltage threshold, control the discharging unit to limit power supply from the second energy storage device. The controller dynamically decreases the first voltage threshold or the second voltage threshold when a discharge current of the discharging unit increases.

An outdoor moving device includes a main body; a moving wheel set including moving wheels supporting the main body; a moving electric motor for driving the moving wheel set to rotate; a first energy storage device configured to be capable of supplying power to the moving electric motor and including at least one first energy storage unit; a second energy storage device configured to be capable of supplying power to the moving electric motor and including at least one second energy storage unit, where total energy of the second energy storage device is greater than total energy of the first energy storage device; and a controller configured to, when a discharge current of the first energy storage device is greater than or equal to a first current threshold, limit power supply from the first energy storage device.

In an example, the controller is configured to, when a discharge current of the second energy storage device is greater than or equal to a second current threshold, limit power supply from the second energy storage device, where the first current threshold is less than or equal to the second current threshold.

In an example, the first energy storage unit includes a first positive electrode made of a first material and the second energy storage unit includes a second positive electrode made of a second material.

In an example, the controller is configured to limit the power supply from the first energy storage device when a Joule integral value of the discharge current of the first energy storage device over a preset time period is greater than the first current threshold.

In an example, a preset time period is greater than or equal to 3 s and less than or equal to 120 s.

In an example, the controller is configured to limit power of the moving electric motor when the discharge current of the first energy storage device is greater than or equal to the first current threshold.

In an example, the total energy of the second energy storage device is greater than or equal to 1 kWh and less than or equal to 30 kWh.

In an example, a ratio of the total energy of the second energy storage device to the total energy of the first energy storage device is greater than or equal to 1 and less than or equal to 50.

In an example, a ratio of the total energy of the second energy storage device to the total energy of the first energy storage device is greater than or equal to 2 and less than or equal to 20.

An outdoor moving device includes a main body; a moving wheel set including moving wheels supporting the main body; a moving electric motor for driving the moving wheel set to rotate; a first energy storage device configured to be capable of supplying power to the moving electric motor and including at least one first energy storage unit, where the first energy storage unit includes a first positive electrode made of a first material; and a second energy storage device configured to be capable of supplying power to the moving electric motor and including at least one second energy storage unit, where the second energy storage unit includes a second positive electrode made of a second material. A difference between a full voltage of the first energy storage unit and a full voltage of the second energy storage unit is less than or equal to 1 V.

In an example, the difference between the full voltage of the first energy storage unit and the full voltage of the second energy storage unit is less than or equal to 0.5 V.

An outdoor moving device includes a main body; a moving wheel set including moving wheels supporting the main body; a first energy storage device configured to be capable of supplying power to the outdoor moving device and including at least one first energy storage unit; a second energy storage device configured to be capable of supplying power to the outdoor moving device and including at least one second energy storage unit, where a full voltage of the second energy storage device is less than a full voltage of the first energy storage device; a charging interface connected to an external power supply; a charging unit electrically connected to the first energy storage device and the charging interface and electrically connected to the second energy storage device and the charging interface; and a controller for controlling the charging unit such that the external power supply charges the first energy storage device and the second energy storage device through the charging interface. The controller is configured to, when the second energy storage device is charged to basically the full voltage, control the charging unit to perform charge equalization on the second energy storage device.

In an example, the charging unit includes a charging circuit and an equalization circuit, where the charging circuit includes at least a first charging branch connected to the first energy storage device and a second charging branch connected to the second energy storage device, and the equalization circuit is connected to the second energy storage device.

In an example, the controller is configured to, when the second energy storage device is basically charged to the full voltage, control the second charging branch to be turned off and control the equalization circuit to be turned on, so as to perform the charge equalization on the second energy storage device.

In an example, the equalization circuit includes a constant current device capable of receiving a current from the charging interface, converting the current into a constant current, and outputting the constant current to the second energy storage device.

In an example, the equalization circuit further includes an equalization switch connected to the controller, where the controller is configured to, when the second energy storage device is basically charged to the full voltage, control the equalization switch to be turned on and control the second charging branch to be turned off, so as to perform the charge equalization on the second energy storage device.

An outdoor moving device includes a main body; a moving wheel set including moving wheels supporting the main body; a moving electric motor for driving the moving wheel set to rotate; a first energy storage device configured to be capable of supplying power to the moving electric motor and including multiple first energy storage units, where each of the multiple first energy storage units includes a first positive electrode made of a first material; a second energy storage device configured to be capable of supplying power to the moving electric motor and including multiple second energy storage units, where each of the multiple second energy storage units includes a second positive electrode made of a second material; a charging interface connected to an external power supply; a charging unit electrically connected to the first energy storage device and the charging interface and electrically connected to the second energy storage device and the charging interface; and a controller for controlling the charging unit such that the external power supply charges the first energy storage device and the second energy storage device through the charging interface. The controller is configured to control the charging unit to perform charge equalization on at least the second energy storage device.

In an example, a bus electrically connected between the charging interface and the charging unit is further included.

In an example, the charging unit includes a charging circuit and an equalization circuit that are connected in parallel.

In an example, the charging circuit includes two charging branches, where the first energy storage device and the second energy storage device are separately connected to different charging branches and both connected to the same equalization circuit.

In an example, the equalization circuit includes two equalization branches, where the first energy storage device and the second energy storage device are separately connected to different equalization branches.

In an example, the equalization circuit includes a constant current device capable of receiving a current from the charging interface, converting the current into a constant current, and outputting the constant current to the energy storage devices.

In an example, the equalization circuit further includes an equalization switch connected to the controller, where the controller is configured to control the equalization switch to be turned on and control at least the charging circuit connected to the second energy storage device to be turned off, so as to perform the charge equalization on the second energy storage device.

In an example, a equalization branch switch is disposed on each of the two equalization branches, and the controller is configured to control the equalization branch switch to be turned on, so as to perform the charge equalization on an energy storage device connected to the each of the two equalization branches.

In an example, the second material includes lithium iron phosphate.

In an example, a full voltage of the second energy storage device is 50 V to 60 V.

In an example, a full voltage of the second energy storage device is lower than a full voltage of the first energy storage device.

In an example, the second energy storage device is fully charged earlier than the first energy storage device.

An outdoor moving device includes a main body; a moving wheel set including moving wheels supporting the main body; a moving electric motor for driving the moving wheel set to rotate; an energy storage device configured to be capable of supplying power to the moving electric motor and including multiple energy storage units; a charging interface connected to an external power supply; and a charging unit electrically connected to the energy storage device and the charging interface and including a charging circuit and an equalization circuit. The equalization circuit includes a constant current device capable of receiving a charge current from the charging interface, converting the charge current into a constant current, and outputting the constant current to the energy storage device.

In an example, the constant current is greater than or equal to 20 mA and less than or equal to 50 mA.

In an example, the charge current from the charging interface is greater than or equal to 0.1 C and less than or equal to 2 C.

In an example, the charging circuit includes multiple charging branches, where energy storage devices are separately connected to different charging branches and connected to the same equalization circuit.

In an example, the equalization circuit includes multiple equalization branches, where different energy storage devices are separately connected to different equalization branches.

In an example, each equalization branch includes one equalization branch switch, where a controller is configured to control at least a charging branch connected to the energy storage device to be turned off and control an equalization branch switch connected to the energy storage device to be turned on, so as to perform charge equalization on the energy storage device.

In an example, each of the multiple energy storage units is connected in one control loop and when the one control loop is cut off, the each of the multiple energy storage units is capable of receiving electrical energy inputted by the charging unit.

An outdoor moving device includes a main body; a moving wheel set including moving wheels supporting the main body; a moving electric motor for driving the moving wheel set to rotate; a first energy storage device configured to be capable of supplying power to the moving electric motor and including at least one first energy storage unit; a second energy storage device configured to be capable of supplying power to the moving electric motor and including at least one second energy storage unit, where total energy of the second energy storage device is greater than total energy of the first energy storage device; a charging unit electrically connected to the first energy storage device and the moving electric motor and electrically connected to the second energy storage device and the moving electric motor; and a controller configured to, when a rotational speed of the moving electric motor decreases and power of the second energy storage device is less than or equal to a power threshold, control the charging unit such that a current generated by the moving electric motor is outputted to the second energy storage device.

In an example, the first energy storage unit includes a first positive electrode made of a first material and the second energy storage unit includes a second positive electrode made of a second material.

In an example, the controller is configured to, when the rotational speed of the moving electric motor decreases and the power of the second energy storage device is greater than the power threshold, control the charging unit such that the current generated by the moving electric motor is outputted to one of the first energy storage device or the second energy storage device which has a lower voltage.

In an example, a service life of the second energy storage unit is greater than a service life of the first energy storage unit.

In an example, the power threshold is 80% of total power of the second energy storage device.

In an example, the total energy of the second energy storage device is greater than or equal to 1 kWh and less than or equal to 30 kWh.

An outdoor moving device includes a main body; a moving wheel set including moving wheels supporting the main body; a moving electric motor for driving the moving wheel set to rotate; a first energy storage device configured to be capable of supplying power to the moving electric motor and including at least one first energy storage unit; a second energy storage device configured to be capable of supplying power to the moving electric motor and including at least one second energy storage unit, where total energy of the second energy storage device is greater than total energy of the first energy storage device; a charging unit electrically connected to the first energy storage device and the moving electric motor and electrically connected to the second energy storage device and the moving electric motor; and a controller configured to, when a rotational speed of the moving electric motor decreases, control the charging unit according to at least power or a voltage of the first energy storage device or the second energy storage device such that a current generated by the moving electric motor is outputted to the first energy storage device or the second energy storage device.

In an example, the controller is configured to, when the rotational speed of the moving electric motor decreases, control the charging unit such that the current generated by the moving electric motor is outputted to one of the first energy storage device or the second energy storage device which has lower power.

In an example, the controller is configured to, when the rotational speed of the moving electric motor decreases, control the charging unit such that the current generated by the moving electric motor is outputted to one of the first energy storage device or the second energy storage device which has a lower voltage.

In an example, the total energy of the second energy storage device is greater than or equal to 1 kWh and less than or equal to 30 kWh.

DETAILED DESCRIPTION

The present application is described below in detail in conjunction with drawings and examples.

It is to be understood by those skilled in the art that in the description of the present application, orientations or position relations indicated by terms such as "up", "down", "front", "rear", "left", and "right" are based on the drawings. These orientations or position relations are intended only to facilitate and simplify the description of the present application and not to indicate or imply that a device or element referred to must have such particular orientations or must be configured or operated in such particular orientations. Thus, the terms are not to be construed as limiting the present application.

The present application is described below in detail in conjunction with drawings and examples.

Figure 1:
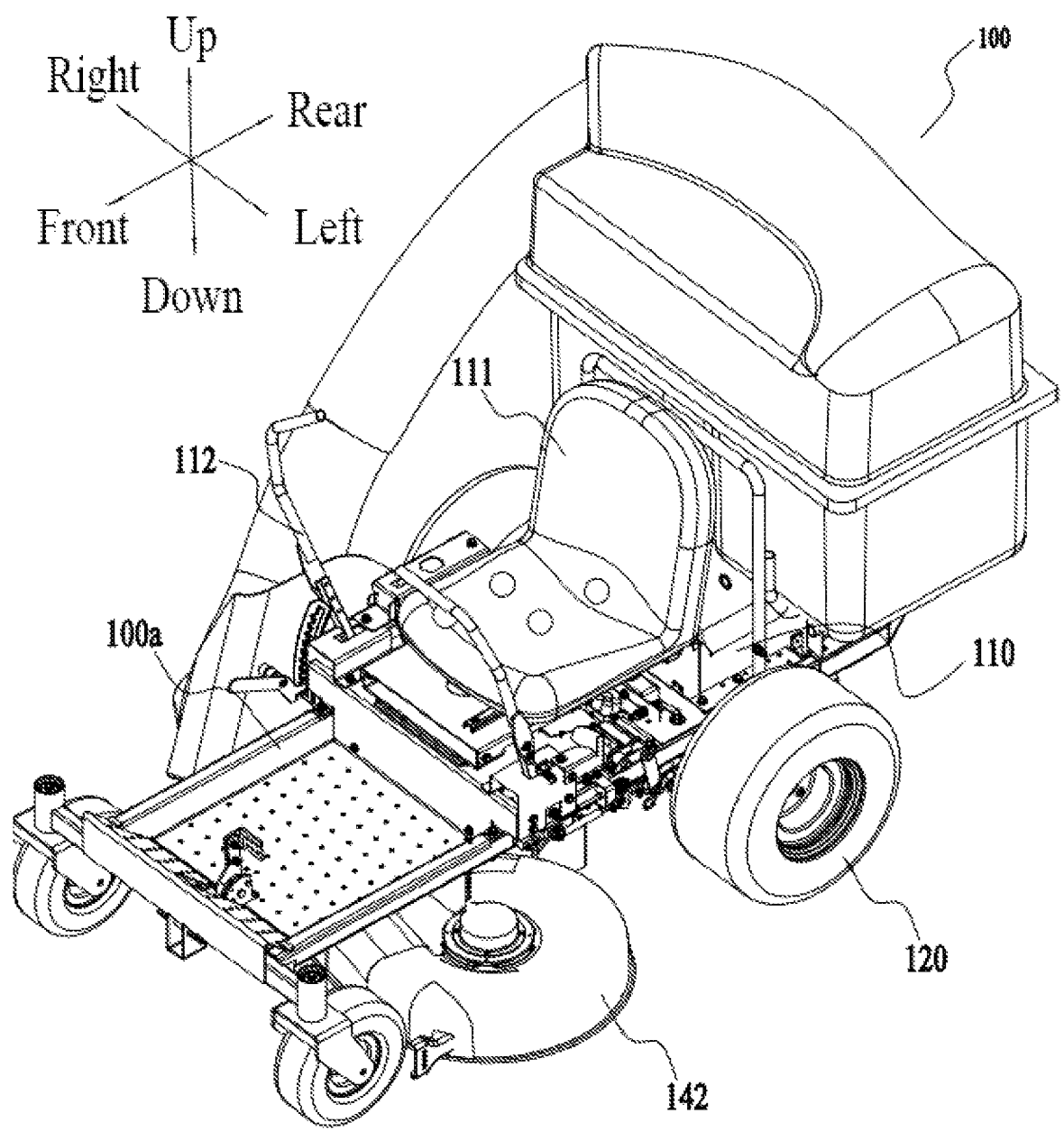
FIG. 1 is a perspective view of an outdoor moving device according to an example of the present application.

Referring to FIG. 1, the present application provides an outdoor tool device and, in particular, an outdoor moving device 100. The outdoor moving device 100 is specifically a riding mower capable of moving and mowing outdoors. It is to be understood that the outdoor moving device may be another vehicle that only moves outdoors, such as a utility vehicle shown in FIG. 20, or may be a dune buggy, a farmer's vehicle, a golf cart, or the like. The outdoor moving device may also be a vehicle which, like the riding mower shown in this example, can implement another function in addition to a moving function, such as a snow thrower shown in FIG. 19. The snow thrower can move outdoors and implement a snow throwing function. The outdoor moving device may also be an agricultural machinery vehicle, such as a harvester and a pesticide spraying vehicle. It is to be understood that the outdoor tool device may also be a washer shown in FIG. 21.

In fact, any outdoor moving device that adopts the essence of the technical solutions of the present application described below belongs to the protection scope of the present application.

Figure 2:
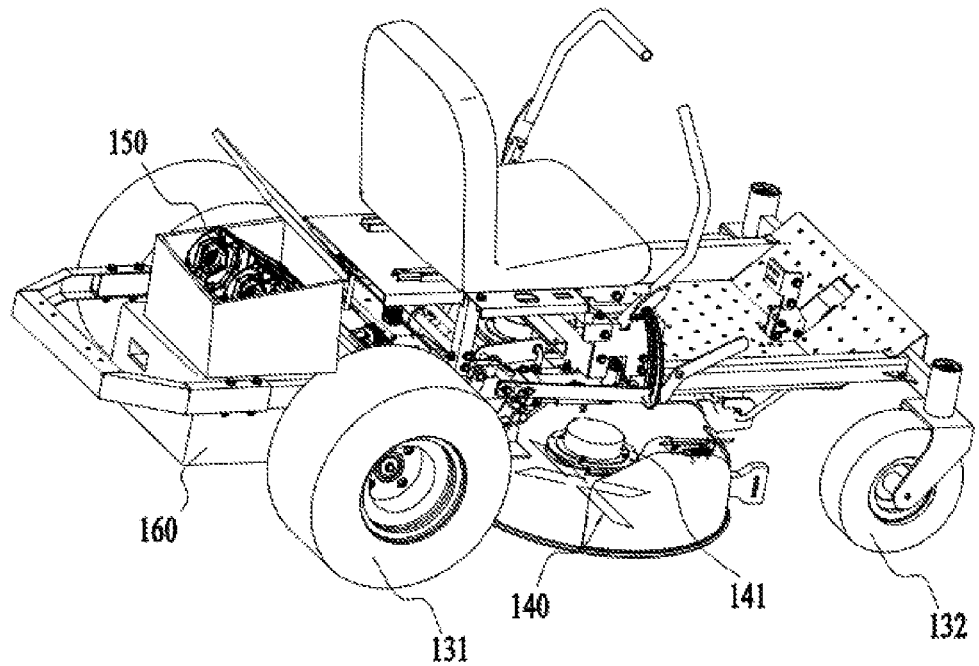
FIG. 2 is a perspective view illustrating part of a structure of the outdoor moving device in FIG. 1.
Figure 3A:
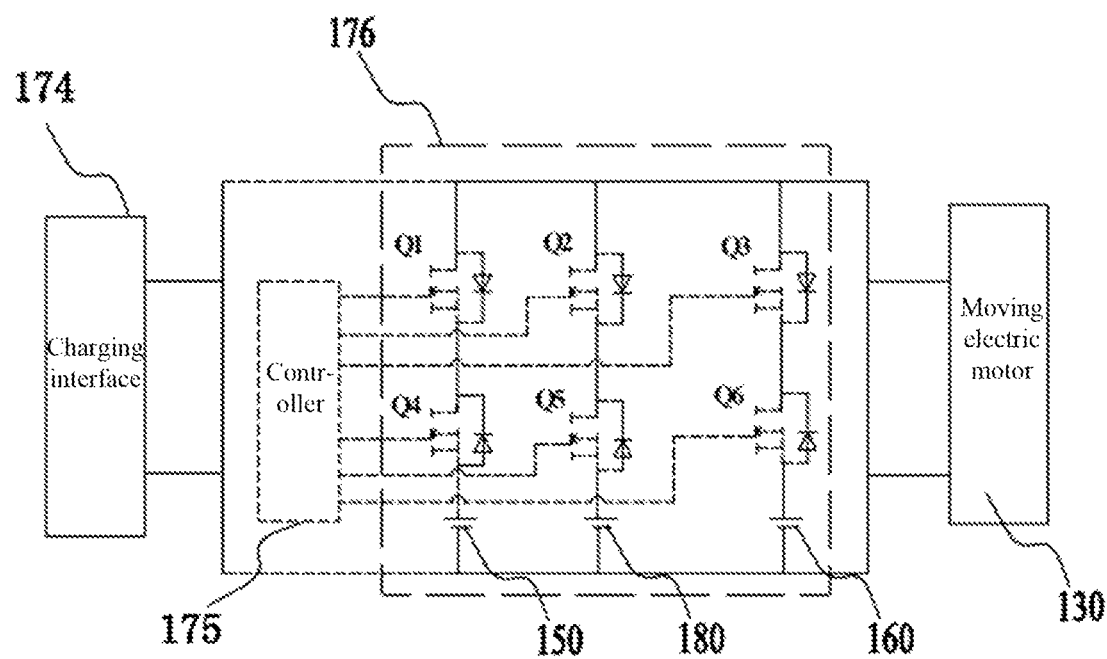
FIG. 3A is a circuit diagram of the outdoor moving device in FIG. 1.

As shown in FIGS. 1 to 3, the outdoor moving device 100 includes a main body 100a and a moving wheel set 120. The main body 100a further includes a housing 110 and a moving electric motor 130. The moving wheel set 120 is connected to the main body 100a to support the main body 100a. The moving wheel set 120 can drive the outdoor moving device 100 to move at least along a front and rear direction. The moving wheel assembly 120 includes rear moving wheels 131 and front moving wheels 132. The moving electric motor 130 drives the rear moving wheels 131 or the front moving wheels 132 to rotate so that the outdoor moving device 100 can move on the ground. Two moving electric motors 130 may be provided, and the two moving electric motors 130 separately drive two rear moving wheels 131 so that the outdoor moving device 100 can turn in other directions deviating from the front and rear direction.

The outdoor moving device 100 further includes a functional assembly 140 for implementing a tool function and a drive electric motor 141 for driving the functional assembly 140. In this example, the outdoor moving device 100 is the riding mower, the functional assembly 140 is specifically a mowing assembly including a mowing element for mowing lawns, and the drive electric motor 141 drives the mowing element to rotate.

Referring to FIG. 1, the outdoor moving device 100 can be used for a user to ride on. The user may control the outdoor moving device 100 to move and operate the outdoor moving device 100 to trim lawns and vegetation at the same time. The outdoor moving device 100 further includes a seat 111 on which the user sits. The seat 111 is mounted to the housing 110 and used for the user to sit on. In this example, the riding mower includes an operating assembly, where the operating assembly is specifically an operating rod assembly 112 that is operable by the user to control the riding mower to move forwards, move backwards, and turn.

Referring to FIG. 2, the outdoor moving device 100 further includes a first energy storage device 150 and a second energy storage device 160, where both the first energy storage device 150 and the second energy storage device 160 can supply power to the outdoor moving device 100. As shown in FIGS. 2 to 6, the first energy storage device 150 includes at least one first energy storage unit 151. The second energy storage device 160 includes at least one second energy storage unit 161. The first energy storage device 150 is connected to the housing 110 in a first mounting manner so that the first energy storage device 150 is detachably mounted to the housing 110 in the first mounting manner. For example, in this example, the first energy storage device 150 includes a battery pack 152 that is detachably mounted to the housing 110. The second energy storage device 160 is connected to the housing 110 in a second mounting manner different from the first mounting manner. The second mounting manner differs from the first mounting manner in that the first energy storage device 150 is detachably mounted to the housing 110 in the first mounting manner. Specifically, the battery pack 152 is pluggably mounted to the housing 110.

The battery pack 152 includes a battery pack housing 152a and the first energy storage unit 151 disposed on the battery pack housing 152a, where the first energy storage unit 151 may be specifically a cylindrical cell unit. The battery pack housing 152a is provided with a battery pack interface 152b through which the battery pack 152 is pluggably mounted to the housing 110, and the housing 110 is formed with a main body interface 110a corresponding to the battery pack interface 152b. The battery pack interface 152b mates with the main body interface 110a so that the battery pack 152 can be mechanically connected and electrically connected to the main body 100a. Further, a slide rail 152c is disposed at the battery pack interface 152b, where the slide rail 152c guides the battery pack 152 to be slidably mounted to the housing 110.

The second energy storage device 160 is connected to the housing 110 in the second mounting manner different from the first mounting manner, the first energy storage device 150 is detachably mounted to the housing, and the second energy storage device 160 may be connected to the housing in a fixed mounting manner different from the detachable mounting manner. It is to be noted that the second mounting manner does not limit that the second energy storage device 160 cannot be detachably mounted to the housing 110. Specifically, both the first energy storage device 150 and the second energy storage device 160 may be detachably mounted to the housing 110, but the first energy storage device 150 is pluggably mounted to the housing 110 and the second energy storage device 160 is mounted to the housing 110 in another detachable connection manner different from the pluggable connection manner. For example, the second energy storage device 160 is detachably mounted to the housing 110 in a snap connection manner. In this case, it may be considered that the pluggable connection manner of the first energy storage device 150 is different from the snap connection manner of the second energy storage device 160, that is to say, the first mounting manner of the first energy storage device 150 is different from the second mounting manner of the second energy storage device 160.

In this example, the second energy storage device 160 is fixedly mounted to the housing 110 in the second mounting manner. The second energy storage device 160 is configured to be fixedly mounted to the housing 110, where the fixed connection manner includes, but is not limited to, welding, screwing, snapping, or a non-movable connection. When the second energy storage device 160 is fixedly mounted to the housing 110, the second energy storage device 160 may not be detachable or may be detached from the housing 110 by the user by means of an external tool, thereby facilitating the maintenance of the second energy storage device 160.

The outdoor moving device 100 further includes a connection assembly through which the second energy storage device 160 is fixedly connected to housing 110, where the connection assembly may include a fastening element such as a screw. The second energy storage device 160 is specially adapted to the outdoor moving device 100. For some relatively large outdoor moving devices 100, the outdoor moving device 100 needs to work outdoors for a relatively long time, the outdoor moving device 100 consumes a relatively large amount of energy per unit time, and the second energy storage device 160 may store a relatively large amount of energy to supply power to the outdoor moving device 100. The second energy storage device 160 is fixedly mounted to the housing and has a shape better adapted to the outdoor moving device 100 so that the shape and structure of the second energy storage device 160 are more compact, a space occupation rate of the second energy storage unit 161 in the second energy storage device 160 may be set to be higher, and thus the second energy storage device 160 can have a relatively large amount of energy. The first energy storage device 150 includes the battery pack 152 detachably mounted to the housing 110, where the battery pack 152 may be configured to be adaptable to a power tool different from the outdoor moving device 100. For example, the power tool may be a blower 200a in FIG. 8. The outdoor moving device 100 further includes the first energy storage device 150 in addition to the second energy storage device 160, where the first energy storage device 150 may extend a working duration of the outdoor moving device 100 and can be adapted to other power tools so that in the case where the first energy storage device 150 of the outdoor moving device 100 temporarily has insufficient power, a power supply device of another power tool may supply power to the outdoor moving device 100. At the same time, the first energy storage device 150 is configured to be detachably mounted to the housing 110. In this manner, when the user needs to perform diverse tasks outdoors, in addition to the outdoor moving device 100, the user also needs to use other power tools to work. For example, the user uses the blower 200a to blow trimmed weeds or fallen leaves. At this time, the first energy storage device on the outdoor moving device 100 may supply power to the blower 200a, thereby improving the working flexibility of the outdoor moving device, facilitating a variety of outdoor tasks handled by the professional garden staff, extending an outdoor working duration, and improving working efficiency.

Figure 8:
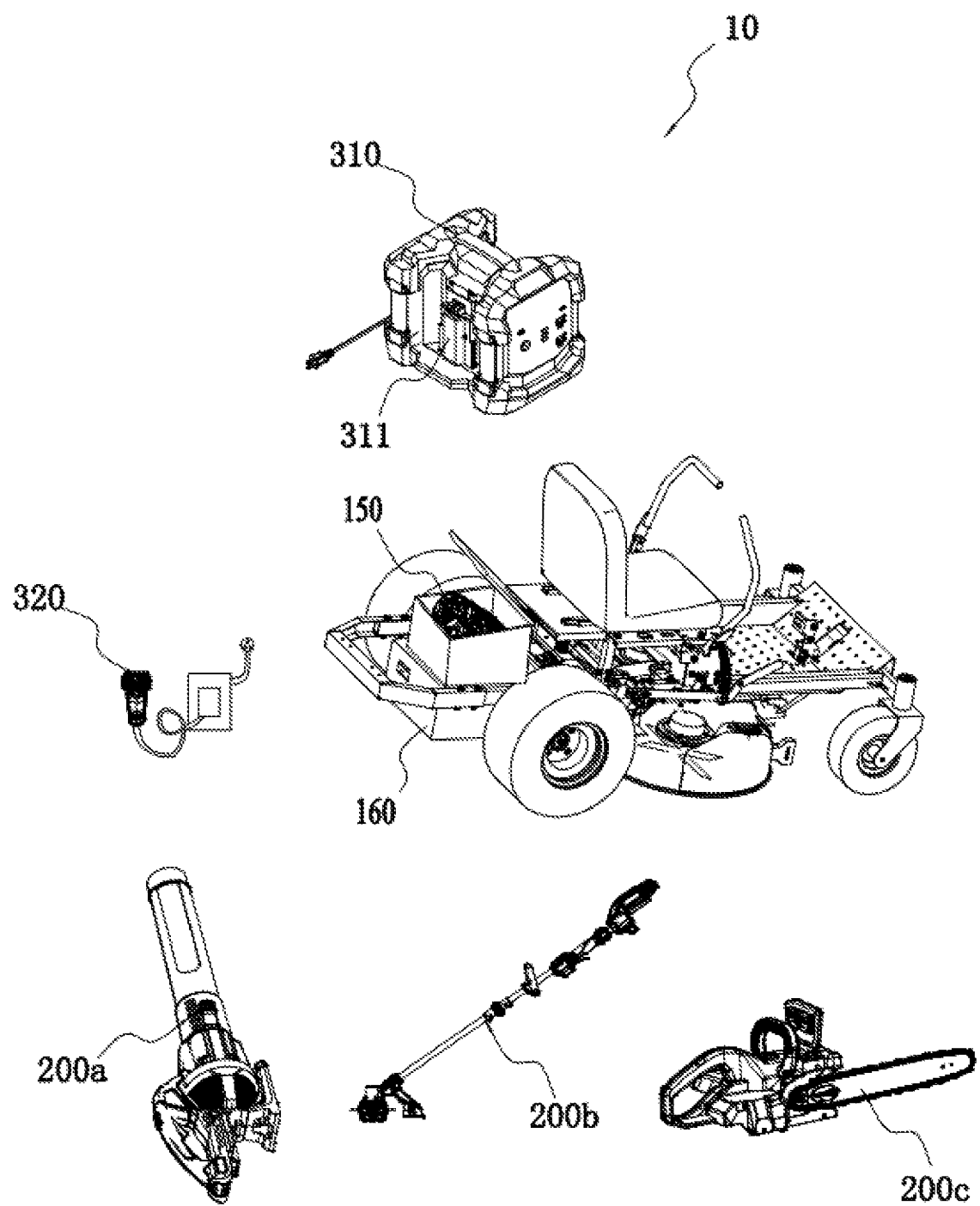
FIG. 8 is a perspective view of a tool system according to an example of the present application.

The battery pack 152 in the present application may be applied not only to the outdoor moving device 100 but also to other power tools, thereby improving the adaptability of the battery pack 152 and improving the ability of the outdoor moving device 100 to adapt to the battery pack 152 of another power tool. In this manner, when the outdoor moving device 100 is not in use, the user can detach the battery pack 152 for use with other power tools, thereby avoiding the waste of resources and reducing the cost of use. Alternatively, when the user needs to use the outdoor moving device 100, the user may use the battery pack 152 in another power tool as an energy source. The battery pack 152 includes multiple cell units connected in series, or multiple cell units connected in parallel, or multiple cell units connected in series and in parallel. Multiple cell units are integrated in the battery pack housing 152a so as to form a whole, where the cell units may specifically be lithium cell units. As shown in FIG. 8, the power tool may be the blower 200a, a garden tool such as a grass trimmer 200b and a chain saw 200c, a torque output tool such as an electric drill and an electric hammer, a sawing tool such as an electric circular saw, a jigsaw, and a reciprocating saw, or a grinding tool such as an angle grinder and a sander. In other examples, the battery pack may be configured to be capable of supplying power to a push power tool, such as a push mower and a push snow thrower. In other examples, the power tool may be another electric tool, such as a light. In this manner, in the present application, the battery pack 152 adapted to the outdoor moving device 100 can be unplugged by the user to be applied to the preceding power tools, that is to say, the user can use the battery packs 152 of these power tools as energy sources capable of supplying power to the outdoor moving device 100, thereby improving the versatility of the outdoor moving device 100 and reducing the cost of use.

In this example, total energy of the second energy storage device 160 is greater than total energy of the first energy storage device 150, and a total capacity of the second energy storage device 160 is also greater than a total capacity of the first energy storage device 150. The second energy storage device 160 is a power supply device specially adapted to the outdoor moving device, and the first energy storage device 150 is a power supply device adaptable to both the outdoor moving device and other power tools. In this manner, the adaptability of the outdoor moving device 100 is improved while the outdoor moving device 100 satisfies the requirement for working outdoors for a relatively long time.

The second energy storage device 160 is configured to be capable of supplying power to the moving electric motor 130, the first energy storage device 150 is also configured to be capable of supplying power to the moving electric motor 130, the second energy storage device 160 is further configured to be capable of supplying power to the drive electric motor 141, and the first energy storage device 150 is also configured to be capable of supplying power to the drive electric motor 141. In one power supply mode provided in other examples, the second energy storage device 160 can supply power to both the moving electric motor 130 and the drive electric motor 141, and the first energy storage device 150 supplies power to only the moving electric motor 130 and does not supply power to the drive electric motor 141. In one power supply mode provided in other examples, the second energy storage device 160 supplies power to both the moving electric motor 130 and the drive electric motor 141, and the first energy storage device 150 supplies power to only the drive electric motor 141. In one power supply mode provided in other examples, the second energy storage device 160 is configured to be capable of supplying power to the drive electric motor 141, and the first energy storage device 150 is configured to not supply power to the drive electric motor 141.

The total energy of the second energy storage device 160 is greater than the total energy of the first energy storage device 150. The structures and energy of the second energy storage device 160 and the first energy storage device 150 are configured such that the advantages of a large-energy power supply and a detachable power supply are achieved at the same time, and the problem of inflexibility of the large-energy power supply and the problem of small energy of the detachable power supply can be solved, thereby improving the power supply lifetime and flexibility of the outdoor moving device 100.

Figure 4:
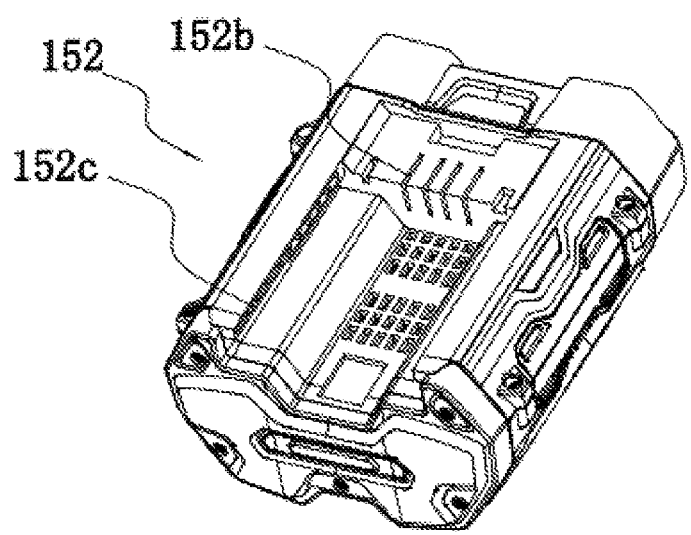
FIG. 4 is a perspective view of a first energy storage device in FIG. 2.
Figure 5:
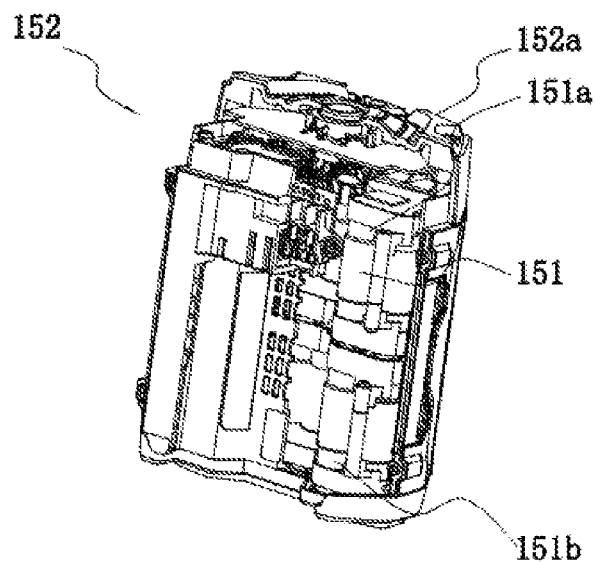
FIG. 5 is an interior view of the first energy storage device in FIG. 4.
Figure 6:
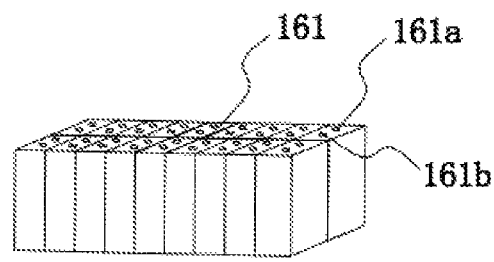
FIG. 6 is a perspective view of a second energy storage unit inside a second energy storage device in FIG. 2.

In this example, as shown in FIGS. 4 and 5, the first energy storage unit 151 in the battery pack housing 152a is a cylindrical cell unit and includes a first positive electrode 151a and a first negative electrode 151b, where the first positive electrode 151a and the first negative electrode 151b are disposed at two opposite ends of the cell unit. As shown in FIG. 6, the second energy storage unit 161 included in the second energy storage device 160 is a bulk cell unit, and multiple bulk cell units are stacked together, thereby reducing a volume of the second energy storage device 160. The bulk cell unit may specifically be cubic. The second energy storage unit 161 includes a second positive electrode 161a and a second negative electrode 161b that may be disposed on the same side surface of the cell unit.

Figure 7:
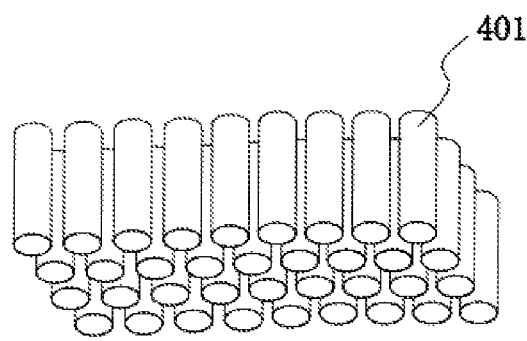
FIG. 7 is a perspective view of another second energy storage unit inside a second energy storage device in FIG. 2.

A second energy storage unit 401 in another example shown in FIG. 7 is also cylindrical.

In other examples, the second energy storage device 160 may include multiple energy storage packs disposed separately, where the multiple energy storage packs may be connected in parallel or in series.

An energy density of the first energy storage unit 151 is different from an energy density of the second energy storage unit 161. For the first energy storage device 150 and the second energy storage device 160 with different mounting manners, the first energy storage unit 151 and the second energy storage unit 161 with different energy densities are selected to separately adapt to the characteristics of the fixed connection manner and the detachable mounting and connection manner, thereby achieving the purposes of reducing the cost and improving the lifetime. In this example, the energy density of the first energy storage unit 151 is greater than the energy density of the second energy storage unit 161 so that the cost of the second energy storage device 160 with the larger total energy and the larger volume can be better considered. Optionally, a ratio of the energy density of the second energy storage unit 161 to the energy density of the first energy storage unit 151 is greater than or equal to 0.3 and less than or equal to 1. Alternatively, the ratio of the energy density of the second energy storage unit 161 to the energy density of the first energy storage unit 151 is greater than or equal to 0.8 and less than or equal to 1. Alternatively, the ratio of the energy density of the second energy storage unit 161 to the energy density of the first energy storage unit 151 is greater than or equal to 0.8 and less than or equal to 1.2. It is to be noted that the energy density in this example refers to a gravimetric energy density.

The first positive electrode 151a of the first energy storage unit 151 is made of a first material, and the second positive electrode 161a of the second energy storage unit 161 is made of a second material. The second material is different from the first material, and the first energy storage device 150 and the second energy storage device 160 of different types may supply power to the outdoor moving device 100 so that power supply platforms of other power tools on the market can be better considered, the cost of the outdoor moving device 100 can be reduced, and the total energy of the first energy storage device 150 can be increased. For example, in this example, the second positive electrode 161a of the second energy storage unit 161 is made of lithium iron phosphate, and the first positive electrode 151a of the first energy storage unit 151 is made of a material containing lithium. The first material and the second material may also be selected from nickel-cadmium batteries, graphene, and other materials, so as to achieve different combinations of battery characteristics.

In other examples, the second energy storage unit 161 may be a supercapacitor, which is also known as an electrochemical capacitor. Specifically, the second energy storage unit 161 is an asymmetric supercapacitor. An electrochemical capacitor based on the principle of bipolar plate capacitance is generally designed to be symmetric. Two identical materials with matched masses are used for a positive electrode and a negative electrode, such as an activated carbon electrode. The symmetric capacitor generally has no difference between the positive electrode and the negative electrode. Although a power density and a cycle life of the symmetric capacitor are excellent, an energy density of the symmetric capacitor is much lower than an energy density of a lithium-ion battery, a nickel metal hydride battery, or the like. However, two electrodes of the asymmetric capacitor use different materials, such as a carbon material/transition metal oxide system electrode material, a carbon material/conductive polymer system electrode material, or two activated carbon electrodes with different electrochemical properties, thereby improving the energy density of the electrochemical capacitor to 80 to 120 Wh/kg. In this manner, the electrochemical capacitor can be used as an energy supply unit of the power tool. For example, the second energy storage unit 161 may be a lithium-carbon capacitor (LCC).

Figure 11:
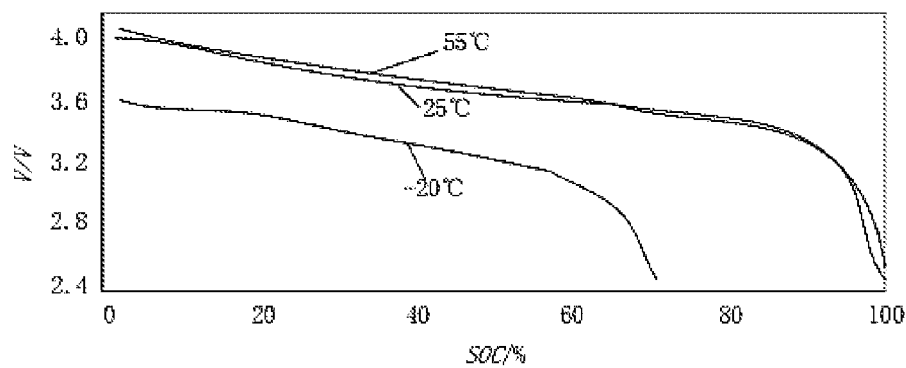
FIG. 11 is a graph illustrating discharge curves of a first energy storage device at different temperatures.
Figure 12:
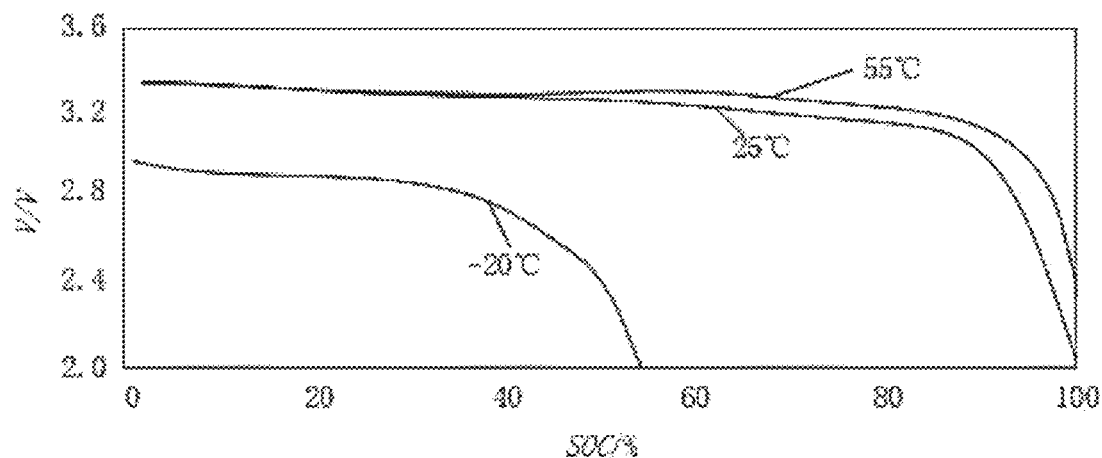
FIG. 12 is a graph illustrating discharge curves of a second energy storage device at different temperatures.

The first energy storage unit 151 and the second energy storage unit 161 use different materials so that the first energy storage device 150 and the second energy storage device 160 may have different service lives. In this manner, even when one of the first energy storage device 150 or the second energy storage device 160 is damaged, the other one can supply power to the outdoor moving device 100. Further, since the first energy storage unit 151 and the second energy storage unit 161 are made of different materials, a temperature characteristic of the first energy storage device 150 is different from a temperature characteristic of the second energy storage device 160. In this manner, when the outdoor moving device 100 works in a low-temperature environment, one of the first energy storage device 150 or the second energy storage device 160 which has a better low-temperature characteristic may be used for power supply. For example, in this example, the second energy storage unit 161 is a lithium iron phosphate cell, and the first energy storage unit 151 is a lithium cell. As shown in FIGS. 11 and 12, at −20° C., the second energy storage device 160 can release more power than the first energy storage device 150. Therefore, when the outdoor moving device 100 is in a low-temperature working environment, the outdoor moving device 100 may be powered by the second energy storage device 160 as much as possible so that the working efficiency of the outdoor moving device 100 can be improved.

The outdoor moving device 100 further includes an electrical connection assembly for electrically connecting the second energy storage device 160 to the moving electric motor 130 and a controller 175, where the connection assembly and the electrical connection assembly are separated from each other. For the first energy storage device 150, when the first energy storage device 150 is unplugged from the housing 110, the first energy storage device 150 can be mechanically disconnected from the housing 110 and can basically be electrically disconnected from the housing 110 at the same time. For the second energy storage device 160, the electrical connection assembly and the connection assembly are separated from each other. When the second energy storage device 160 is detached from the housing 110 through an auxiliary tool or multiple step operations, the second energy storage device 160 needs to be electrically and mechanically disconnected from the housing 110 in different operation manners separately.

Figure 13:
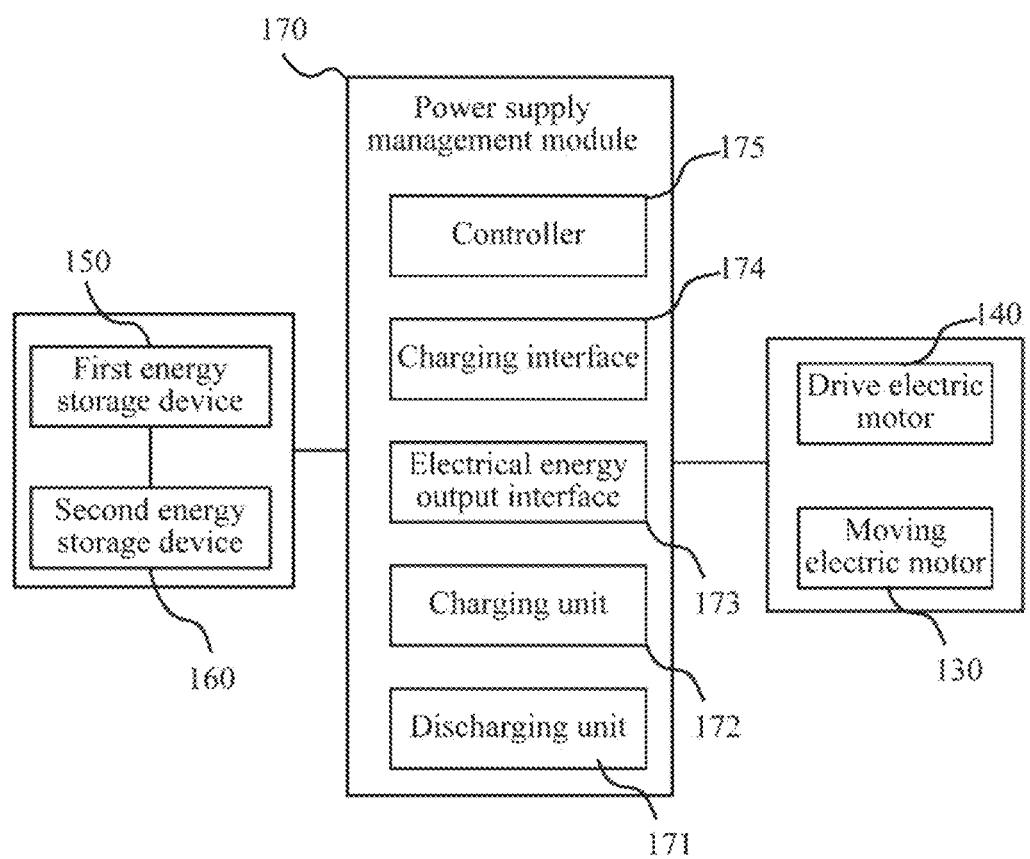
FIG. 13 is a logic block diagram of the outdoor moving device in FIG. 1.

As shown in FIGS. 1 and 13, the outdoor moving device 100 further includes a power supply management module 170, where the power supply management module 170 includes a discharging unit 171, a charging unit 172, an electrical energy output port 173, a charging interface 174, and the controller 175. The discharging unit 171 is electrically connected to the first energy storage device 150 and the moving electric motor 130 so that the first energy storage device 150 supplies power to the moving electric motor 130. Further, the discharging unit 171 is electrically connected to the second energy storage device 160 and the moving electric motor 130 so that the second energy storage device 160 supplies power to the moving electric motor 130.

The electrical connection assembly includes the discharging unit 171 electrically connected to the second energy storage device 160 and the first energy storage device 150, the controller 175 is electrically connected to the discharging unit 171, and the controller 175 is configured to control a discharge mode of the discharging unit 171.

The discharging unit 171 has a first discharge mode and a second discharge mode, and the controller 175 is electrically connected to the discharging unit 171 to control the discharging unit 171 to be in the first discharge mode or the second discharge mode. When the discharging unit 171 is in the first discharge mode, one of the first energy storage device 150 or the second energy storage device 160 supplies power to the outdoor moving device 100 and the other one of the first energy storage device 150 or the second energy storage device 160 does not supply power to the outdoor moving device 100. When the discharging unit 171 is in the second discharge mode, the first energy storage device 150 supplies power to the outdoor moving device 100 and the second energy storage device 160 also supplies power to the outdoor moving device 100. The controller 175 is configured to, when voltages of the second energy storage device 160 and the first energy storage device 150 are different, control the discharging unit 171 to be in the first discharge mode and when the voltages of the second energy storage device 160 and the first energy storage device 150 are the same, control the discharging unit 171 to be in the second discharge mode. In this manner, the first energy storage device 150 and the second energy storage device 160 can discharge together to provide sufficient electrical energy for the outdoor moving device 100. When the voltages of the first energy storage device 150 and the second energy storage device 160 are different, the discharging unit 171 is in the first discharge mode, and one of the first energy storage device 150 or the second energy storage device 160 which has a higher voltage discharges first.

The first energy storage device 150 and the second energy storage device 160 can discharge together only when the voltages of the first energy storage device 150 and the second energy storage device 160 are equal or basically equal, that is, the first energy storage device 150 and the second energy storage device 160 can discharge together only when a voltage difference between the first energy storage device 150 and the second energy storage device 160 is within a preset range. In this example, that the voltages of the first energy storage device 150 and the second energy storage device 160 are equal means that the voltage difference between the first energy storage device 150 and the second energy storage device 160 is less than a preset voltage difference threshold, where the preset voltage difference threshold may be 2 V or 1 V. The first energy storage device 150 and the second energy storage device 160 discharge together so that it can be ensured that a current in a discharging loop of the first energy storage device 150 and the second energy storage device 160 does not exceed a safe current value that the first energy storage device 150 and the second energy storage device 160 can withstand. This has the advantage that too large an output current of the outdoor moving device 100 can be avoided. The first energy storage device 150 and the second energy storage device 160 need to have equal or basically equal voltages to be capable of discharging together, that is, the discharging unit 171 is in the second discharge mode. That is, when the voltage difference between the first energy storage device 150 and the second energy storage device 160 is within the preset range, the following case can be avoided: due to a relatively large voltage difference between the first energy storage device 150 and the second energy storage device 160, the battery packs connected in parallel, when the first energy storage device 150 and the second energy storage device 160 discharge in parallel, the energy storage device with a high voltage charges the energy storage device with a low voltage, resulting in a reverse current flow, which is not conducive to the normal discharge of the first energy storage device 150 and the second energy storage device 160 and the normal operation of the outdoor moving device 100.

In other examples, when the discharging unit 171 is in the first discharge mode, the second energy storage device 160 supplies power to the outdoor moving device and the first energy storage device 150 does not supply power to the outdoor moving device. When the discharging unit 171 is in the second discharge mode, the first energy storage device 150 supplies power to the outdoor moving device and the second energy storage device 160 does not supply power to the outdoor moving device. The controller 175 is configured to, when remaining power of the second energy storage device 160 is greater than a preset value, control the discharging unit 171 to be in the first discharge mode and when the remaining power of the second energy storage device 160 is less than the preset value, control the discharging unit 171 to be in the second discharge mode. The second energy storage device 160 is preferably used for supplying power to the outdoor moving device, thereby ensuring that the first energy storage device 150 stores power in most cases and can be used for supplying power to the outdoor moving device or the power tool.

Specifically, maximum discharge power of the second energy storage device 160 is greater than or equal to 5 kW and less than or equal to 200 kW, and maximum discharge power of the first energy storage device 150 is greater than or equal to 1 kW and less than or equal to 10 kW. Alternatively, the maximum discharge power of the second energy storage device 160 is greater than or equal to 50 kW and less than or equal to 150 kW, and the maximum discharge power of the first energy storage device 150 is greater than or equal to 2 kW and less than or equal to 8 kW. In this manner, the first energy storage device 150 and the second energy storage device 160 have higher discharge efficiency. It is to be noted that the maximum discharge power is discharge power during the normal operation of the outdoor moving device 100, while abnormally large instantaneous discharge power occurring in the case where the outdoor moving device 100 has a locked-rotor or cuts some stones is not the maximum discharge power in this example.

The electrical energy output port 173 is used for outputting power to an external device and electrically connected to the second energy storage device 160 or the first energy storage device 150. The electrical energy output port 173 is directly electrically connected to the second energy storage device 160 so that the second energy storage device 160 can directly supply power to the external device. Alternatively, the outdoor moving device 100 directly supplies power to the external device by using the second energy storage device 160 and the first energy storage device 150 through the electrical energy output port 173, which is convenient for the user to use.

The charging unit 172 is electrically connected to the first energy storage device 150 and the second energy storage device 160 and also electrically connected to the controller 175 and the charging interface 174. The controller 175 controls the charging unit 172 to be electrically connected to an external power supply through the charging interface 174 so that the external power supply can supply power to the first energy storage device 150 and the second energy storage device 160 through the charging interface 174.

In this example, the charging unit 172 has a first charge mode and a second charge mode. The charging unit 172 in the first charge mode charges one of the first energy storage device 150 or the second energy storage device 160. The charging unit 172 in the second charge mode supplies power to the first energy storage device 150 and the second energy storage device 160 at the same time. The controller 175 is configured to, when the voltages of the first energy storage device 150 and the second energy storage device 160 are different, control the charging unit 172 to be in the first charge mode and when the voltages of the first energy storage device 150 and the second energy storage device 160 are basically the same, control the charging unit to be in the second charge mode. In this manner, when the voltages of the first energy storage device 150 and the second energy storage device 160 are different, the charging unit 172 is in the first charge mode and first charges one of the first energy storage device 150 or the second energy storage device 160 which has a lower voltage, and when the voltages of the first energy storage device 150 and the second energy storage device 160 are basically the same, the charging unit 172 switches to the second charge mode and can charge the first energy storage device 150 and the second energy storage device 160 at the same time. In this manner, not only can the first energy storage device 150 and the second energy storage device 160 more quickly satisfy the most basic requirement for power, but also the charge efficiency can be improved.

In other examples, the controller 175 may control the charging unit 172 to charge the first energy storage device 150 to a preset fully charged state and then charge the second energy storage device 160. Alternatively, the controller 175 may control the charging unit 172 to charge the second energy storage device 160 to the preset fully charged state and then charge the first energy storage device 150. Alternatively, the charging unit 172 is configured to charge the second energy storage device 160 to a first preset state, then charge the first energy storage device 150 to a second preset state, and then continue charging the second energy storage device 150. The second preset state may be a full capacity or another preset power value. After charged to the first preset state, the second energy storage device 160 has an ability to supply power to the outdoor moving device 100 for a certain time, so as to switch to the power supply to the first energy storage device 150 and ensure that the first energy storage device 150 can supply power to the power tool. In this manner, when the outdoor moving device 100 is charged for a short time or is not fully charged, the operation of the outdoor moving device 100 can still be achieved, and the first energy storage device 150 can supply power to the power tool, which is convenient for the user to use.

Optionally, to adapt to performance parameters of the second energy storage device 160 and the first energy storage device 150, a maximum charge current at which the charging unit 172 charges the second energy storage device 160 is greater than or equal to 0.04 C and less than or equal to 4 C, and a maximum charge current at which the charging unit 172 charges the first energy storage device 150 is greater than or equal to 0.04 C and less than or equal to 4 C. Therefore, the charging time of the first energy storage device 150 and the second energy storage device 160 can be controlled more effectively. The maximum charge current of the first energy storage device 150 is N C, which means that the first energy storage device 150 can be fully charged within 1/N hour. Similarly, the maximum charge current of the second energy storage device 160 is M C, which means that the second energy storage device 160 can be fully charged within 1/M hour. Alternatively, the maximum charge current at which the charging unit 172 charges the second energy storage device 160 is greater than or equal to 0.1 C and less than or equal to 4 C, and the maximum charge current at which the charging unit 172 charges the first energy storage device 150 is greater than or equal to 0.1 C and less than or equal to 4 C. Alternatively, the maximum charge current at which the charging unit 172 charges the second energy storage device 160 is greater than or equal to 0.5 C and less than or equal to 4 C, and the maximum charge current at which the charging unit 172 charges the first energy storage device 150 is greater than or equal to 0.5 C and less than or equal to 4 C. In this manner, the first energy storage device 150 and the second energy storage device 160 can be fully charged in a relatively short period of time.

A ratio of the maximum charge current at which the charging unit 172 charges the second energy storage device 160 to the maximum charge current at which the charging unit 172 charges the first energy storage device 150 is greater than or equal to 0.02 and less than or equal to 10, thereby adapting to energy characteristic settings of the second energy storage device 160 and the first energy storage device 150 and achieving the charging time adjustment of the second energy storage device 160 and the first energy storage device 150. Alternatively, the ratio of the maximum charge current at which the charging unit 172 charges the second energy storage device 160 to the maximum charge current at which the charging unit 172 charges the first energy storage device 150 is greater than or equal to 0.05 and less than or equal to 1. It is to be noted that the ratio of the maximum charge current at which the charging unit 172 charges the second energy storage device 160 to the maximum charge current at which the charging unit 172 charges the first energy storage device 150 refers to a ratio of the maximum charge current M C of the second energy storage device 160 to the maximum charge current N C of the first energy storage device 150, that is, a ratio of M to N.

Referring to FIGS. 1 and 3, the outdoor moving device 100 further includes a charging and discharging control circuit 176. The charging and discharging control circuit 176 includes the discharging unit 171 and the charging unit 172. Specifically, the charging and discharging control circuit 176 includes multiple drive switches that form a bridge circuit. The first energy storage device 150 may be provided with multiple battery packs. The first energy storage device 150 provided with two battery packs is used as an example. In this example, one battery pack may be considered as the second energy storage device 160 and another battery pack may be considered as a third energy storage device 180. The first energy storage device 150, the second energy storage device 160, and the third energy storage device 180 are connected in parallel. In this example, the charging and discharging control circuit 176 includes drive switches Q1, Q2, Q3, Q4, Q5, and Q6. The drive switches Q1 to Q6 may be semiconductor devices, such as metal-oxide-semiconductor field-effect transistors (MOSFETs) or insulated-gate bipolar transistors (IGBTs). Each drive switch is connected in parallel with a parasitic diode. The drive switch Q4 is a discharge switch of the first energy storage device 150, the drive switch Q1 is a charge switch of the first energy storage device 150, the drive switch Q5 is a discharge switch of the third energy storage device 180, the drive switch Q2 is a charge switch of the third energy storage device 180, the drive switch Q3 is a discharge switch of the second energy storage device 160, and the drive switch Q6 is a charge switch of the second energy storage device 160.

In a charging process, the charging and discharging control circuit 176 controls a charging sequence of the first energy storage device 150, the second energy storage device 160, and the third energy storage device 180. That is, in the charging process, the controller 175 controls the drive switches Q4, Q5, and Q6 to be turned on, the charging unit 172 charges the energy storage device with the lowest voltage, and the diode prevents the energy storage devices with higher voltages from being charged. The energy storage devices are charged until the voltages of multiple energy storage devices are consistent, and the charging unit 172 supplies power to the multiple energy storage devices at the same time, so as to ensure voltage consistency. For example, when the first energy storage device 150 has the lowest voltage and the second energy storage device 160 has the highest voltage, the controller 175 controls Q4, Q5, and Q6 to be turned on. At this time, the diode connected in parallel with the drive switch Q1 for the first energy storage device 150 is turned on, and the diodes connected in parallel with the drive switches Q2 and Q3 are turned off so that the external power supply connected to the charging interface 174 can supply power to only the first energy storage device 150, and the charging unit 172 is in the first charge mode. When the voltage of the first energy storage device 150 increases to be the same as the voltage of the third energy storage device 180, the diode connected in parallel with the drive switch Q2 is turned on. At this time, the external power supply connected to the charging interface 174 supplies power to the first energy storage device 150 and the third energy storage device 180. When the voltage of the first energy storage device 150 and the voltage of the third energy storage device 180 increase to be the same as the voltage of the second energy storage device 160, the diode connected in parallel with the drive switch Q3 is turned on. At this time, the external power supply connected to the charging interface 174 supplies power to the first energy storage device 150, the second energy storage device 160, and the third energy storage device 180 at the same time, and the charging unit 172 is in the second charge mode.

In a discharging process, the charging and discharging control circuit 176 controls a discharging sequence of the first energy storage device 150, the second energy storage device 160, and the third energy storage device 180. That is, in the discharging process, the controller 175 controls the drive switches Q1, Q2, and Q3 to be turned on, the discharging unit 171 discharges the energy storage device with the highest voltage firstly, and the diode prevents the energy storage devices with lower voltages from being discharged. The energy storage devices are discharged until the voltages of the multiple energy storage devices are consistent, and the discharging unit 171 discharges the multiple energy storage devices at the same time, so as to ensure the voltage consistency. For example, when the first energy storage device 150 has the lowest voltage and the second energy storage device 160 has the highest voltage, the controller 175 controls Q1, Q2, and Q3 to be turned on. At this time, the diode connected in parallel with the drive switch Q6 for the second energy storage device 160 is turned on, and the diodes connected in parallel with the drive switches Q4 and Q5 are turned off so that the second energy storage device 160 can supply power to the moving electric motor 130, and the discharging unit 171 is in the first discharge mode. When the voltage of the second energy storage device 160 decreases to be the same as the voltage of the third energy storage device 180, the diode connected in parallel with the drive switch Q5 is turned on, and at this time, the second energy storage device 160 and the third energy storage device 180 supply power to the moving electric motor at the same time. When the voltage of the second energy storage device 160 and the voltage of the third energy storage device 180 decrease to be the same as the voltage of the first energy storage device 150, the diode connected in parallel with the drive switch Q4 is turned on, the first energy storage device 150, the second energy storage device 160, and the third energy storage device 180 supply power to the moving electric motor 130 at the same time, and the discharging unit 171 is in the second discharge mode.

The second energy storage device 160 is configured to be capable of charging the first energy storage device 150, that is to say, when both the second energy storage device 160 and the first energy storage device 150 are mounted to the main body 100a, the second energy storage device 160 can charge the first energy storage device 150.

In this example, the total energy of the second energy storage device 160 is greater than the total energy of the first energy storage device 150. When remaining power of the first energy storage device 150 is insufficient, the second energy storage device 160 may charge the first energy storage device so that the platformed first energy storage device 150 can satisfy more working requirements of the user. In this example, a ratio of the total energy of the second energy storage device 160 to the total energy of the first energy storage device 150 is greater than or equal to 1 and less than or equal to 50. Alternatively, the ratio of the total energy of the second energy storage device 160 to the total energy of the first energy storage device 150 is greater than or equal to 2 and less than or equal to 20. Alternatively, the ratio of the total energy of the second energy storage device 160 to the total energy of the first energy storage device 150 is greater than or equal to 5 and less than or equal to 20. It is to be noted that, in this example, the total energy of the first energy storage device 150 may be understood as total energy of one battery pack 152 included in the first energy storage device 150 or may be understood as total energy of all the battery packs 152 included in the first energy storage device 150.

In this example, the total capacity of the second energy storage device 160 is greater than the total capacity of the first energy storage device 150. When the remaining power of the first energy storage device 150 is insufficient, the second energy storage device 160 may charge the first energy storage device so that the platformed first energy storage device 150 can satisfy more working requirements of the user. In this example, a ratio of the total capacity of the second energy storage device 160 to the total capacity of the first energy storage device 150 is greater than or equal to 1 and less than or equal to 50. Alternatively, the ratio of the total capacity of the second energy storage device 160 to the total capacity of the first energy storage device 150 is greater than or equal to 2 and less than or equal to 20. Alternatively, the ratio of the total capacity of the second energy storage device 160 to the total capacity of the first energy storage device 150 is greater than or equal to 5 and less than or equal to 20. It is to be noted that, in this example, the total capacity of the first energy storage device 150 may be understood as a total capacity of one battery pack 152 included in the first energy storage device 150 or may be understood as a total capacity of all the battery packs 152 included in the first energy storage device 150.

Optionally, the second energy storage device 160 is configured to charge the first energy storage device 150 when the remaining power of the first energy storage device 150 is less than a preset value. Therefore, when using the outdoor moving device 100 to work outdoors, the user may carry other power tools such as the blower 200a and a pruner and use the first energy storage device 150 to supply power to the power tool such as the blower 200a or the pruner; when the power of the first energy storage device 150 is used up, the user may charge the first energy storage device 150 again by using the second energy storage device 160. The second energy storage device 160 and the first energy storage device 150 form a power supply station as a whole so that the power supply time of the outdoor moving device 100 can be ensured, and the energy storage devices can be flexibly used.

Specifically, the charging unit 172 may be connected to the first energy storage device 150 and the second energy storage device 160 separately and transfer the power stored in the second energy storage device 160 to the first energy storage device 150.

Figure 3B:
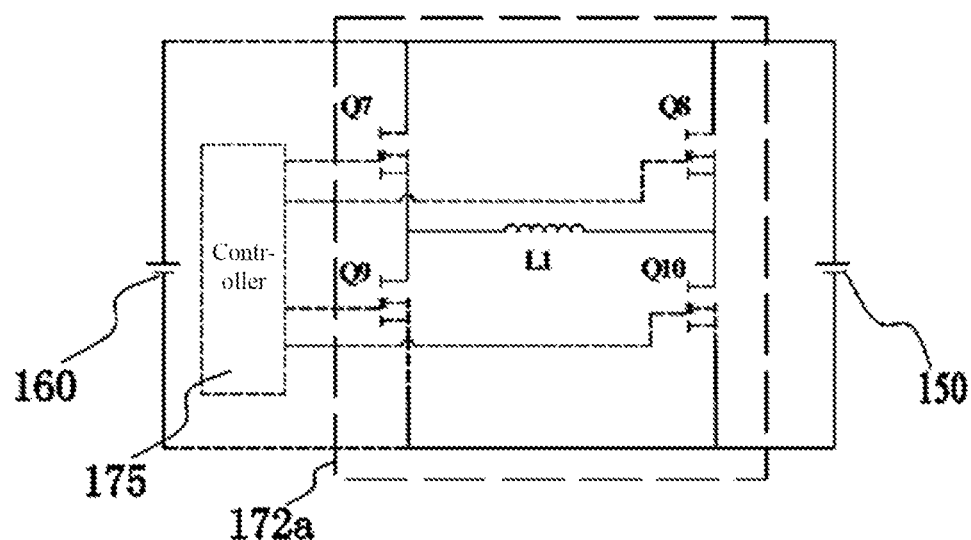
FIG. 3B is a circuit diagram in which a second energy storage device charges a first energy storage device.

As shown in FIGS. 13 and 3B, the charging unit 172 further includes a charging circuit 172a disposed between the first energy storage device 150 and the second energy storage device 160. The charging circuit 172a is electrically connected to the controller 175 so that the second energy storage device 160 can supply power to the first energy storage device 150. When the voltage of the second energy storage device 160 is higher than the voltage of the first energy storage device 150, the controller 175 can control the charging circuit 172a to adjust a charge current at which the second energy storage device 160 charges the first energy storage device 150 and reduce a charge voltage outputted by the second energy storage device 160 to the first energy storage device 150, thereby avoiding too high a temperature of the charging unit 172 caused by too large a charge current and the resulting danger, and improving the safety of the second energy storage device 160 charging the first energy storage device 150. When the voltage of the second energy storage device 160 is lower than the voltage of the first energy storage device 150, the controller 175 can control the charging circuit 172a to increase the charge voltage outputted by the second energy storage device 160 to the first energy storage device 150, thereby avoiding the case where the current is reversed and the first energy storage device 150 cannot be charged. Specifically, the charging circuit 172a includes a full bridge circuit composed of drive switches Q7, Q8, Q9, and Q10 and an inductor L1 connected between two bridge arms. The drive switches Q7, Q8, Q9, and Q10 may be semiconductor devices, such as MOSFETs or IGBTs. The second energy storage device 160 is connected to an input terminal of the charging circuit 172a, and the first energy storage device 150 is connected to an output terminal of the charging circuit 172a. The second energy storage device 160 supplies power to the first energy storage device 150 through the charging circuit 172a. The controller 175 is connected to control terminals of the drive switches Q7, Q8, Q9, and Q10 to control duty cycles of the drive switches Q7, Q8, Q9, and Q10, and an output voltage outputted by the second energy storage device 160 to the first energy storage device 150 is achieved by controlling the duty cycles of the drive switches Q7, Q8, Q9, and Q10. When the second energy storage device 160 charges the first energy storage device 150, the controller 175 controls the drive switch Q7 and the drive switch Q10 to be turned on and controls the drive switch Q8 and the drive switch Q9 to be turned off. In this manner, the charge current flows through the drive switch Q7, the inductor L1, and the drive switch Q10 in sequence so that power is stored in the inductor L1. Then, the controller 175 controls the drive switch Q8 and the drive switch Q9 to be turned off and controls the drive switch Q7 and the drive switch Q10 to be turned off. In this manner, the charge current flows through Q9 and the drive switch Q8 in sequence, thereby charging the first energy storage device 150. The charging circuit 172a is provided so that the second energy storage device 160 charges the first energy storage device 150 more safely and efficiently. In this manner, the flexibility and safety of the outdoor moving device 100 are improved.

A ratio of a maximum lifetime of the second energy storage device 160 when the outdoor moving device 100 is in a load-free operation state to a maximum lifetime of the first energy storage device 150 when the outdoor moving device is in the load-free operation state is greater than or equal to 1 and less than or equal to 50. Alternatively, the ratio of the maximum lifetime of the second energy storage device 160 when the outdoor moving device 100 is in the load-free operation state to the maximum lifetime of the first energy storage device 150 when the outdoor moving device 100 is in the load-free operation state is greater than or equal to 2 and less than or equal to 20. Alternatively, the ratio of the maximum lifetime of the second energy storage device 160 when the outdoor moving device 100 is in the load-free operation state to the maximum lifetime of the first energy storage device 150 when the outdoor moving device 100 is in the load-free operation state is greater than or equal to 3 and less than or equal to 10. In this manner, the relatively long lifetime of the outdoor moving device 100 can be satisfied while the dimensions of the outdoor moving device 100 are relatively small.

The outdoor moving device 100 further includes a first identification terminal and a second identification terminal, where the first identification terminal matches with the second energy storage device 160, and the second identification terminal matches with the first energy storage device 150. A type of the second energy storage device 160 and a type of the first energy storage device 150 are identified through the first identification terminal and the second identification terminal and the first energy storage device 150 and the second energy storage device 160 are allowed to be connected to a driver circuit and the charging circuit. Optionally, the first identification terminal and the second identification terminal are different. Optionally, the first identification terminal and the second identification terminal are the same.

The outdoor moving device 100 may include multiple mounting positions where first energy storage devices 150 are mounted so that multiple first energy storage devices 150 can be mounted to the outdoor moving device 100 and the user may mount one or more first energy storage devices 150 according to requirements. In this example, the outdoor moving device 100 is the riding mower, and the seat 111 of the riding mower is disposed substantially at the middle position of the main body 100a. The first energy storage device 150 and the second energy storage device 160 may be disposed on a rear side of the seat 111. The first energy storage device 150 is disposed on an upper side of the second energy storage device 160, that is, the second energy storage device 160 is fixedly connected to the outdoor moving device 100 and the first energy storage device 150 is pluggably mounted above the second energy storage device 160. The second energy storage device 160 and the first energy storage device 150 are stacked in an up and down direction so that the dimensions of the outdoor moving device 100 can be reduced, the structure of the outdoor moving device 100 is more compact, and thus the entire outdoor moving device 100 is more maneuverable. Moreover, the first energy storage device 150 is pluggably mounted above the second energy storage device 160, which is convenient for the user to detach and mount the first energy storage device 150. A direction along which the first energy storage device 150 is plugged and unplugged is inclined relative to the up and down direction, thereby facilitating the installation of the first energy storage device 150 by the user. A distance between the second energy storage device 160 and an axle of the rear moving wheels 131 in the front and rear direction is greater than or equal to 0 cm and less than or equal to 100 cm so that a center of gravity of the riding mower is disposed more reasonably. Alternatively, in other examples, the distance between the second energy storage device 160 and the axle of the rear moving wheels 131 in the front and rear direction is greater than or equal to 0 cm and less than or equal to 50 cm. Alternatively, in other examples, the distance between the second energy storage device 160 and the axle of the rear moving wheels 131 in the front and rear direction is greater than or equal to 0 cm and less than or equal to 20 cm. A distance of 0 cm between the second energy storage device 160 and the axle of the rear moving wheels 131 means that a projection of the second energy storage device 160 overlaps with a projection of the rear moving wheels 131. The distance in this example refers to a dimension of a gap between two devices in a certain direction.

In other examples, the first energy storage device 150 may be disposed on a front side of the second energy storage device 160.

In other examples, the first energy storage device 150 may be disposed on a rear side of the second energy storage device 160.

The second energy storage device 160 is disposed near the rear moving wheels 131 such that the projection of the second energy storage device 160 in the up and down direction at least partially overlaps with the projection of the rear moving wheels 131 in the up and down direction. The distance between the second energy storage device 160 and the axle of the rear moving wheels 131 in the front and rear direction is greater than or equal to 0 cm and less than or equal to 100 cm. A projection of the first energy storage device 150 in the up and down direction at least partially overlaps with the projection of the rear moving wheels 131 in the up and down direction, which is convenient for the user to mount the battery pack from the rear of the outdoor moving device. In a left and right direction, the second energy storage device 160 and the first energy storage device 150 are disposed basically on a central axis of the outdoor moving device 100.

A distance between a center of gravity of the second energy storage device 160 and the axle of the rear moving wheels 131 in the up and down direction is greater than or equal to 0 cm and less than or equal to 50 cm so that the center of gravity of the outdoor moving device 100 can be effectively lowered.

Figure 10:
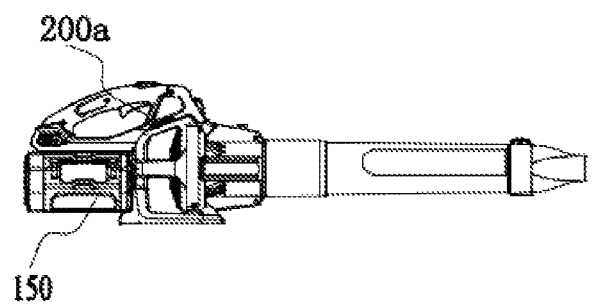
FIG. 10 is a plan view of a blower and a first energy storage device in FIG. 8.

A tool system 10 shown in FIG. 8 includes an adapter 310, the outdoor moving device 100, and a power tool, where the power tool may be the blower 200*a*, a grass trimmer 200*b*, or a chain saw 200*c*. The second energy storage device 160 in the outdoor moving device 100 is used for supplying power to the outdoor moving device. The first energy storage device 150 is detachable from the housing 110 to supply power to the power tool, in addition to supplying power to the outdoor moving device 100. As shown in FIG. 10, the battery pack 152 in the first energy storage device 150 may be detached to supply power to the blower 200*a*. The blower 200*a* is provided with a tool interface 201 mating with the battery pack interface 152*b*. The tool interface 201 may have the same structure as the main body interface in the outdoor moving device 100. In this manner, the adaptability of the battery pack 152 is further improved.

Figure 9:
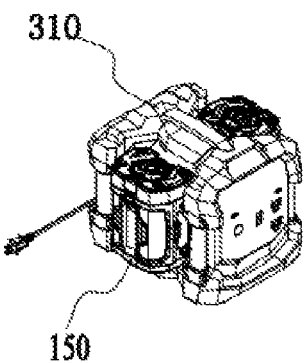
FIG. 9 is a perspective view of an adapter and a first energy storage device in FIG. 8.

In this example, the tool system 10 further includes a charging device 320 for charging the outdoor moving device. The charging device 320 may be considered as a part of the outdoor moving device 100. The charging device 320 can mate with the charging interface 174 in FIG. 3, and the charging device 320 can be electrically connected to the external power supply so that the charging device 320 can electrically connect the external power supply to the charging interface 174, thereby supplying power to the first energy storage device 150 and the second energy storage device 160. In addition to being detachable to charge other power tools, the first energy storage device 150 may be charged by charging devices or charging platforms of other power tools. In other words, in addition to being charged in the outdoor moving device 100, the first energy storage device 150 may be detached to be separately charged by other charging devices so that the second energy storage device 160 and the first energy storage device 150 can be charged by different charging platforms at the same time, so as to achieve the purpose of fast charging. For example, in this example, the tool system 10 further includes the adapter 310, where power may be supplied to the first energy storage device 150 through the adapter when the first energy storage device 150 is detached from the outdoor moving device 100. In this manner, for the user working outdoors, power may be supplied to the first energy storage device 150 through the adapter 310 when no charging device 320 exists nearby. In this manner, when both the remaining power of the first energy storage device 150 and the remaining power of the second energy storage device 160 of the outdoor moving device 100 are insufficient, the first energy storage device 150 may be charged through the adapter 310 in time so that the lifetime of the outdoor moving device 100 can be improved. The adapter 310 is also configured to be a platformed and widely applicable charger. In this manner, the tool system 10 can better adapt to work requirements of both a home DIY (do it yourself) user and a commercial professional user so that the utility of the tool system can be improved. In this manner, the flexibility of the first energy storage device 150 in the outdoor moving device 100 is further improved. In this example, the adapter 310 is provided with an adapter interface 311 capable of mating with the first energy storage device 150. As shown in FIG. 9, the first energy storage device 150 is detachably mounted to the adapter 310, where the adapter 310 can continuously charge the first energy storage device 150.

In this example, a nominal voltage of the battery pack 152 included in the first energy storage device 150 is 56 V. It is to be understood that a nominal voltage of the first energy storage device 150 may be greater than or equal to 20 V and less than or equal to 100 V, or the nominal voltage of the first energy storage device 150 may be greater than or equal to 36 V and less than or equal to 80 V, or the nominal voltage of the first energy storage device 150 may be greater than or equal to 40 V and less than or equal to 60 V. Alternatively, the nominal voltage of the first energy storage device 150 may be greater than or equal to 100 V and less than or equal to 800 V. It is to be understood that the nominal voltage of the first energy storage device 150 may be 20 V, 24 V, 36 V, 40 V, 48 V, 56 V, 60 V, 80 V, 100 V, 400 V, or 800 V. In this manner, the voltage of the first energy storage device 150 can be adapted to a voltage platform of the second energy storage device 160 so that the total energy of the second energy storage device 160 can be increased.

A nominal voltage of the second energy storage device 160 is the same as the nominal voltage of the first energy storage device 150. It is to be understood that the nominal voltage of the second energy storage device 160 may be different from the nominal voltage of the first energy storage device 150. The nominal voltage of the second energy storage device 160 may be greater than or equal to 20 V and less than or equal to 100 V, or the nominal voltage of the second energy storage device 160 may be greater than or equal to 36 V and less than or equal to 80 V, or the nominal voltage of the second energy storage device 160 may be greater than or equal to 40 V and less than or equal to 60 V. Alternatively, the nominal voltage of the second energy storage device 150 may be greater than or equal to 100 V and less than or equal to 800 V. It is to be understood that the nominal voltage of the second energy storage device 160 may be 20 V, 24 V, 36 V, 40 V, 48 V, 56 V, 60 V, 80 V, 100 V, 400V, or 800 V. In this manner, the voltage of the second energy storage device 160 can be adapted to a voltage platform of the first energy storage device 150, which can be adapted to more power tools.

In this example, the total capacity of the first energy storage device 150 is greater than or equal to 4 Ah and less than or equal to 80 Ah. Alternatively, the total capacity of the first energy storage device 150 is greater than or equal to 10 Ah and less than or equal to 40 Ah. Alternatively, the total capacity of the first energy storage device 150 is greater than or equal to 20 Ah and less than or equal to 60 Ah. In this manner, the first energy storage device 150 can satisfy both the lifetime requirements of other power tools and the requirement of other power tools for relatively small dimensions. The total capacity of the second energy storage device 160 is greater than or equal to 10 Ah and less than or equal to 500 Ah. Alternatively, the total capacity of the second energy storage device 160 is greater than or equal to 20 Ah and less than or equal to 500 Ah. Alternatively, the total capacity of the second energy storage device 160 is greater than or equal to 40 Ah and less than or equal to 400 Ah. Alternatively, the total capacity of the second energy storage device 160 is greater than or equal to 60 Ah and less than or equal to 600 Ah. In this manner, the second energy storage device 160 can satisfy the requirement of the outdoor moving device 100 for working for more than half a day and can be adapted to the dimensions of the outdoor moving device 100.

Alternatively, the total capacity of the first energy storage device 150 is greater than or equal to 4 Ah and less than or equal to 10 Ah. Alternatively, the total capacity of the first energy storage device 150 is greater than or equal to 10 Ah and less than or equal to 20 Ah. Alternatively, the total capacity of the first energy storage device 150 is greater than or equal to 20 Ah and less than or equal to 30 Ah. Alternatively, the total capacity of the first energy storage device 150 is greater than or equal to 30 Ah and less than or equal to 40 Ah. Alternatively, the total capacity of the first energy storage device 150 is greater than or equal to 50 Ah and less than or equal to 60 Ah. Alternatively, the total capacity of the first energy storage device 150 is greater than or equal to 60 Ah and less than or equal to 80 Ah. The total capacity of the second energy storage device 160 is greater than or equal to 10 Ah and less than or equal to 20 Ah. Alternatively, the total capacity of the second energy storage device 160 is greater than or equal to 20 Ah and less than or equal to 40 Ah. Alternatively, the total capacity of the second energy storage device 160 is greater than or equal to 40 Ah and less than or equal to 60 Ah. Alternatively, the total capacity of the second energy storage device 160 is greater than or equal to 60 Ah and less than or equal to 80 Ah. Alternatively, the total capacity of the second energy storage device 160 is greater than or equal to 80 Ah and less than or equal to 100 Ah. Alternatively, the total capacity of the second energy storage device 160 is greater than or equal to 100 Ah and less than or equal to 200 Ah. Alternatively, the total capacity of the second energy storage device 160 is greater than or equal to 200 Ah and less than or equal to 400 Ah. Alternatively, the total capacity of the second energy storage device 160 is greater than or equal to 400 Ah and less than or equal to 600 Ah.

The total energy of the first energy storage device 150 is greater than or equal to 100 Wh and less than or equal to 4000 Wh. The total energy of the first energy storage device 150 is greater than or equal to 100 Wh and less than or equal to 1500 Wh. The total energy of the second energy storage device 160 is greater than or equal to 1 kWh and less than or equal to 30 kWh. Alternatively, in other examples, the total energy of the first energy storage device 150 is greater than or equal to 300 Wh and less than or equal to 1000 Wh. The total energy of the second energy storage device 160 is greater than or equal to 2 kWh and less than or equal to 20 kWh. Alternatively, in other examples, the total energy of the first energy storage device 150 is greater than or equal to 300 Wh and less than or equal to 8000 Wh. The total energy of the second energy storage device 160 is greater than or equal to 5 kWh and less than or equal to 20 kWh. In this manner, the total capacity of the first energy storage device 150 and the total capacity of the second energy storage device 160 are more reasonable, that is, the outdoor moving device 100 can work outdoors for more than one hour while the dimensions of the outdoor moving device 100 can be reduced as much as possible. Moreover, the total capacity of the first energy storage device 150 and the total capacity of the second energy storage device 160 can satisfy both the requirement of the professional user for working outdoors all day long and the requirement of the DIY user for working for a relatively long time and the relatively small dimensions of the device.

As a specific example, the total energy of the first energy storage device 150 is 4000 Wh. The total energy of the second energy storage device 160 is 20 kWh. In this manner, when both the first energy storage device 150 and the second energy storage device 160 of the outdoor moving device 100 are in the fully charged states, the outdoor moving device 100 can mow the grass through the second energy storage device for four to six hours, and another power tool to which the first energy storage device 150 can be mounted can work for four to five hours. For example, the blower 200a blows fallen leaves or weeds for one hour, the grass trimmer 200b trims grass for one hour, the pruner prunes shrubs for one hour, and the chain saw 200c cuts branches for one hour. In this manner, a professional garden maintenance person can work all day long by using the first energy storage device 150 and the second energy storage device 160 provided on the outdoor moving device 100 and can perform various tasks required for garden maintenance.

In this example, a distance between the second energy storage device 160 and the first energy storage device 150 in the left and right direction is greater than or equal to 0 cm and less than or equal to 50 cm.

Figure 14:
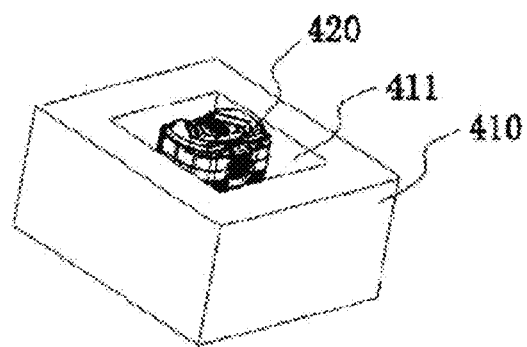
FIG. 14 is a perspective view of a first energy storage device and a second energy storage device according to another example.

As shown in FIG. 14, a groove 411 is surrounded by a second energy storage device 410, and a first energy storage device 420 is at least partially disposed in the groove 411. The second energy storage device 410 forms a mounting structure for mounting the first energy storage device 420 so that the cost is reduced while the overall structure is compact.

Figure 15:
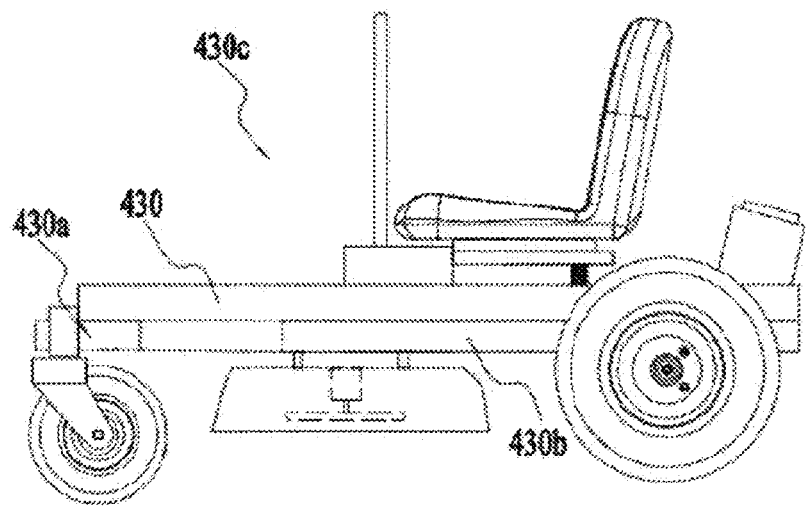
FIG. 15 is a plan view of a riding mower according to another example.

Optionally, referring to FIG. 15, a second energy storage device 430 is in the shape of a plate that is arranged along an extension direction of a main body 430a, the second energy storage device 430 is disposed inside a housing 430b, and the second energy storage device 430 and the housing 430b together form a frame or a baseplate of an outdoor moving device 430c so that the volume of the outdoor moving device 430c can be reduced and the structure of the outdoor moving device 430c is more compact.

Figure 16:
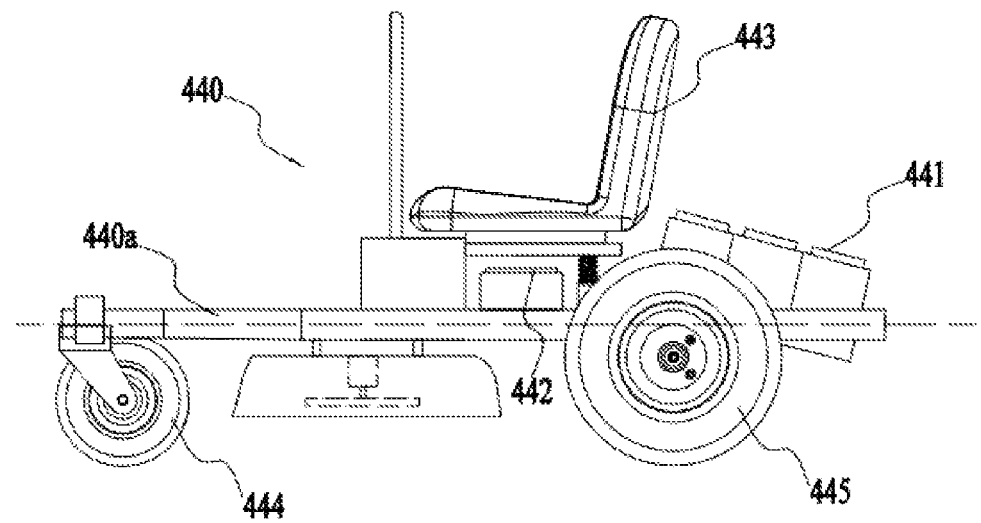
FIG. 16 is a plan view of a riding mower according to another example.

An outdoor moving device shown in FIG. 16 is a riding mower 440. A first energy storage device 441 and a second energy storage device 442 are separated from each other. The first energy storage device 441 includes a first battery pack, and the second energy storage device 442 is fixedly disposed on a lower side of a seat 443 so that a center of gravity G of the whole machine along the front and rear direction can be as close to the seat 443 and front moving wheels 444 as possible. In this manner, the problem of a cocked front end of the riding mower 440 climbing a slope can be effectively avoided; and the positive pressure of the front moving wheels 444 on the ground can be increased, thereby increasing the grip of the front moving wheels 444 and preventing the riding mower 440 from slipping on the ground. Further, particularly when a grass collecting device is disposed at a rear end of the riding mower 440, the second energy storage device 442 is disposed on the lower side of the seat 443 so that the center of gravity G of the riding mower 440 can be effectively lowered, thereby improving the stability of the whole machine. Further, the second energy storage device 442 is disposed on a front side of rear moving wheels 445.

In addition, in this example, the second energy storage device 442 may be fixedly mounted to a frame 440*a* of a main body, that is to say, the second energy storage device 442 cannot be quickly detached by the user without an auxiliary tool. In this manner, the second energy storage device 442 can continuously supply power to the riding mower 440, thereby avoiding the problem of a failure of the riding mower 440 to move when both the first energy storage device 441 and the second energy storage device 442 are detached by the user and cannot supply power to the riding mower 440.

It is not limited that the second energy storage device 442 is disposed on the lower side of the seat 443. In fact, any position of the second energy storage device 442 falls within the scope of the present application as long as the position of the second energy storage device 442 is different from the position of the first energy storage device 441 for reasons such as balancing performance or structural adaptation of the whole machine.

In this example, a distance between the second energy storage device 442 and the first energy storage device 441 in the front and rear direction is greater than or equal to 0 cm and less than or equal to 200 cm. Alternatively, in other examples, the distance between the second energy storage device 442 and the first energy storage device 441 in the front and rear direction is greater than or equal to 0 cm and less than or equal to 50 cm. Alternatively, in other examples, the distance between the second energy storage device 442 and the first energy storage device 441 in the front and rear direction is greater than or equal to 0 cm and less than or equal to 30 cm. The second energy storage device 442 and the first energy storage device 441 are arranged in the front and rear direction so that the center of gravity of the entire outdoor moving device can be lowered, and the outdoor moving device can move more smoothly. It is to be noted that the distance between the second energy storage device 442 and the first energy storage device 441 refers to a dimension of a gap between the second energy storage device 442 and the first energy storage device 441 in the front and rear direction.

Figure 17:
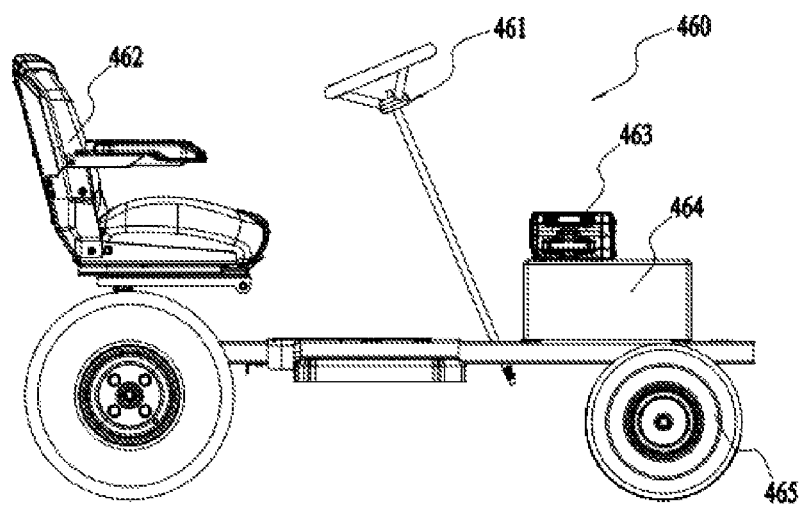
FIG. 17 is a plan view of a riding mower according to another example.

An outdoor moving device 460 shown in FIG. 17 is also a riding mower, which differs from the outdoor moving device 100 mainly in the structure of an operating assembly 461, the position of a seat 462, the position of a first energy storage device 463, and the position of a second energy storage device 464.

In this example, the seat 462 is disposed on a rear side of a main body, and the operating assembly 461 includes a steering wheel for the user to operate. Both the first energy storage device 463 and the second energy storage device 464 are disposed on a front side of the seat 462. The first energy storage device 463 is disposed on an upper side of the second energy storage device 464. A distance between the second energy storage device 464 and front moving wheels 465 in the front and rear direction is greater than or equal to 0 cm and less than or equal to 200 cm. Optionally, the first energy storage device 463 is disposed near the front moving wheels 465 and a projection of the first energy storage device 463 in the up and down direction at least partially overlaps with a projection of the front moving wheels 465 in the up and down direction. Alternatively, in other examples, the distance between the second energy storage device 464 and the front moving wheels 465 in the front and rear direction is greater than or equal to 0 cm and less than or equal to 100 cm. Alternatively, in other examples, the distance between the second energy storage device 464 and the front moving wheels 465 in the front and rear direction is greater than or equal to 0 cm and less than or equal to 50 cm. Alternatively, in other examples, the distance between the second energy storage device 464 and the front moving wheels 465 in the front and rear direction is greater than or equal to 0 cm and less than or equal to 20 cm.

Figure 18:
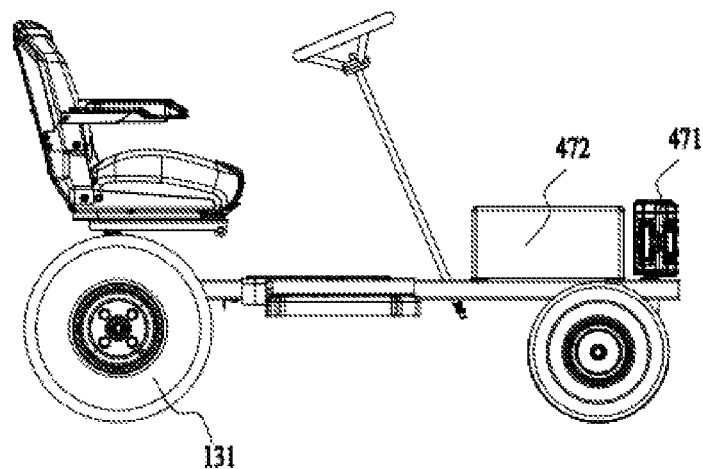
FIG. 18 is a plan view of a riding mower according to another example.

Alternatively, in an example shown in FIG. 18, a first energy storage device 471 may be disposed on a front side of a second energy storage device 472, which is convenient for the user to detach the first energy storage device 471.

Figure 19:
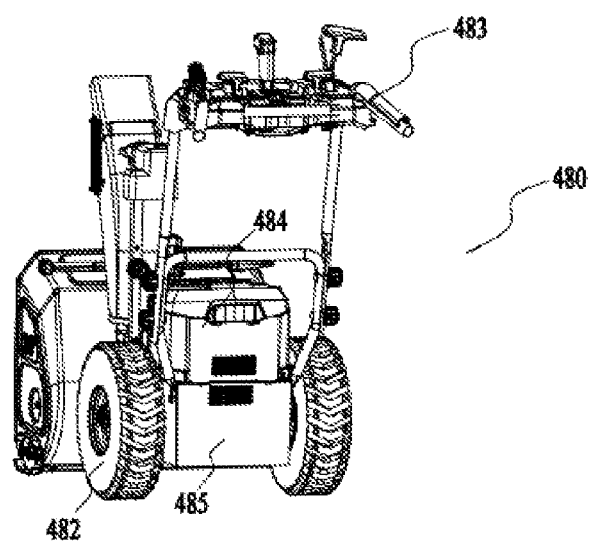
FIG. 19 is a perspective view of a snow thrower according to another example.

An outdoor moving device shown in FIG. 19 may be a snow thrower 480, where a functional assembly of the snow thrower 480 is an auger that can be driven by a drive electric motor to rotate to perform a snow throwing operation. The snow thrower 480 may be a push snow thrower, the snow thrower 480 includes moving wheels 482 and a handle 483, and the user pushes the handle 483 to drive the moving wheels 482 to rotate so that the snow thrower 480 moves. The push snow thrower 480 includes only the drive electric motor for driving the auger and is not provided with a moving electric motor for driving the moving wheels. Since the snow thrower 480 works at a relatively low temperature, optionally, the outdoor moving device further includes a heating device and/or a warming device for warming a first energy storage device 484 and/or a second energy storage device 485 included in the snow thrower 480, so as to prevent the first energy storage device 484 or the second energy storage device 485 using a specific battery material from being disturbed by a low-temperature environment to fail to operate normally.

Optionally, both the first energy storage device 484 and the second energy storage device 485 are disposed between two moving wheels 482 of the snow thrower 480 and below the handle 483. The first energy storage device 484 may be disposed above the second energy storage device 485, which is convenient for the user to plug and unplug the first energy storage device 484. A space between the handle 483 and the moving wheels 482 is made full use of so that the entire snow thrower 480 is compact, and a center of gravity of the entire snow thrower 480 is reasonable, which is convenient for the user to control the snow thrower 480 to move.

Figure 20:
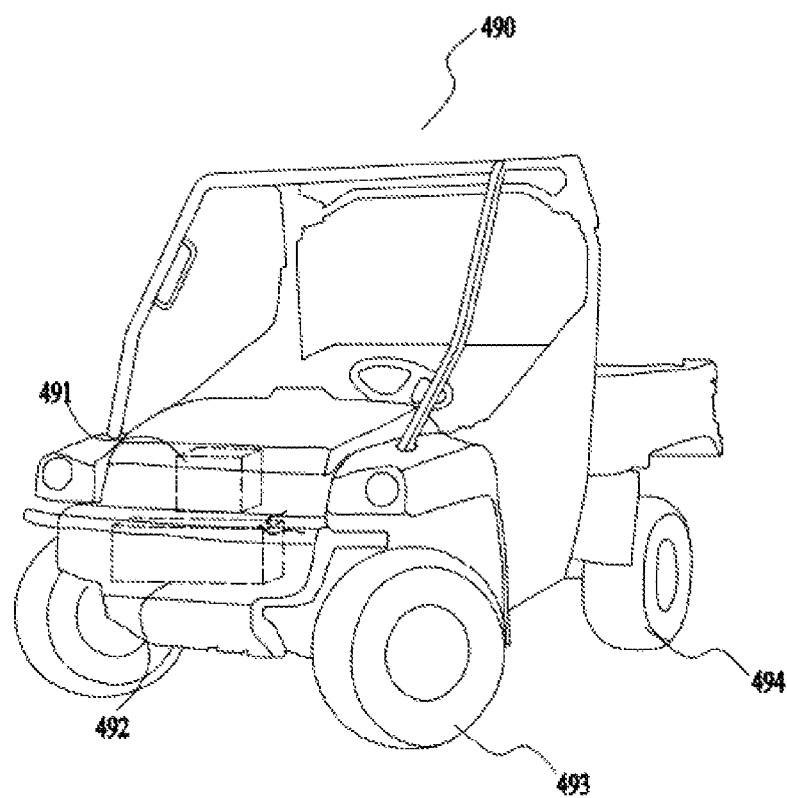
FIG. 20 is a perspective view of an all-terrain vehicle according to another example.

An outdoor moving device shown in FIG. 20 may be an all-terrain vehicle 490, and a first energy storage device 491 and a second energy storage device 492 may be disposed at a front end of a vehicle body and inside a hood. The first energy storage device 491 and the second energy storage device 492 are disposed near front moving wheels 493, and the first energy storage device 491 is disposed on an upper side of the second energy storage device 492. Optionally, the first energy storage device 491 and the second energy storage device 492 may be disposed near rear moving wheels 494.

Figure 21:
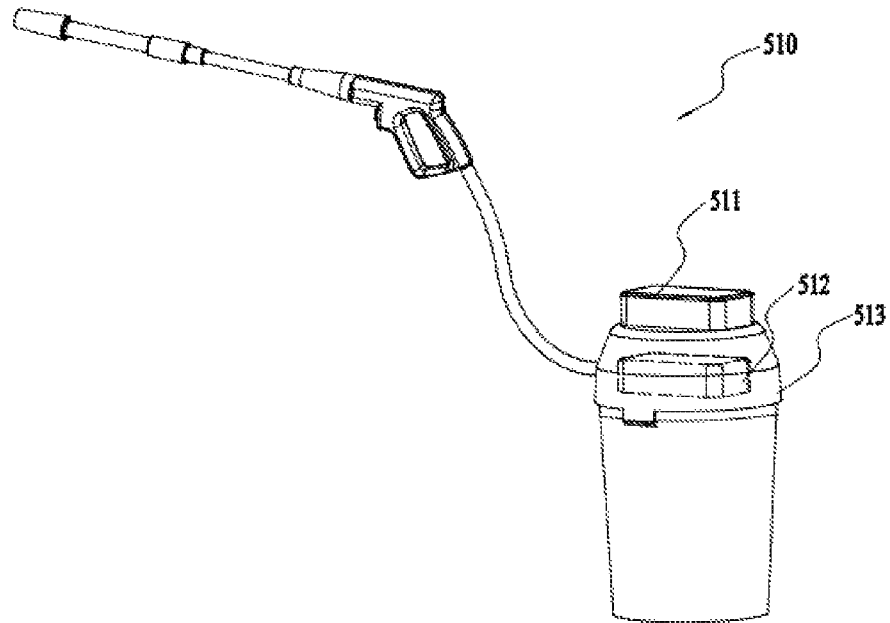
FIG. 21 is a perspective view of an outdoor tool device according to another example.

As shown in FIG. 21, the outdoor moving device may be a washer 510, where the washer 510 may include a first energy storage device 511 and a second energy storage device 512. The first energy storage device 511 is detachably mounted to a housing 513, and the second energy storage device 512 is fixedly mounted to the housing 513.

The outdoor moving device shown in FIGS. 1 to 13 further includes a mounting portion for mounting an energy storage device. The mounted energy storage device may be a lithium iron phosphate battery. To ensure that the outdoor moving device 100 can obtain the power that satisfies working requirements, total energy of the mounted energy storage device is greater than or equal to 0.5 kWh. In an example, a total capacity of the energy storage device mounted by the mounting portion may be greater than or equal to 10 Ah.

In an example, the mounting portion may include a first mounting portion 1511 for mounting or placing the first energy storage device 150 and a second mounting portion 1611 for mounting the second energy storage device 160. The first mounting portion 1511 and the second mounting portion 1611 may each be an accommodation cavity, a mounting surface, a mounting groove, or the like. In this example, the first mounting portion 1511 may be located on an upper side or a front side or a rear side of the second mounting portion 1611.

In this example, the second energy storage device 160, as a power supply device specially adapted to the outdoor moving device, has relatively large total energy that is generally greater than 0.5 kWh. The first energy storage device 150, as a power supply device adaptable to both the outdoor moving device and other power tools, has a relatively large range within which a total capacity changes. When the first energy storage device 150 has a relatively small total capacity, the first energy storage device 150 cannot support the operation of the outdoor moving device 100. When both the second energy storage device 160 and the first energy storage device 150 are mounted to the outdoor moving device 100, total energy of the second energy storage device 160 and the first energy storage device 150 is greater than 0.5 kWh so that the outdoor moving device 100 can work outdoors for a long time. However, when only one energy storage device is mounted to the outdoor moving device 100 or when two energy storage devices are mounted but one energy storage device supplies power abnormally, it needs to be ensured that the total energy of the energy storage device that can supply power normally is greater than 0.5 kWh. For example, when the first energy storage device 150 is mounted to the outdoor moving device 100 or when two energy storage devices are mounted but the second energy storage device 160 supplies power abnormally, it must be ensured that the total energy of the first energy storage device 150 is greater than 0.5 kWh, that is, a sum of energy of all the first energy storage units 151 in the first energy storage device 150 is greater than 0.5 kWh.

In an example, when the second energy storage device 160 supplies power abnormally, it must be ensured that the total capacity of the first energy storage device 150 is greater than 10 Ah, that is, a sum of capacities of all the first energy storage units 151 in the first energy storage device 150 is greater than 10 Ah. For example, if a capacity of each first energy storage unit 151 in the first energy storage device 150 is 2.5 Ah, at least five first energy storage units 151 in the first energy storage device 150 are required to ensure that the device can normally supply power to the outdoor moving device 100. In other words, only when the total capacity of the energy storage device mounted in the outdoor moving device 100 is greater than or equal to 10 Ah, can the controller allow the outdoor moving device 100 to start to move, mow grass, or perform other operations. It is to be noted that the total capacity of the first energy storage device 150 or the total capacity of the second energy storage device 160 refers to the capacity of the fully charged energy storage device.

In an example, the first energy storage device 150 includes multiple first energy storage units 151 and the second energy storage device 160 includes multiple second energy storage units 161. The second energy storage device 160 may be fixed on the housing 110 through the connection assembly, where the connection assembly may be a fastener such as a screw. While the second energy storage device 160 is fixedly connected to the housing 110, the first energy storage device 150 is detachably mounted to the housing 110, and the first energy storage device 150 is further configured to be detachable from the housing 110 to supply power to another power tool. In this example, the discharging unit 171 can control the two energy storage devices to be discharged simultaneously or separately or cyclically to supply power to the moving electric motor in the outdoor moving device 100. To adapt to the performance parameters of the second energy storage device 160 and the first energy storage device 150, a maximum discharge current at which the discharging unit 171 discharges the first energy storage device 150 is greater than or equal to 0.04 C and less than or equal to 4 C, and a maximum discharge current at which the discharging unit 171 discharges the second energy storage device 160 is greater than or equal to 0.04 C and less than or equal to 4 C. Therefore, the discharging time of the first energy storage device 150 and the second energy storage device 160 can be controlled more effectively. The maximum discharge current of the first energy storage device 150 is X C, which means that the first energy storage device 150 can be fully discharged within 1/X hour. Similarly, the maximum discharge current of the second energy storage device 160 is Y C, which means that the second energy storage device 160 can be fully discharged within 1/Y hour.

A ratio of the maximum discharge current at which the discharging unit 171 discharges the second energy storage device 160 to the maximum discharge current at which the discharging unit 171 discharges the first energy storage device 150 is greater than or equal to 0.01 and less than or equal to 10, thereby adapting to the energy characteristic settings of the second energy storage device 160 and the first energy storage device 150 and adjusting the discharging time or the discharging sequence of the second energy storage device 160 and the first energy storage device 150. Alternatively, the ratio of the maximum charge current at which the charging unit 172 charges the second energy storage device 160 to the maximum charge current at which the charging unit 172 charges the first energy storage device 150 is greater than or equal to 0.01 and less than or equal to 10. It is to be noted that the ratio of the maximum charge current at which the charging unit 172 charges the second energy storage device 160 to the maximum charge current at which the charging unit 172 charges the first energy storage device 150 refers to a ratio of the maximum charge current Y C of the second energy storage device 160 to the maximum charge current X C of the first energy storage device 150, that is, a ratio of Y to X.

When controlling the discharging unit 171 to discharge one energy storage device or two energy storage devices, the controller 175 may monitor a voltage of at least one first energy storage unit 151 or a voltage of at least one second energy storage unit 161. The controller 175 is configured to, when a discharge voltage of any first energy storage unit 151 is less than or equal to a first voltage threshold, control the discharging unit 171 to limit discharge of the first energy storage device 150. Specifically, to stop the discharge of the first energy storage device 150 is to cut off a power supply path of the first energy storage device 150 or to reduce a magnitude of the discharge current of the first energy storage device 150. For example, the discharge current of the first energy storage device 150 is gradually reduced or the first energy storage device 150 is continuously discharged at a relatively small discharge current. The controller 175 is further configured to, when a discharge voltage of any second energy storage unit 161 is less than or equal to a second voltage threshold, control the discharging unit 171 to limit discharge of the second energy storage device 160. Specifically, to stop the discharge of the second energy storage device 160 is to cut off a power supply path of the second energy storage device 160 or to reduce a magnitude of the discharge current of the second energy storage device 160. For example, the discharge current of the second energy storage device 160 is gradually reduced or the second energy storage device 160 is continuously discharged at a relatively small discharge current. The first voltage threshold is an undervoltage threshold when the first energy storage device 150 is discharged, and the second voltage threshold is an undervoltage threshold when the second energy storage device 160 is discharged. In a discharging process of each energy storage device, when the discharge voltage of the energy storage device is less than or equal to its respective undervoltage threshold, the energy storage device can no longer normally supply power.

In an optional example, both the first energy storage device 150 and the second energy storage device 160 are mounted to the outdoor moving device 100 and supply power to the outdoor moving device 100. That is, when the discharging unit 171 is in the second discharge mode, if the discharge voltage of the first energy storage device 150 is greater than the first voltage threshold, that is, when the first energy storage device 150 is in an undervoltage state, the controller 175 may limit power of the moving electric motor or limit power of the drive electric motor or limit power of the two electric motors at the same time. If the discharge voltage of the second energy storage device 160 is greater than the second voltage threshold, that is, when the second energy storage device 160 is in the undervoltage state, the controller 175 may limit the power of the moving electric motor or limit the power of the drive electric motor or limit the power of the two electric motors at the same time. Alternatively, when the two energy storage devices are both in the undervoltage state, the controller 175 may limit the power of the moving electric motor or limit the power of the drive electric motor or limit the power of the two electric motors at the same time. When the discharging unit 171 is in the first discharge mode, when the currently discharged energy storage device is in the undervoltage state, the controller 175 may limit the power of the moving electric motor or limit the power of the drive electric motor or limit the power of the two electric motors at the same time.

In an optional example, if the first energy storage device 150 is in the undervoltage state, the controller 175 may limit the discharge of the first energy storage device 150 and limit the power of the moving electric motor or limit the power of the drive electric motor or limit the power of the two electric motors at the same time. If the second energy storage device 160 is in the undervoltage state, the controller 175 may limit the discharge of the second energy storage device 160 and limit the power of the moving electric motor or limit the power of the drive electric motor or limit the power of the two electric motors at the same time. Specifically, the power of the electric motor may be limited by limiting a rotational speed or output torque of the electric motor.

In this example, a difference between the first voltage threshold and the second voltage threshold is less than or equal to 1 V so that the two energy storage devices can be adapted to more flexible discharge management and control. The first voltage threshold may be greater than or equal to the second voltage threshold or may be less than the second voltage threshold. Alternatively, the difference between the first voltage threshold and the second voltage threshold is less than or equal to 0.5 V. For example, the discharge of the first energy storage device 150 may be limited when the voltage of the first energy storage unit 151 is less than or equal to 2.5 V, and the discharge of the second energy storage device 160 may be limited when the voltage of the second energy storage unit 161 is less than or equal to 2.7 V.

The controller 175 is configured to, when half of a discharge voltage of two first energy storage units 151 is less than or equal to the first voltage threshold, control the discharging unit 171 to limit the discharge of the first energy storage device 150 or when half of a discharge voltage of two second energy storage units 161 is less than or equal to the second voltage threshold, control the discharging unit 171 to limit the discharge of the second energy storage device 160. Therefore, the effect on the discharge control performance of the inaccurate detection of the discharge voltage due to a relatively small voltage of a single energy storage unit can be avoided.

In this example, the first voltage threshold or the second voltage threshold gradually decreases as the discharge current of the first energy storage device 150 or the discharge current of the second energy storage device 160 gradually increases. In other words, the undervoltage threshold when the first energy storage device 150 is discharged is inversely proportional to the magnitude of the discharge current of the device, and the undervoltage threshold when the second energy storage device 160 is discharged is inversely proportional to the magnitude of the discharge current of the device.

In this example, the total energy of the second energy storage device 160 is greater than the total energy of the first energy storage device 150. When the remaining power of the first energy storage device 150 is insufficient, the second energy storage device 160 may charge the first energy storage device so that the platformed first energy storage device 150 can satisfy more working requirements of the user. When the discharge current of the first energy storage device 150 is greater than a first current threshold, it may be considered that the first energy storage device 150 is likely to be overdischarged and the controller 175 may limit the power supply from the first energy storage device 150. Specifically, the discharging loop of the first energy storage device 150 may be cut off or the discharge current of the first energy storage device 150 may be reduced. In this example, when the discharge current of the second energy storage device 160 is greater than a second current threshold in a discharging process, the controller 175 may control the discharging unit 171 to limit the discharge of the second energy storage device 160, for example, to reduce the discharge current of the second energy storage device 160 or cut off a discharging loop. Particularly, the first current threshold is less than or equal to the second current threshold, that is, an overcurrent protection threshold of the second energy storage device 160 is greater than or equal to an overcurrent protection threshold of the first energy storage device 150.

In this example, the first positive electrode 151$a$ of at least one first energy storage unit 151 included in the first energy storage device 150 is made of the first material, and the second positive electrode 161$a$ of at least one second energy storage unit 161 included in the second energy storage device 160 is made of the second material. For example, the second positive electrode 161$a$ is made of lithium iron phosphate, and the first positive electrode 151$a$ is made of a material containing lithium. The first material and the second material may also be selected from nickel-cadmium batteries, graphene, and other materials, so as to achieve different combinations of battery characteristics.

In this example, the controller 175 may determine, according to a Joule integral value of the discharge current of the energy storage device over a period of time, whether the energy storage device is likely to be overdischarged. The period of time is greater than or equal to 3 s and less than or equal to 120 s and may be, for example, 3 s, 5 s, 10 s, 20 s, 30 s, 40 s, 50 s, 60 s, 100 s, 120 s, or the like. For example, the controller 175 may compare a magnitude of the Joule integral value of the discharge current over 60 s with a current threshold to determine whether the corresponding energy storage device is overdischarged.

When the energy storage device is overdischarged, the controller 175 may control the discharging unit 171 to limit the discharge of the corresponding energy storage device, for example, to cut off the discharging loop or reduce the discharge current. In an optional example, when the discharge current of the energy storage device is greater than the overcurrent protection threshold of the energy storage device, the controller 175 may limit the power of the moving electric motor or limit the power of the drive electric motor or limit the power of the two electric motors at the same time. Specifically, the power of the electric motor may be limited by limiting the rotational speed or output torque of the electric motor. The power of the electric motor is output power of the electric motor.

In this example, the first material of the first positive electrode 151a of the first energy storage unit 151 is different from the second material of the second positive electrode 161a of the second energy storage unit 161, and the two types of energy storage units are in different states when reaching their full voltages in the charging process. For example, the second positive electrode 161a of the second energy storage unit 161 is made of lithium iron phosphate, and when the second energy storage unit 161 is to be fully charged, a relatively large space for change still exists, that is, the full voltage of the second energy storage unit 161 may fluctuate within a certain voltage range. For example, when the voltage of the second energy storage unit 161 reaches 3.5 V, the second energy storage unit 161 may continue being charged to 3.6 V, 3.7 V, 3.8 V 3.9 V, 4 V, 4.2 V, or the like. If the first positive electrode 151a of the first energy storage unit 151 is made of a material containing lithium element, for example, the first positive electrode 151a is made of ternary lithium, the first energy storage unit 151 cannot continue being charged after fully charged; otherwise, the energy storage device or a charger may be damaged or a safety hazard may be caused. It may be considered that when the material of the first energy storage unit 151 is determined and the first energy storage unit 151 is used or aged to a certain degree, the full voltage of the first energy storage unit 151 is a determined value.

In this example, a difference between the full voltage of the first energy storage unit 151 fully charged and the full voltage of the second energy storage unit 161 fully charged is less than or equal to 1 V. For example, the difference may be 0.5 V, 0.6 V, 0.8 V, 0.9 V, 1 V, or the like.

Figure 22:
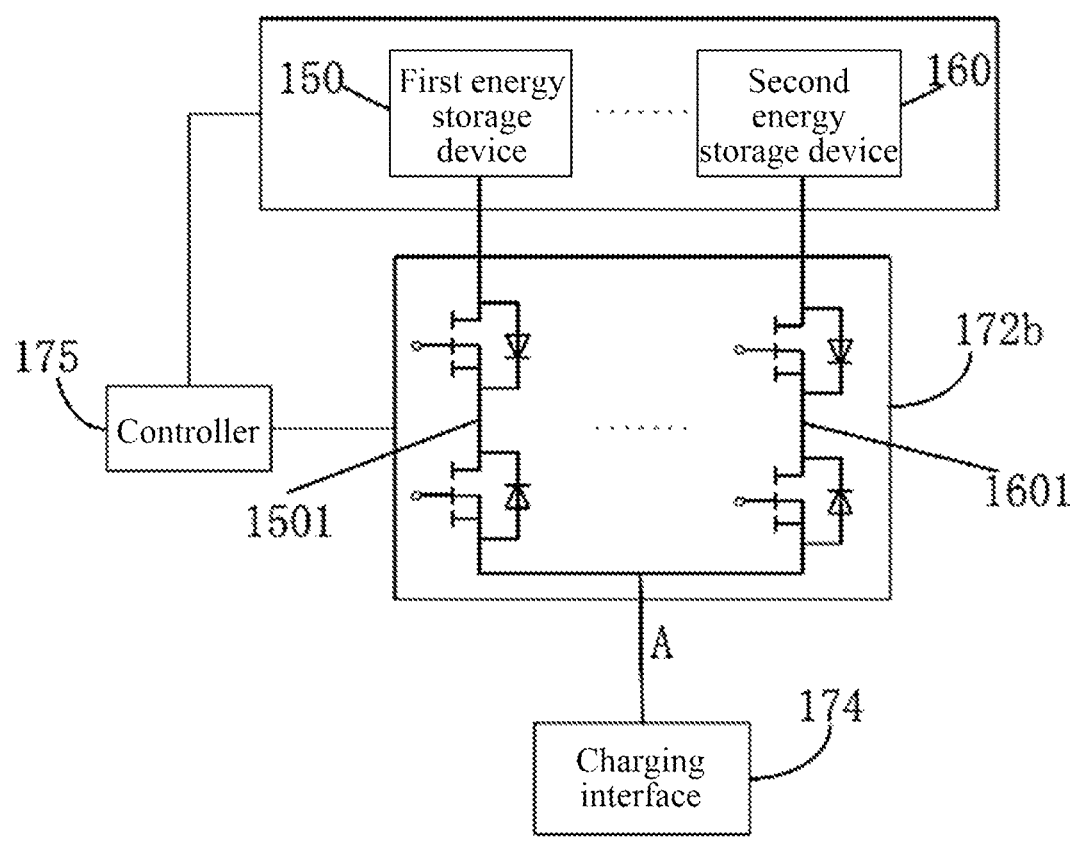
FIG. 22 is a circuit diagram in which a second energy storage device and a first energy storage device are charged.

As shown in FIG. 22, the charging unit 172 further includes a charging circuit 172b disposed between the charging interface 174 and the first energy storage device 150 and the second energy storage device 160. The charging circuit 172b may further include a charging branch for charging each energy storage device. For example, the charging circuit 172b includes a first charging branch 1501 connected to the first energy storage device 150 and a second charging branch 1601 connected to the second energy storage device 160. The charging circuit 172b is electrically connected to the controller 175, and the charging interface 174 is connected to the charging circuit 172b through a bus A. Alternating current mains or the charge current converted by an external device is transmitted to the bus A through the charging interface 174 and then transmitted to each energy storage device through the bus A. In this example, the controller 175 may control, according to detected electrical parameters of the energy storage devices, switching elements in the first charging branch 1501 and the second charging branch 1601 to change on states to charge one or more energy storage devices. Switching elements on a charging branch path are turned on in the charging process, and the switching elements on the path are turned off when charging is not performed. The electrical parameter may be a charge current or a charge voltage or temperature of the energy storage unit. For example, the controller 175 may adaptively distribute the current inputted from the bus A to the energy storage devices to charge all the energy storage devices at the same time, or the current inputted from the bus A may fully charge one energy storage device and then fully charge another energy storage device until all the energy storage devices are fully charged. In an optional example, the controller 175 may control, according to charging characteristics of different energy storage devices, the charging circuit 172b such that the energy storage devices are charged at constant currents or constant voltages or in other charging manners.

Figure 23:
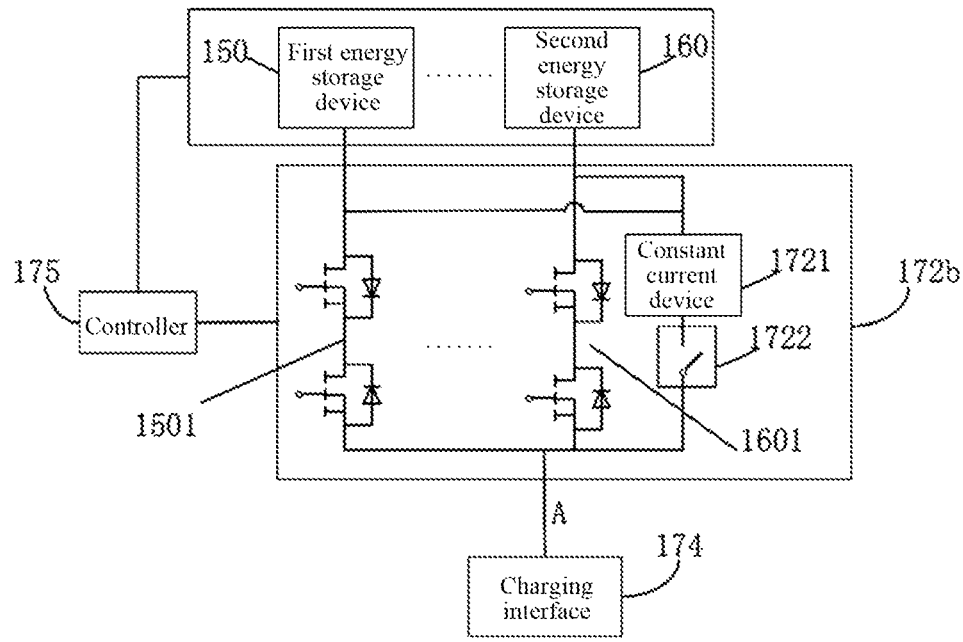
FIG. 23 is a circuit diagram for charge equalization on a second energy storage device and a first energy storage device.

Referring to FIG. 23, the charging circuit 172b further includes an equalization circuit capable of performing charge equalization on one or more energy storage devices in the charging process. For example, a constant current device 1721 and an equalization switch 1722 are disposed in the equalization circuit. The constant current device 1721 is equivalent to a constant current source capable of outputting a small current to perform the charge equalization on the basically fully charged energy storage device, that is, to perform the charge equalization on the energy storage units in the energy storage device. In this example, when one or more energy storage devices are basically fully charged and other energy storage devices are not fully charged yet, the controller 175 may turn off the charging branches of the basically fully charged energy storage devices and control the equalization switch 1722 to be turned on. In this manner, the charge current flowing in through the charging interface 174 is converted into a constant current by the constant current device 1721 and the constant current performs the charge equalization on the basically fully charged energy storage devices, and the other energy storage devices are still charged at normal charge currents. For example, when the second energy storage device 160 is basically charged to the full voltage, the controller 175 may control the second charging branch 1601 to be turned off and control the equalization circuit to be turned on, so as to perform the charge equalization on the second energy storage device 160.

In this example, the constant current outputted by the constant current device 1721 is greater than or equal to 20 mA and less than or equal to 50 mA. The normal charge current outputted from the bus A to each energy storage device for normal charging is greater than or equal to 0.1 C and less than or equal to 2 C.

In an example, a total full voltage of the second energy storage device 160 is lower than a total full voltage of the first energy storage device 150. Therefore, in the case where the first energy storage device 150 and the second energy storage device 160 are charged at the same time, the second energy storage device 160 may be fully charged earlier. Therefore, the controller 175 may control the equalization circuit to be turned on to perform the charge equalization on the second energy storage device 160 at a small current. In this example, after the at least one second energy storage unit 161 reaches the full voltage, the equalization circuit is turned on to perform the charge equalization on the second energy storage device 160.

Figure 24:
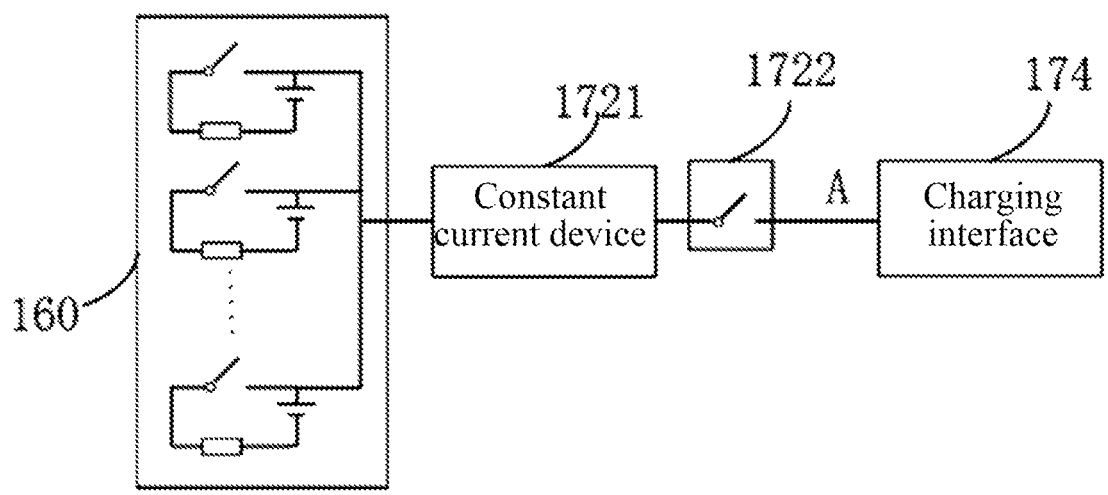
FIG. 24 is a circuit diagram for charge equalization on a second energy storage device.

In this example, as shown in FIG. 24, a charging path corresponding to each energy storage unit corresponds to one control switch, and whether to access an equalization current inputted by the constant current device 1721 can be selected through the control switch.

Figure 25:
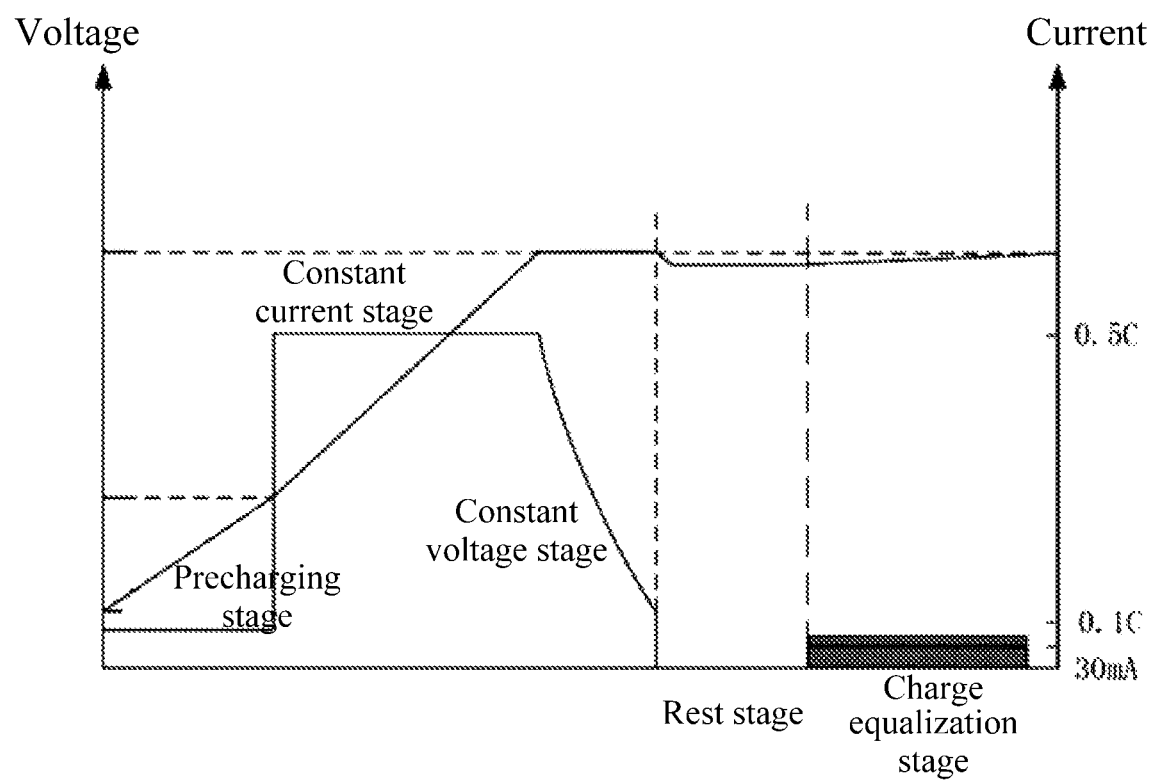
FIG. 25 is a schematic diagram of a charging stage.

As shown in FIG. 25, the charging process of any energy storage device may include a precharging stage, a constant current charging stage, and a constant voltage charging stage. The energy storage device is basically fully charged at a later stage of the constant voltage charging stage or at the end of the constant voltage charging stage. If the charge equalization is performed on the energy storage device immediately after the constant voltage charging stage ends, the energy storage unit at a charging end may have the problem of voltage divergence. To avoid the preceding problem, the controller 175 may turn off the corresponding charging branch when any energy storage device is basically fully charged or at the end of the constant voltage charging stage and turn on the equalization circuit after a preset time so as to perform the charge equalization on the energy storage device. In this example, the basically fully charged energy storage device is in a rest stage within the preset time. For example, the second energy storage device 160 may be charged and rest according to different charging stages shown in FIG. 25. At the end of the rest stage, the controller 175 may control the second charging branch 1601 to be turned off and control the equalization circuit to be turned on, so as to perform the charge equalization on the second energy storage device 160. For example, the charge current in a charge equalization stage may be 30 mA.

Figure 26:
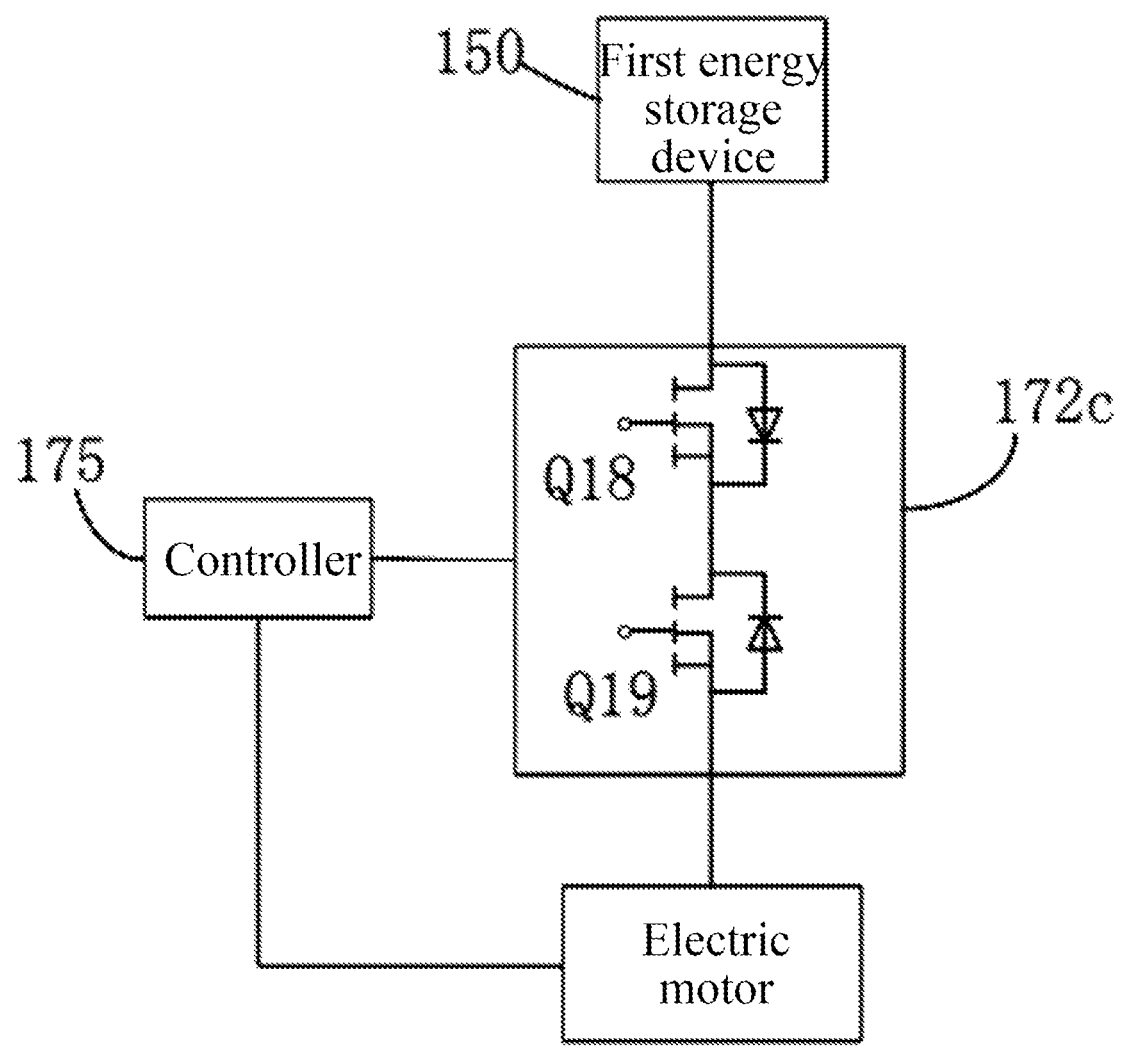
FIG. 26 is a schematic diagram for reverse charging of an outdoor moving device.

As shown in FIG. 26, the charging unit 172 may further include a charging and discharging circuit 172c, where the charging and discharging circuit 172c includes at least a charge switch Q18 and a discharge switch Q19. An end of the charging and discharging circuit 172c is connected to the first energy storage device 150 or the second energy storage device 160 or both the two energy storage devices, and the other end of the charging and discharging circuit 172c is connected to the electric motor. When the outdoor moving device 100 normally moves or mows grass, the discharge switch Q19 is turned on, the charge switch Q18 is turned off, and electrical energy flows out from the energy storage device to supply power to the electric motor. When the rotational speed of the electric motor decreases, windings of the electric motor can cut a magnetic field to generate a reverse charge current, and the charge current charges the energy storage device through the charging and discharging circuit 172c. The electric motor may include any one or both of the moving electric motor and the drive electric motor. When the rotational speed of the electric motor decreases, the outdoor moving device 100 may brake, turn, climb a slope, or perform other actions.

In an example, an end of the charging and discharging circuit 172c is connected to the first energy storage device 150 and the second energy storage device 160. When detecting that the rotational speed of the electric motor decreases, the controller 175 may detect current power or a current voltage of each of the two energy storage devices and the charge current generated by the electric motor may charge one of the energy storage devices which has lower power or a lower voltage. For example, if the power or voltage of the first energy storage device 150 is lower than the power or voltage of the second energy storage device 160, the reverse charge current generated when the rotational speed of the electric motor decreases can be transmitted to the first energy storage device 150; on the contrary, the reverse charge current can be transmitted to the second energy storage device 160.

In an example, an end of the charging and discharging circuit 172c is connected to the first energy storage device 150 and the second energy storage device 160. When detecting that the rotational speed of the electric motor decreases, the controller 175 may detect the power of the second energy storage device 160. When the power of the second energy storage device 160 is less than or equal to a power threshold, the reverse charge current generated by the deceleration of the electric motor is transmitted to the second energy storage device 160. When the power of the second energy storage device 160 is greater than the power threshold, the reverse charge current generated by the deceleration of the electric motor is transmitted to one energy storage device with a lower voltage. That is to say, when the charging and discharging circuit 172c is connected to both the first energy storage device 150 and the second energy storage device 160, when detecting that the rotational speed of the electric motor decreases, the controller 175 firstly determines, according to the power of the second energy storage device 160, whether the charge current generated by the electric motor is used for charging the second energy storage device 160. When the charge current generated by the electric motor is not necessarily used for charging the second energy storage device 160, a flow direction of the charge current is determined according to voltages of the energy storage devices. In this example, the power threshold may be 50% to 60% of full power of the second energy storage device 160. Alternatively, the power threshold may be 60% to 70% of the full power of the second energy storage device 160. Alternatively, the power threshold may be 70% to 80% of the full power of the second energy storage device 160.

The outdoor moving device 100 further includes two power supply conversion units for converting the electrical energy inputted by the first energy storage device 150 or the second energy storage device 160 to supply power to the power supply management module 170. In an optional example, part or all of circuits of a first power supply conversion unit and a second power supply conversion unit are disposed on a circuit board where the power supply management module 170 is located and the first power supply conversion unit and the second power supply conversion unit are electrically connected to the power supply management module 170 separately. In an optional example, the first power supply conversion unit and the second power supply conversion unit are independently disposed outside the circuit board where the power supply management module 170 is located and are electrically connected to the power supply management module 170 through connection lines. In an example, the power supply conversion unit may be a direct current-direct current (DC-DC) conversion unit. The two power supply conversion modules are provided so that when any power supply conversion path fails, the normal power supply from the energy storage device will not be affected.

The preceding examples of the outdoor moving device 100 may be applied to the outdoor tool devices shown in FIGS. 14 to 21.

Figure 27:
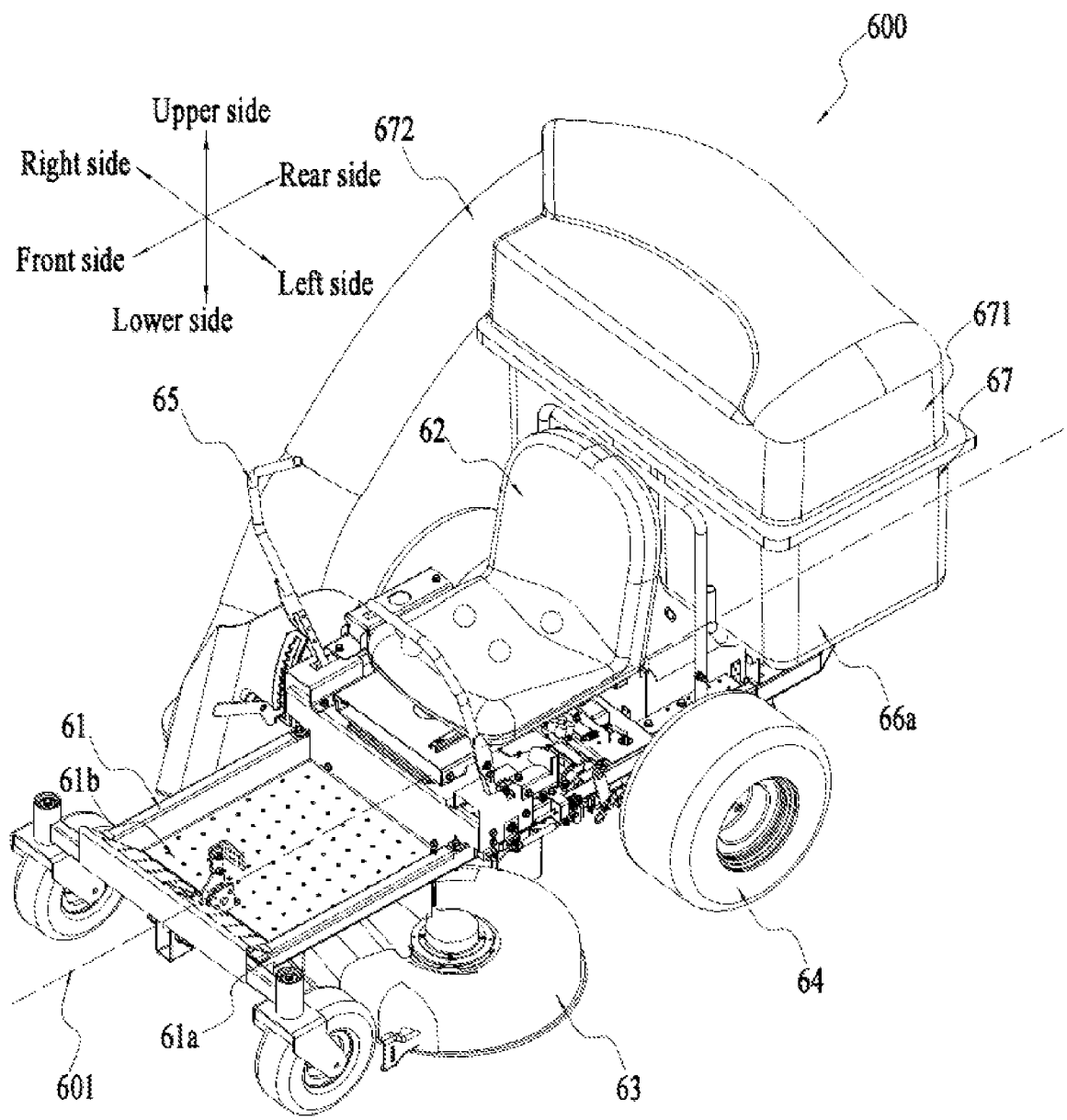
FIG. 27 is a perspective view of an electric riding lawn mower of a first embodiment of the present disclosure when a grass collecting device is installed.
Figure 28:
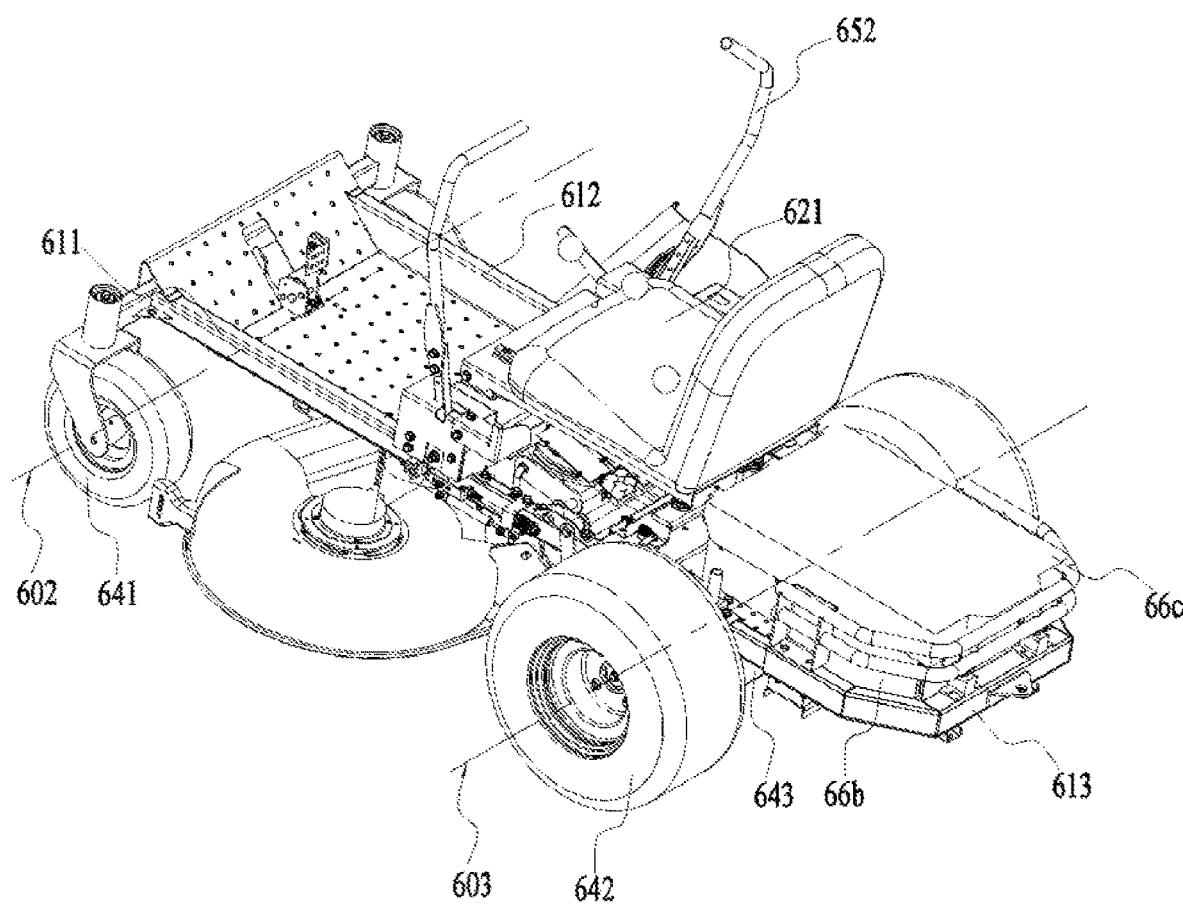
FIG. 28 is a perspective view of the electric riding lawn mower of FIG. 27 from another angle.

The electric riding machine shown in FIG. 27 can be an electric machine for working indoors or outdoors. In the present example, the electric riding machine is specifically exemplified by the electric riding lawn mower 600. The electric riding lawn mower 600 can be used for the user to ride. When sitting on the electric riding lawn mower, the user can effectively and quickly trim lawn, vegetation, etc. by operating the electric riding lawn mower. Comparing with walk behind lawn mowers, the electric riding lawn mower 600 of the present disclosure does not require the user to push the machine, nor does it require the user to walk on the ground, and because its large size brings longer endurance, the user is able to trim larger lawns, and trim for a long time with less tiredness. Furthermore, when it comes to power source, the electric riding lawn mower 600 uses electrical energy rather than gasoline or diesel used by existing riding lawn mowers; this not only costs less and is more environmentally friendly, but also requires part replacement less often, reducing maintenance costs.

It can be understood that the electric riding machine may be other types of electric machines, as long as the electric machines can output power in other forms in addition to walking power to fulfil other functions besides walking, the electric machines can be considered as riding electric machines, such as riding snow throwers, riding agricultural machines, riding mops, riding sweepers and the like. In fact, as long as these tools include the substance described below in this disclosure, they all fall within the scope of this disclosure.

In order to facilitate the description of the technical solution of the present disclosure, the front side, the rear side, the upper side, the lower side, the left side, and the right side are defined as shown in FIG. 27.

As shown in FIGS. 27-38, the electric riding lawn mower 600 includes a main frame 61, a seat 62, a power output assembly 63, a walking assembly 64, an operating assembly 65, and a power supply device 66.

Figure 29:
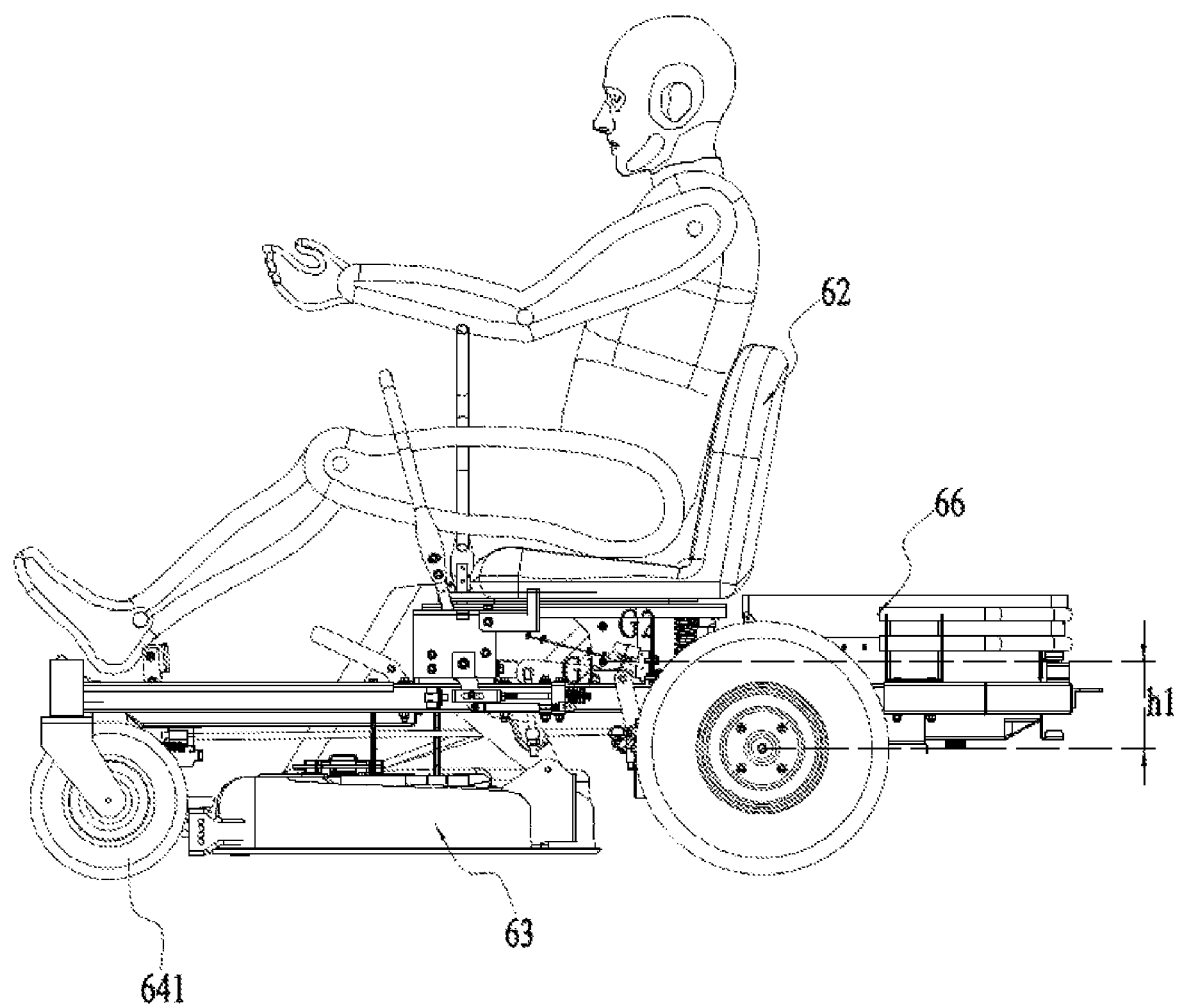
FIG. 29 is a plan view of a user riding the electric riding lawn mower of FIG. 27.
Figure 30:
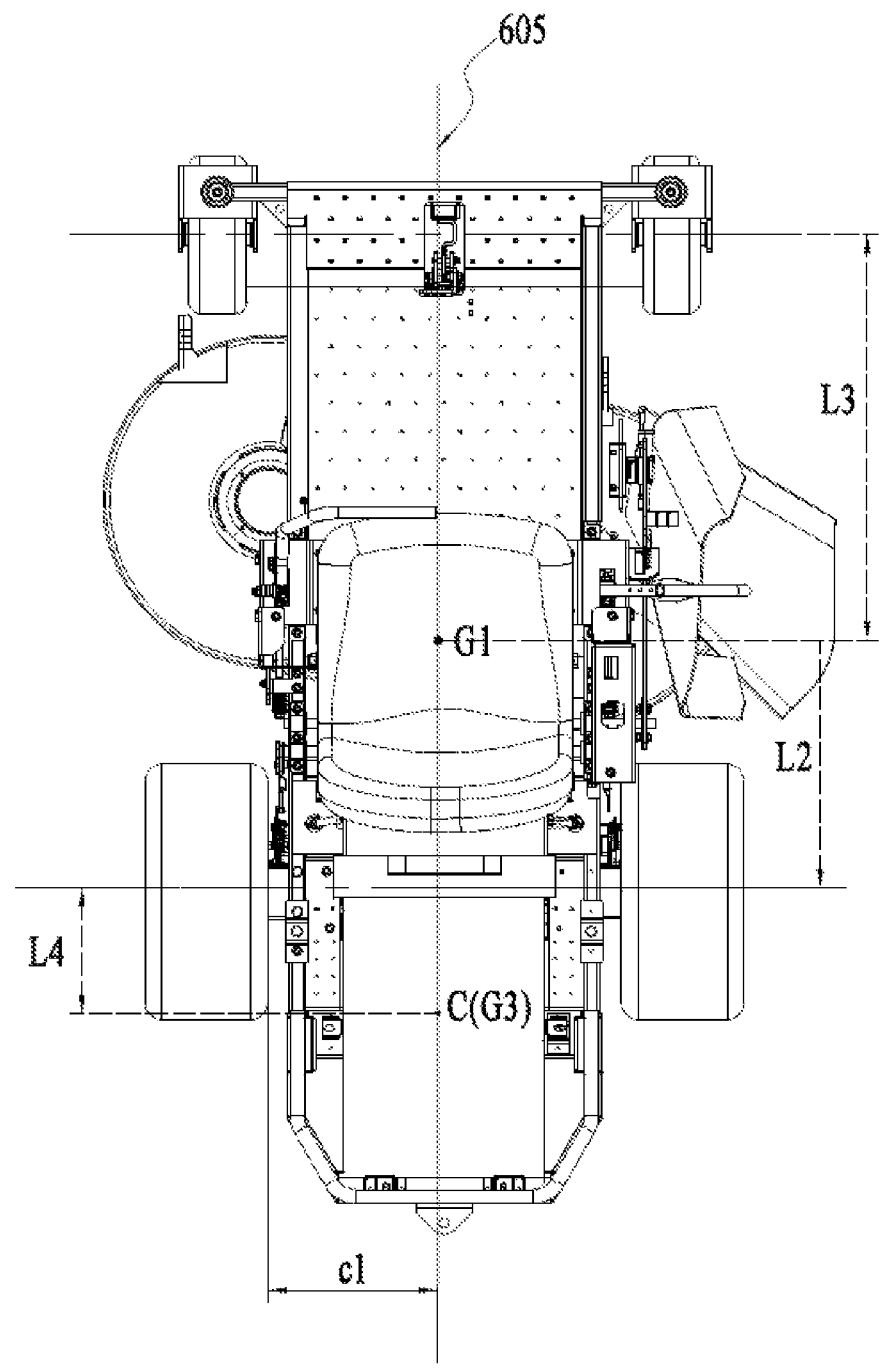
FIG. 30 is a top view of the electric riding lawn mower of FIG. 27.
Figure 31:
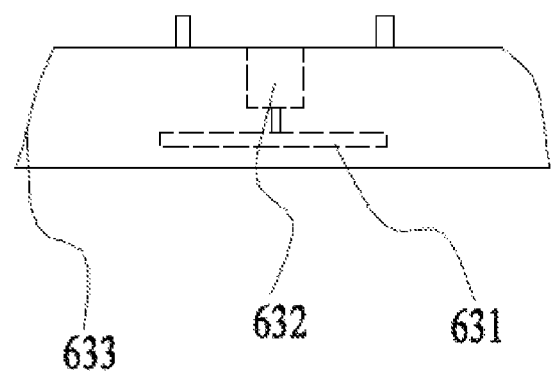
FIG. 31 is a schematic view of a power output assembly of FIG. 27.
Figure 32:
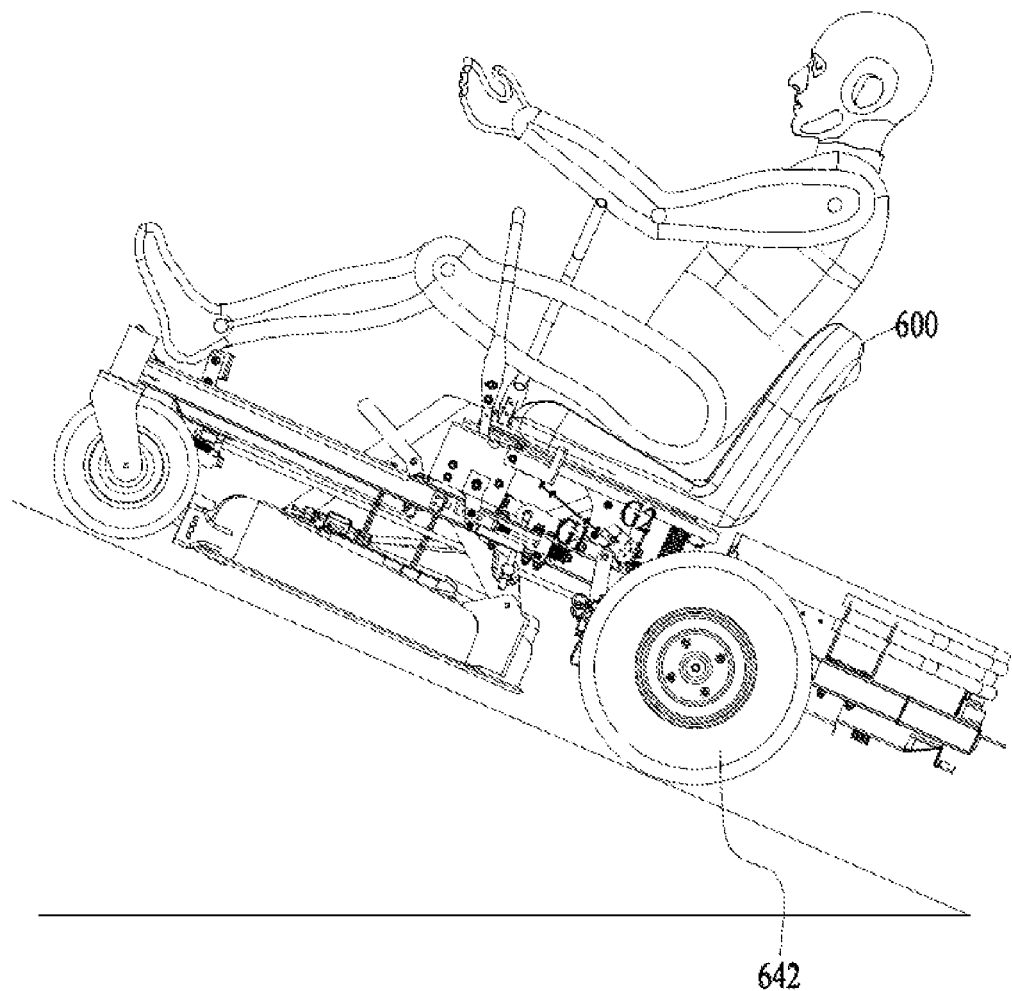
FIG. 32 is a plan view of a user climbing uphill on an electric riding lawn mower.
Figure 33:
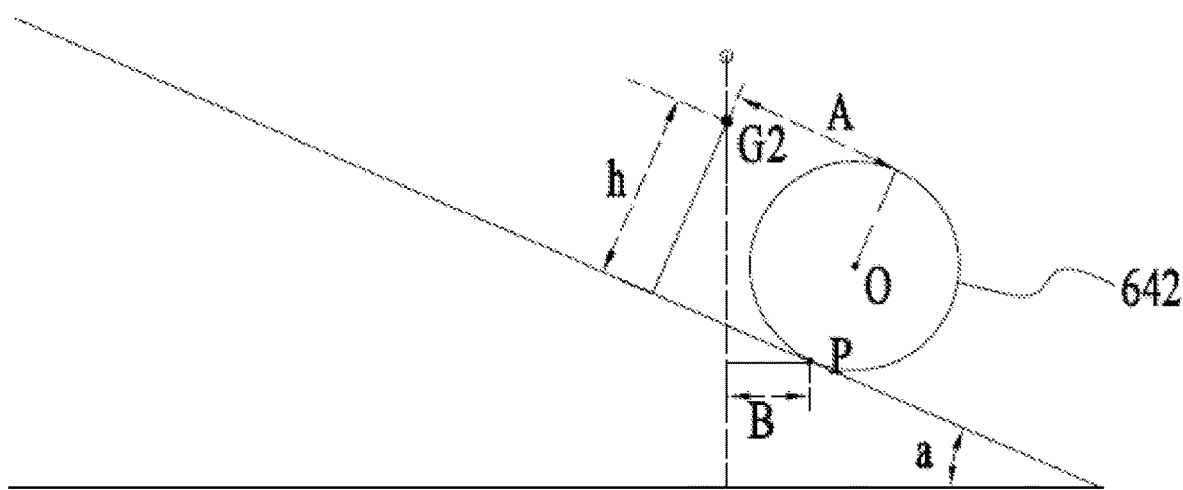
FIG. 33 is a schematic view showing a second travelling wheel and the centre of gravity of the entirety formed by a user and an electric riding lawn mower.
Figure 34:
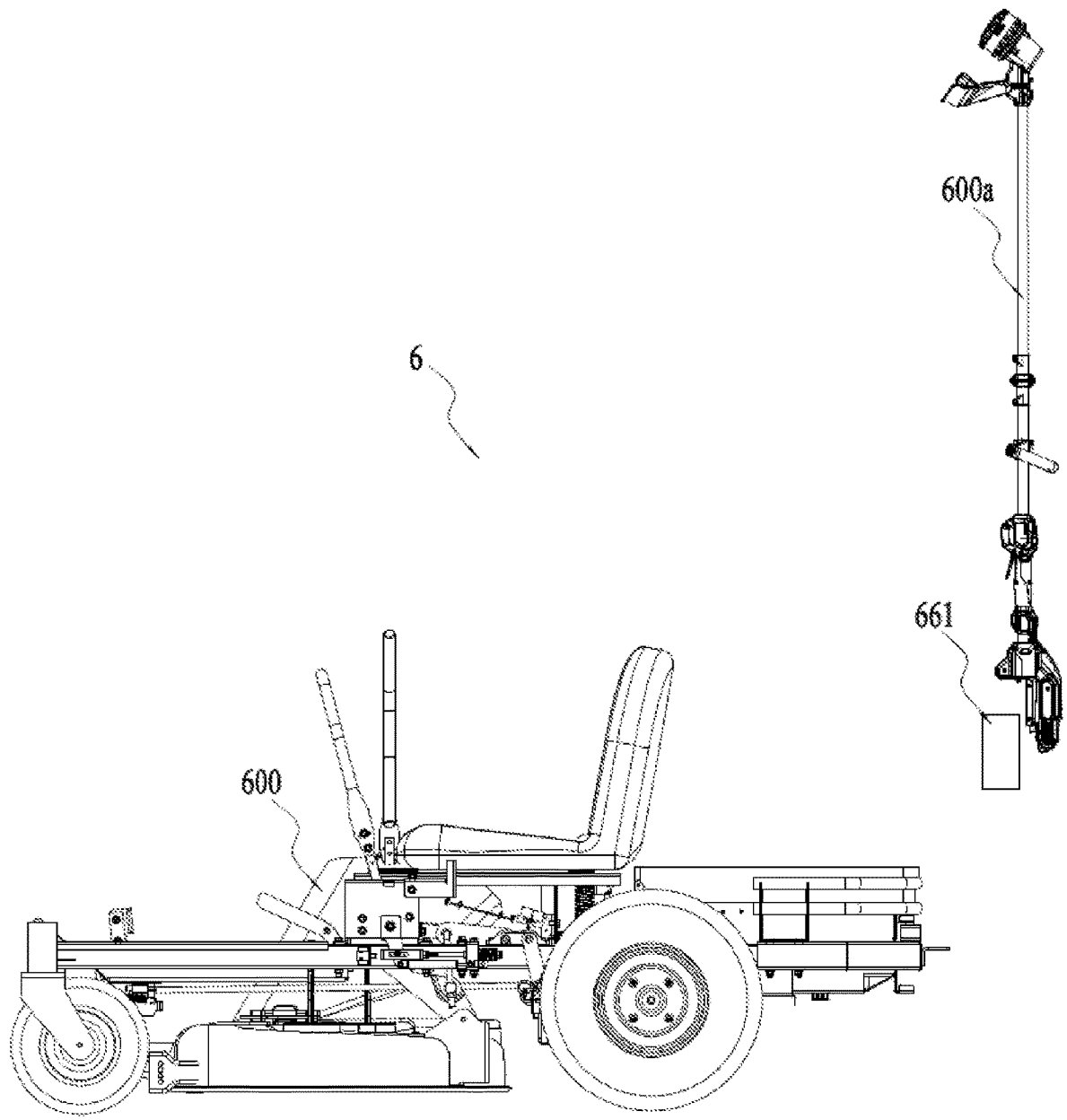
FIG. 34 is a schematic structural view of a power tool system.

The main frame 61 is used to carry various modules of the electric riding lawn mower 600. Specifically, the main frame is used to support the seat 62, the power output assembly 63, the walking assembly 64, the operating assembly 65, and the power supply device 66, and the like. The main frame 61 extends generally in the front-rear direction. Specifically, the main frame 61 extends at least partially in a direction parallel to a first straight line 601 in the front-rear direction. The main frame 61 includes a frame 61a and a base 61b. The frame 61a includes a first arm 611, a second arm 612, and a connecting arm 613 that connects the first arm 611 and the second arm 612. The connecting arm 613 connects the first arm 611 and the second arm 612 such that the first arm 611, the second arm 612, and the connecting arm 613 constitute a frame 61a that supports the base 61b. The first arm 611 and the second arm 612 may be in the front-rear direction. In the present example, the connecting arm 613 extends in the left-right direction; the number of the connecting arms 613 is two. One of the connecting arms 613 connects the first arm 611 and the second arm 612 at the front ends thereof, and the other connecting arm 613 connects the first arm 611 and the second arm 612 at the rear ends thereof, such that the first arm 611, the second arm 612 and the two connecting arms 613 form a substantially rectangular frame 61a. It is to be understood that the structure of the first arm 611, the second arm 612 and the two connecting arms 613 is not limited thereto, and the structure of the frame 61a is not limited thereto. The frame 61a surrounds the base 61b, and the shape of the base 61b is adapted to the shape of the frame 61a. In the front-rear direction, the base 61b is provided at the front of the frame 61a, the base 61b fills the front portion of the rectangular formed by the surrounding frame 61a, and the base 61b is at least partially extended in a plane extending in the front-rear direction, and the base 61b serves as a work platform to support the user's feet and some mechanisms that can be operated with the user's feet. The seat 62 is for a user to ride, and the seat 62 is mounted to the main frame 61. The seat 62 is slidable with respect to the main frame 61 in the direction of the first straight line 601, so that the seat 62 can be moved forward or backward, so that the user can adjust the position of the seat 62 in the front-rear direction according to the user's height and usage habits, aiding comfort of the electric riding lawn mower 600. The seat 62 specifically includes a bottom portion 621 and a backrest. The bottom portion 621 extends substantially in the front-rear direction, and the backrest portion extends upward from the bottom portion 621. As shown in FIGS. 27 and 29, when the user sits on the seat 62, the user faces the forward direction of the electric riding lawn mower 600, i.e., the user faces the front side. The frame 61a can support the seat 62, it should be understood that the frame 61a may directly support the seat 62, and the frame 61a may also indirectly support the seat 62 by connecting to other structures. The seat 62 is provided on the upper side of the frame 61a. In the front-rear direction, at least half of the seat 62 is disposed on the rear side of the base 61b, so that when the user sits on the seat 62, the user's feet can be placed on the base 61b on the front side of the seat 62. In this way, on the one hand, the weight of the whole machine can be reduced, and the cost can be saved; on the other hand, the lower side of the seat 62 can free more space to set the other two parts, thereby saving space.

The power output assembly 63 includes an output member for outputting power to achieve a mechanical function. For example, in the present example, the output member may specifically be a mowing member 631. The power outputted by the power output assembly 63 is the power other than enabling the electric riding lawn mower 600 to walk on the ground, and different output members enable the power output assembly 63 to perform different functions, for example, the output member may blow the snow, the output member may sweep the ground, the output member may also plow the field, etc.

In the present example, the output member is the mowing element 631, which can realize the function of trimming the lawn, cutting the weeds, and the like. Specifically, the power output assembly 63 is also connected to the main frame 61, and in the present example, the power output assembly 63 can be specifically mounted to the lower side of the main frame 61. It should be understood that the main frame 61 may be directly connected to the power output assembly 63, and may also be indirectly connected through other connection structures to the power output assembly.

The power output assembly 63 is disposed substantially on the lower side of the main frame 61, which effectively utilizes the space on the lower side of the main frame 61, and reduces the size of the entire electric riding lawn mower 600 in the front-rear direction such that the whole structure is more compact. Furthermore, it also reduces the center of gravity G1 of the electric riding lawn mower 600, improves the stability of the electric riding lawn mower 600, and avoids the problem of machine rollover and backward turning during climbing.

The power output assembly 63 further includes: a first motor 632 and a chassis 633. The mowing element 631 is used to implement the mowing function; the first motor 632 is used to drive the mowing element 631 to rotate at a high speed; the chassis 633 is formed with an accommodation space to accommodate at least a portion of the first motor 632 and at least a portion of the mowing element 631. The power output assembly 63 may include one or more mowing element 631, and respectively, the number of the first motors 632 can correspond to the mowing element 631. For example, in the present example, the number of mowing elements 631 is two, which increases the cutting range of the electric riding lawn mower 600, thereby improving the cutting efficiency.

The walking assembly 64 is used to enable the electric riding lawn mower 600 to walk on the lawn and on the ground. In the up-down direction, the walking assembly 64 is also capable of supporting the main frame 61 and the various components on the main frame 61. The walking assembly 64 may specifically include a first travelling wheel 641 and a second travelling wheel 642. The first travelling wheel 641 is disposed on the front side of the second travelling wheel 642 in the front-rear direction. Therefore, the first travelling wheel 641 may also be defined as the front travelling wheel, and the second travelling wheel 642 may also be defined as the rear travelling wheel. In the present example, the number of the first travelling wheels 641 is 2, and the number of the second travelling wheels 642 is also 2, which can improve the stability of the electric riding lawn mower 600 in the left-right direction and avoid rollovers on the ground or up the hill. In fact, the walking assembly 64 may also include only one first travelling wheel 641 and two second travelling wheels 642; alternatively, the walking assembly 64 may include two first travelling wheels 641 and one second travelling wheel 642; wherein in the direction along the first straight line 601, the power output assembly 63 is at least partially disposed between the first travelling wheel 641 and the second travelling wheel 642.

Further, the power output assembly 63 is disposed substantially between the first travelling wheel 641 and the second travelling wheel 642; in the direction along the first straight line 601, the seat 62 is also at least partially disposed between the first travelling wheel 641 and the second travelling wheel 642, so that the center of gravity G1 of the electric riding lawn mower 600 is located between the first travelling wheel 641 and the second travelling wheel 642 in the direction of the first straight line 601, thereby improving the balance performance of the whole machine. Further, in the direction along the first straight line 601, the seat 62 is closer to the second travelling wheel 642 and further from the first travelling wheel 641, so that the electric riding lawn mower 600 can be effectively prevented from rollover during climbing. In the left-right direction, the two first travelling wheels 641 are respectively located at two sides of the main frame 61, and the two second travelling wheels 642 are also respectively located at two sides of the main frame 61; that is, the projections of the two first walking wheels 641 in a plane perpendicular to the up-down direction are outside the projection of the main frame 61 in the plane, and the projections of the two second walking wheels 642 in the plane are also located outside the projection of the main frame 61 in the plane. In this way, the main load-bearing portion of the electric riding lawn mower 600 can be placed between the two first travelling wheels 641 and also between the two second travelling wheels 642, so that the electric riding lawn mower 600 can be further effectively prevented from rolling over.

The first travelling wheel 641 may specifically be a universal wheel that can rotate about the first axis 602. The first travelling wheel 641 has a first diameter. It can be understood that since the first travelling wheel is a universal wheel, the electric riding lawn mower 600 can turn, and when the electric riding lawn mower 600 turns, the first axis 602 of first travelling wheel 641 also rotates, and the orientation of the first travelling wheel 641 rotates. The walking assembly 64 also includes a second motor 643 for driving the second travelling wheel 642 to rotate about the second axis 603. The drive from the second motor 643 allows the walking assembly to drive the entire electric riding lawn mower 600 to walk on the ground. In this example, the second motor 643 is independent of the first motor 632 that drives the mowing element 631, so that the structure of the whole machine is simpler and the driving is more convenient. The number of the second motors 643 is also two, and the two second motors 643 are capable of driving the two second travelling wheels 642 respectively. Thus, when the two second motors 643 drive the respective second travelling wheels 642 at different rotational speeds, a speed difference is generated between the two second travelling wheels 642, thereby causing the electric riding lawn mower 600 to turn. The second travelling wheel 642 has a second diameter, and the second diameter of the second travelling wheel 642 is greater than the first diameter of the first travelling wheel 641. Wherein, the second diameter of the second travelling wheel 642, the ratio of the second diameter of the second travelling wheel 642 to the first diameter of the first travelling wheel 641 is greater than or equal to 1.4 and less than or equal to 2, such that the second diameter of the second travelling wheel 642 is larger than the first diameter of the first travelling wheel 641, so that the electric riding lawn mower 600 is less likely to roll backward when climbing uphill. The second diameter of the second travelling wheel 642 cannot be excessively larger than the first diameter of the first travelling wheel 641 to avoid the risk of the electric riding lawn mower 600 rolling forward on the downhill slope.

In the present example, the distance between the second travelling wheel 642 and the center of the two second travelling wheels 642 is defined as c1, i.e., half of the distance between the two second travelling wheels 642 is considered to be c1. In the present example, with a large number of modelling, test analyses, theoretical analysis, and creative work on the electric riding lawn mower 600, it is concluded that in order to avoid rollover when the electric riding lawn mower 600 climbs the uphill, the ratio of the distance c1 between the second travelling wheel 642 and the center of the two second travelling wheels 642 to the second diameter of the second travelling wheel 642 is greater than or equal to 0.5 and less than or equal to 1, such that the distance c1 between the second travelling wheel 642 and the center of the two second travelling wheels 642 is not excessively large, and the turning radius of the entire electric riding lawn mower 600 can be reduced, thereby making the electric riding lawn mower 600 turns faster.

Further, the distance between the center of gravity G1 of the electric riding lawn mower 600 and the two second travelling wheels 642 in the up-down direction is defined as h1. The ratio of the distance h1 to the second diameter of the second travelling wheel 642 is greater than or equal to 0.5 and less than or equal to 0.5 and less than or equal to 1, such that when the second diameter of the second travelling wheel 642 is fixed, the center of gravity G1 of the electric riding lawn mower 600 can be placed in a reasonable position in the up-down direction. Therefore, the risk of rollover of the electric riding lawn mower 600 during climbing is reduced. The position of the center of gravity G1 of the electric riding lawn mower 600 can be reasonably improved as the second diameter of the second travelling wheel 642 is increased. In the present example, the ratio of the distance h1 between the center of gravity G1 of the electric riding lawn mower 600 and the center of the two second travelling wheels 642 in the up-down direction to the distance c1 between the second travelling wheel 642 and the center of the two second travelling wheels 642 is greater than or equal to k1 and less than or equal to k2, that is, k1<h1/c1>k2, and the setting of k1 and k2 is related to the dimension of the second diameter of the second travelling wheel 642. Thus, when the second diameter of the second travelling wheel 642 is set, k1 and k2 can also be set to a reasonable value. Thus, when the distance c1 between the second travelling wheel 642 and the center of the two second travelling wheels 642 is set small, the rollover issue during climbing can be alleviated by lowering the center of gravity G1 of the electric riding lawn mower 600.

When the center of gravity G1 of the electric riding lawn mower 600 is set high, the distance c1 between the second travelling wheel 642 and the center of the two second travelling wheels 642 can be increased to prevent the electric riding lawn mower 600 from rollover during climbing. For example, in the present example, k1 has a value of 0.6 and k2 has a value of 1.1, such that 0.6<h1/c1>1.1. More specifically, in a direction perpendicular to the first straight line 601 and perpendicular to the second axis 603, the distance L1 between the center of gravity G1 of the electric riding lawn mower 600 and the second axis 603 is greater than or equal to 0 and less than or equal to 150 mm, that is, the distance L1 is greater than or equal to 0 and less than or equal to 150 mm in the up-down direction, so that the center of gravity G1 of the electric riding lawn mower 600 is not too high in the up-down direction. When the user sits on the seat 62, the center of gravity will rise to some extent, but since the center of gravity G1 of the electric riding lawn mower 600 is set low, the center of gravity G2 of the entirety formed by the user and the electric riding lawn mower 600 is not too high in the up-down direction, which improves stability. It should be noted that, in the present disclosure, the distance between two points, lines and planes in a certain direction refers to the projection distance of the spatial distance between them in the specified direction.

The operating assembly 65 is for user operation to control the electric riding lawn mower 600 to walk and output power. The operating assembly 65 can include a first operating element and a second operating element 652. The first operating element is for user to operate to activate the first motor 632 in the power output assembly 63 to control the mowing element 631 to mow. The second operating element 652 is for user to operate to activate the second motor 643 in the walking assembly 64 to control the electric riding lawn mower 600 to walk on the lawn or on the ground. The number of second operating elements 652 is two. In the present example, two of the second operating elements 652 are used to respectively control two of the second motors 643. The two second operating members 652 are respectively disposed on both sides of the seat 62 such that the two second operating members 652 on both sides can be more conveniently operated when the user sits on the seat 62.

The power supply device 66 is for supplying power to the first motor 632 and the second motor 643. The power supply device 66 includes a plurality of first battery packs 661. Compared with the conventional riding lawn mowers powered by gasoline, the electric riding lawn mower 600 powered by the first battery pack 661 is more environmentally friendly and the later usage cost is also lower. In the long run, the cost of the electric riding lawn mower using the first battery pack 661 will be lower. Compared with riding lawn mowers powered by alternating current, the first battery pack 661 supplies power without using a long power cord, which is safer and more convenient for mowing. In the present disclosure, the first battery pack 661 is a lithium battery pack, and the first battery pack 661 is lighter in weight, higher in charge and discharge efficiency, and longer in service life than other types of battery packs (for example, lead-acid batteries). Further, in the present example, the voltage of the first battery pack 661 is 56V. It can be understood that the voltage value of the first battery pack 661 is not limited thereto.

The power supply device 66 is disposed on the rear side of the seat 62, and in the height direction, the upper end of the power supply device 66 is shorter than the seat 62, or the upper end of the power supply device 66 is substantially of the same height to the seat 62; further, in the height direction, the upper end of the first battery pack 661 is shorter than the seat 62, or the first battery pack 661 is substantially of the same height to the seat 62.

In the present example, the first battery pack 661 can be detached from the main frame 61 by the user, that is, the first battery pack 661 for powering the electric riding lawn mower 600 is detachably mounted to the main frame 61, so that when the power of the first battery pack 661 is insufficient, the user can detach the first battery pack 661 for charging, instead of directly charging the electric riding lawn mower 600, thereby improving operational convenience; in addition, when the first battery pack 661 is damaged, the user can conveniently disassemble the first battery pack 661 for maintenance or directly replace the first battery pack 661, which avoids fixing or replacing the riding lawn mower whose battery pack cannot be disassembled, and thus reduces the cost of maintenance at a later stage. Moreover, the ability to disassemble the first battery pack 661 also allows for differentiated design of products for different platforms or regions, making quality control and manufacture of the entire electric riding lawn mower 600 easier. Still alternatively, the power tool system 6 shown in FIG. 34 includes the electric riding lawn mower 600 and a power tool 600a in the present disclosure. Wherein, the first battery pack 661 in the power supply device 66 for supplying power to the electric riding lawn mower 600 can be detached and mounted into the electric power tool 600a, so that the first battery pack 661 can also power the electric power tool 600a, that is, the first battery pack 661 in the power supply device 66 in the present disclosure can be applied not only to the electric riding lawn mower 600 but also to other electric power tools 600a, thereby improving the adaptability of the first battery pack 661 and the ability of the electric riding lawn mower 600 to adapt to the first battery pack 661. Thus, when the electric riding lawn mower 600 is not in use, the user can disassemble the first battery pack 661 for use in other electric power tools 600a, thereby avoiding waste of resources and reducing usage cost. In other words, when the user needs to use the electric riding lawn mower 600, the user can borrow the battery pack in other power tool 600a as the first battery pack 661. In the present example, the first battery pack 661 is configured to be pluggably mounted by the user to the electric riding lawn mower 600, and the first battery pack 661 is attached and detached by plugging and unplugging, making the operation more convenient, and the positioning of the first battery pack 661 more accurate.

Figure 35:
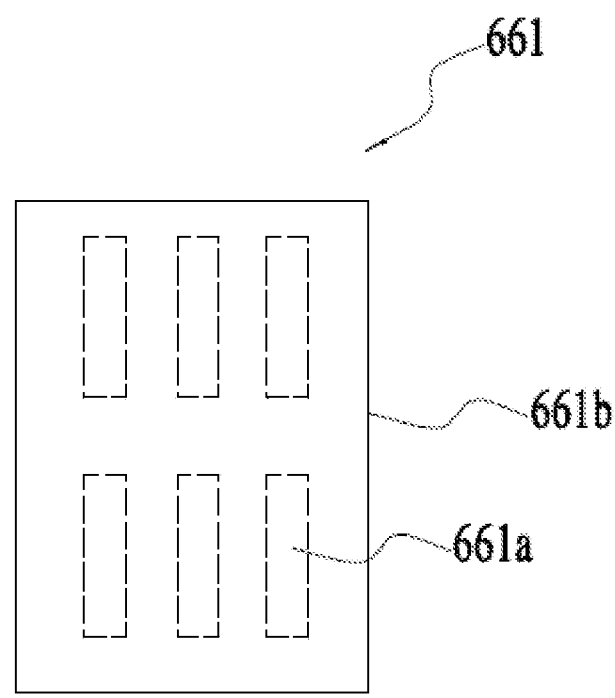
FIG. 35 is a schematic structural view of a first battery pack of FIG. 27.
Figure 36:
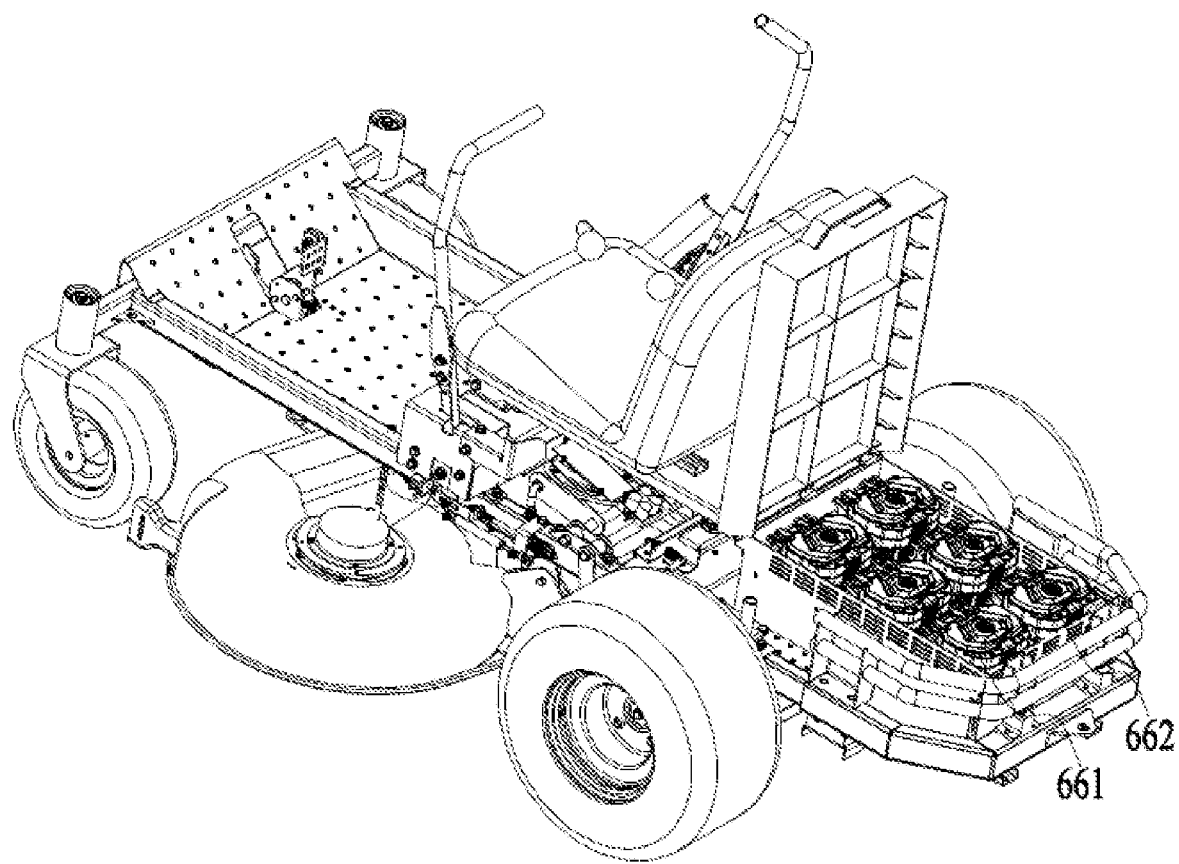
FIG. 36 is a perspective view of the electric riding lawn mower of FIG. 27 when a cover is opened.
Figure 37:
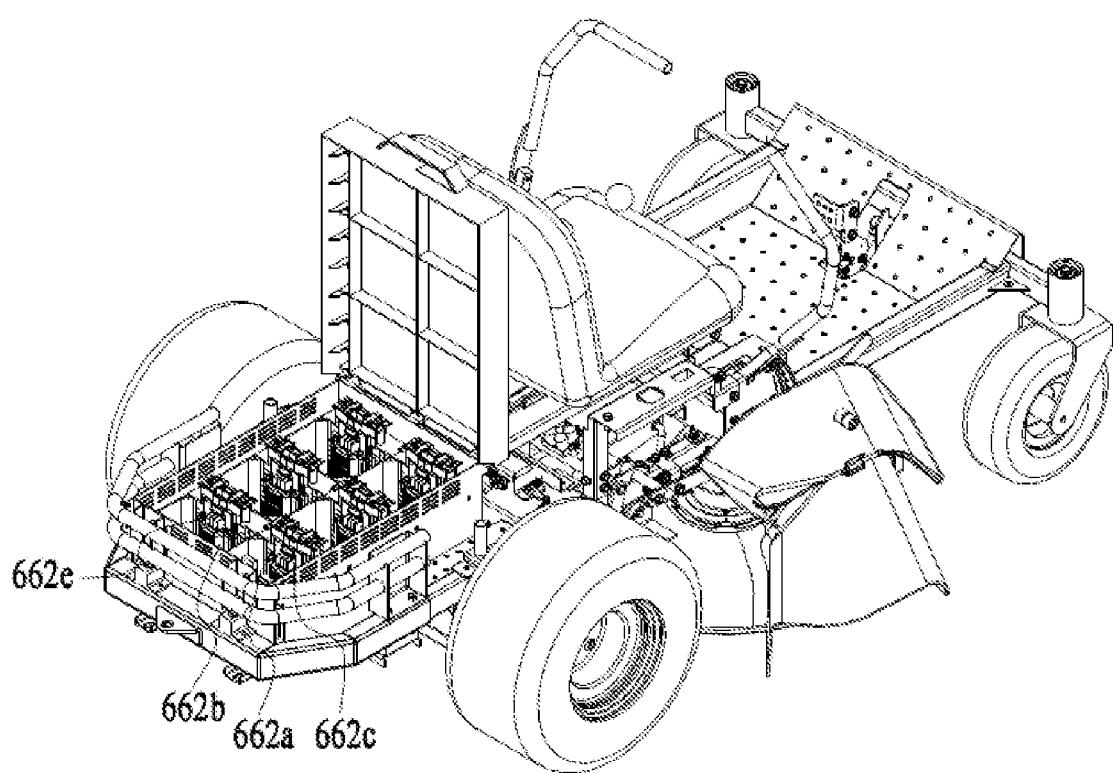
FIG. 37 is a perspective view of the electric riding lawn mower of FIG. 27 when a first battery pack is removed.

Further, as shown in FIG. 35, the first battery pack 661 includes a plurality of battery cells 661*a* connected in series, in parallel, or in a combination of series and parallel. The plurality of battery cells 661*a* are combined in one battery case to constitute a whole, and the battery cells 661*a* may specifically be lithium-based. Specifically, the power tool 600*a* may be a garden tool such as a string trimmer, a hedge trimmer, a blower or a chain saw, a torque output tool such as an electric drill or an electric hammer, a sawing tool such as an electric circular saw, a curve saw or a reciprocating saw, or a grinding tool such as an angle grinder or a sander. In other examples, the first battery pack 661 can also be configured to power a hand-push power tool, such as a hand-push lawn mower, a hand-push snow blower, and the like. Thus, the first battery pack 661 of the present disclosure adapted to the electric riding lawn mower 600 can be pulled out by the user to be applied to the above power tool 600*a*, in other words, the user can borrow the battery packs in the power tool 600*a* as the first battery pack 661 to power the electric riding lawn mower 600, thereby improving the versatility of the electric riding lawn mower 600 and reducing the usage cost.

In the present example, the area surrounded by the frame 61*a* may be divided into a front portion, a middle portion, and a rear portion in the front-rear direction. The base 61*b* only fills the front portion of the frame 61*a*, and the middle portion and the rear portion of the frame 61*a* are not provided with the base 61*b*, and the seat 62 is provided on the upper side of the middle portion of the frame 61*a*, so that the lower side of the seat 62 and the middle portion of the frame 61*a* have more space to for other components, so that the structure of the whole machine is more compact. The rear portion of the frame 61*a* and the rear side of the seat have a sufficiently large accommodation space which can be used to house the power supply device 66. In the present example, the number of the first battery packs 661 included in the power supply device 66 is plural; the number of the first battery packs 661 is at least 4; the number of the first battery packs 661 is greater than or equal to 4 and less than or equal to 10. Further, in the present example, the number of the first battery packs 661 is exemplified by six, so that the electric riding lawn mower 600 is powered by the plurality of first battery packs 661, and on the other hand, the endurance capability of the entire electric riding lawn mower 600 is improved, thereby avoiding the trouble of repeated charging, and improving the efficiency of work; on the other hand, the power supply device 66 includes a plurality of first battery packs 661, and thus the weight of the power supply device 66 is heavier. For the entire electric riding lawn mower 600, the weight of the power supply device 66 makes up a large proportion of the weight of the entire electric riding lawn mower 600. Therefore, disposing the power supply device 66 in the rear end of the frame 61*a* and on the rear side of the seat 62 locates the power supply device 66 at the rear end of the electric riding lawn mower 600, thereby enabling the center of gravity G1 of the electric riding lawn mower 600 to move backward, further reducing the possibility of rolling over backwards when the electric riding lawn mower 600 climbs the slope, and improving the safety performance.

Further, the center of gravity G1 of the electric riding lawn mower 600 is disposed on the lower side of the seat 62. For the entire electric riding lawn mower 600, the seat 62 is substantially in the middle position in the front-rear direction, and the center of gravity G1 of the electric riding lawn mower 600 is disposed on the lower side of the seat 62; thus, the user sitting on the seat 62 only causes the center of gravity G2 of both the user and the electric riding lawn mower 600 to change only in the up-down direction with respect to the center of gravity G1 of the electric riding lawn mower 600 when the user is not sitting on the seat 62. The position of the center of gravity G2 does not change in the front-rear direction and the left-right direction, so that the risk of rollover caused by the user sitting on the seat 62 can be further reduced. The center of gravity G1 of the electric riding lawn mower 600 is disposed on the lower side of the seat 62. Therefore, regardless of whether a user with a relatively heavy weight or a user with a relatively light weight operates the electric riding lawn mower 600, the center of gravity G2 of the entirety constructed by the user and the electric riding lawn mower 600 will not change in the left-right direction and the front-rear direction, thereby improving the stability of the electric riding lawn mower 600.

As described above, when the center of gravity G1 of the electric riding lawn mower 600 is lowered in the up-down direction, and if the user sits on the seat 62, the center of gravity G2 of the entirety constructed by the user and the electric riding lawn mower 600 will also decline relatively. Thus, when the user rides the electric riding lawn mower 600 of the present disclosure to climb a slope, the second travelling wheel 642 has a contact point P with the slope surface, and the projection distance between the center of gravity G2 of the entirety constructed by the user and the electric riding lawn mower 600 and the contact point P in the horizontal direction is B. In the direction perpendicular to the first line 601 and perpendicular to the second axis 603, the distance between the center of gravity G2 of the entirety constructed by the user and the electric riding lawn mower 600 and the slope surface is h, that is, in the direction perpendicular to the slope surface, the distance between the center of gravity G2 of the entirety constructed by the user and the electric riding lawn mower 600 and the slope surface is h. Wherein, the following relationship is satisfied between the projection distance B and the distance h:

$$B = A^* \cos\alpha - h^* \sin\alpha \quad (1)$$

Wherein, A is the distance between center of gravity G2 of the entirety constructed by the user and the electric riding lawn mower 600 and the second axis 603 of the second travelling wheel 642; the angle a is the angle between the slope surface and the horizontal plane.

From the above relationship between the projection distance B and the distance h, the distance A between center of gravity G2 of the entirety constructed by the user and the electric riding lawn mower 600 and the second axis 603 of the second travelling wheel 642 is fixed; and when the angle a formed between the slope surface and the horizontal plane is also fixed, the smaller the distance h between the center of gravity G2 of the entirety constructed by the user and the electric riding lawn mower 600 and the slope surface in a direction perpendicular to the first straight line 601 and perpendicular to the second axis 603, the larger the projection distance B between the center of gravity G2 of the entirety constructed by the user and the electric riding lawn mower 600 and the contact point P in the horizontal direction, which makes the electric riding lawn mower 600 easier to climb and less likely to roll over.

The chassis 633 and the main frame 61 also need to be separated by a certain distance to allow the chassis 633 to waggle up and down. Specifically, the distance between the chassis 633 and the main frame 61 should be greater than or equal to 20 mm and less than or equal to 60 mm. In another example, it is also necessary to make the distance between the mowing element 631 and the ground satisfy the requirement of mowing. Specifically, the distance between the mowing element 631 and the ground should be greater than or equal to 20 mm and less than or equal to 120 mm. In another example, in the present example, the power of the first motor 632 is greater than or equal to 500 W and less than or equal to 1500 W, and therefore, the size of the space inside the chassis 633 also needs to meet the size of the first motor 633.

In the direction along the first straight line 601, the distance L2 between the center of gravity G1 of the electric riding lawn mower 600 and the second axis 603 is greater than or equal to 0 and less than or equal to 400 mm, such that the electric riding lawn mower 600 is not likely to roll over during climbing. In the direction along the first straight line 601, The ratio of the distance L3 between the center of gravity G1 of the electric riding lawn mower 600 and the first axis 602 to the distance L2 between the center of gravity G1 of the electric riding lawn mower 600 and the second axis 603 is greater than or equal to 2 and less than or equal to 4, so that the center of gravity G of the electric riding lawn mower 600 is set at a proper position in a direction along the first straight line 601. Therefore, not only can the climbing ability be taken into account, but also the problem of rollover when climbing uphill can be taken into account, and the problem of the overturning when going downhill with the electric riding lawn mower 600 can also be avoided.

The power supply device 66 includes a battery compartment housing 66a that includes a main body portion 66b and a cover 66c that is pivotally coupled to the main body portion 66b. The main body portion 66b may include a first battery compartment 662 for mounting the first battery pack 661, and the power supply device 66 may include two or more first battery compartments 662, and the number of the first battery compartments 662 may also be a specific plural.

Specifically, in this example, the power supply device 66 includes six first battery compartments 662, and the six first battery compartments 662 are disposed on the rear side of the seat 62 away from the first travelling wheel 641, that is, in the direction of the first straight line 601, the first battery compartment 662 and the first travelling wheel 641 are respectively disposed on both sides of the seat 62. In this way, the weight of the electric riding lawn mower 600 can be shifted back, thereby increasing the positive pressure of the second travelling wheel 642 at the rear end to the ground, thereby increasing grip of the second travelling wheel 642 of the electric riding lawn mower 600, and making climbing uphill easier.

Correspondingly, the power supply device 66 includes six first battery packs 661, and each of the first battery packs 661 can be respectively mounted to each of the first battery compartments 662. The first battery compartment 662 may be formed with a first groove 662a. The first battery pack 661 can be detachably inserted into the first groove 662a along the direction of the second straight line 604. The first battery pack 661 can also be pulled out of the first groove 662a along the direction of the second straight line 604. The cover 66c has an open state and a closed state, and when the cover 66c is in the open state, the first groove 662a is opened and the user can insert the first battery pack 661 into the first groove 662a; when the cover 66c is in the closed state, the first groove 662a is closed to provide a certain protection to the first battery pack 661 located in the battery compartment housing 66a. It can be understood that the first battery compartment 662 can also be provided with a guiding structure 662b for guiding the first battery pack 661 to be inserted into the first groove 662a in the direction of the second straight line 604, such that the first battery pack 661 can be positioned more accurately in the first groove 662a. The first battery compartment 662 may also be provided with a latch 662c for locking the first battery pack 661 in the first groove 662a. The latch 662c can lock the first battery pack 661, and allow the first battery pack 661 to be pulled out. In this way, the waggle of the first battery pack 661 can be avoided. The first battery compartment 662 may also be provided with a pop-up structure 662d for ejecting the first battery pack 661, thereby enabling the user to pull out the first battery pack effortlessly. The first battery compartment 662 is further provided with an input terminal 662e to electrically connect to the first battery pack 661, and the input terminal 662e is for introducing the electric energy output by the first battery pack 661 to the electric riding lawn mower 600.

The direction of the second straight line 604 in which the first battery pack 661 is inserted into the first groove 662a obliquely intersects with the direction of the first straight line 601. Further, between the direction of the second straight line 604 and the direction of the first straight line 601, an angle greater than 60 degrees and less than 90 degrees may be formed, enabling the user to easily insert and remove the first battery pack 661 without squatting. That is, the angle formed between the direction of the second straight line 604 in which the first battery pack 661 is inserted into the first groove 662a and the straight line extending in the up-down direction is greater than 0 degrees and less than or equal to 30 degrees, so that the user can easily insert and remove the first battery pack 661 without bending largely, thereby making the operation more effortless, and avoiding the user twisting or bending the arm when pulling out the first battery pack 661, thereby facilitating the human-machine experience. It can be understood that the six first battery compartments 662 can also be formed by a single larger battery compartment, that is, the power supply device 66 may include only one battery compartment, and the plurality of first battery packs 661 are all installed in this battery compartment.

Alternatively, the power supply device 66 may include only one first battery compartment 662; correspondingly, the power supply device 66 may include only one first battery pack 661. That is to say, the number of the first battery compartments 662 and the number of the first battery packs 661 are not specifically limited, and the correspondence relationship between the first battery compartment 662 and the first battery pack 661 is not limited to the one-to-one correspondence relationship. It can be understood that, in other examples, the direction of the second straight line 604 in which the first battery pack 661 is inserted into the first groove 662a may also be perpendicular to the direction of the first straight line 601, and the direction of the second straight line 604 in which the first battery pack 661 is inserted into the first groove 662a may also be parallel to the direction of the first straight line 601.

In the example, the power supply device 66 includes six first battery packs 661, and the six first battery packs 661 are disposed on the rear side of the seat 62. The six first battery packs 661 are arranged in a regular shape on the rear side of the seat 62. The first battery compartment 662 disposed on the rear side of the seat 62 is further disposed on the rear side of the second travelling wheel 642. The first battery pack 661 has a height direction extending in the direction in which it is inserted into the first groove 662a, and has a longitudinal direction and a width direction perpendicular to the height direction; the dimension of the first battery pack 661 in the longitudinal direction is greater than the dimension thereof in the width direction. In this example, when the first battery pack 661 is inserted into the first groove 662a, the longitudinal direction of the first battery pack 661 and the second axis 603 of the second travelling wheel 642 are parallel to each other, that is, the longitudinal direction of the first battery pack 661 extends in the left-right direction. Thus, when the user needs to install or remove the first battery pack 661, the user does not need to twist the wrist, which improves the comfort of operation.

More specifically, the six first battery packs 661 are arranged in three rows in the front-rear direction, and each row has two first battery packs 661 arranged in the left-right direction. The two first battery packs 661 disposed in the left-right direction are defined as one battery unit group, or form a modular power supply device, and the length of the first battery pack 661 in the left-right direction is greater than the width thereof in the front-rear direction. Thus, two first battery packs 661 are arranged on a straight line parallel to the left-right direction, and three first battery packs 661 are arranged on a straight line parallel to the front-rear direction, and the orientation of each first battery pack 661 is arranged such that its length in the left-right direction is also greater than its length in the front-rear direction. Thus, the dimension of the six first battery packs 661 is not excessively long in the front-rear direction so as not to increase the size of the entire electric riding lawn mower 600 in the front-rear direction; and also the dimension of the six first battery packs 661 is not too small in the left-right direction to effectively utilize the space occupied by the electric riding lawn mower 600 in the left-right direction. Thereby, the arrangement of the power supply device 66 is more reasonable, the space is saved, and the modularization is facilitated. It can be understood that when two first battery packs 661 in the power supply device 66 are used as one battery unit group, the power supply device 66 may also include two battery unit groups, and may further include three or more battery unit groups, thereby facilitating modularization of the power supply device 66 and implementation of a variety of configurations.

In the present example, the capacity of a first battery pack 661 is greater than or equal to 130 Wh and less than or equal to 1000 Wh. Further, the capacity of a first battery pack 661 is greater than or equal to 130 Wh and less than or equal to 500 Wh, so that the discharge time of the first battery pack 661 can also meet the most basic requirements even when only one first battery pack 661 is included in the power supply device 66; or, when the plurality of first battery packs 661 included in the power supply device 66 are out of power and the electric riding lawn mower 600 needs to perform mowing, one first battery pack 661 or two first battery packs 661 may be charged first, and after the charging is completed, the one first battery pack or the two first battery packs 661 are inserted to the first battery compartment 662 to supply power. Therefore, because the capacity of the first battery pack 661 is greater than or equal to 130 Wh, the discharge time of the first battery pack 661 can meet the urgent needs of the user to cut a part of the grass, in other words, does not delay the use. It can be understood that, in the present disclosure, when any of the first battery packs 661 is installed in the battery compartment housing 66a, the electric riding lawn mower 600 can be operated, that is, in the present disclosure, the electric riding lawn mower 600 is not limited to operate only if all of the first battery compartments 662 are installed with the first battery packs 661 capable of supplying power. Alternatively, when the plurality of first battery packs 661 are mounted to the battery compartment housing 66a, and some of the first battery packs 661 are depleted, the electric riding lawn mower 600 can still operate, thereby improving work efficiency. Further, in the present example, the weight of one first battery pack 661 is greater than or equal to 0.1 kg and less than or equal to 4 kg, which eases carrying difficulties due to the excessive weight of the first battery pack 661. Further, for considerations to allow the electric riding lawn mower 600 of the present disclosure to borrow battery packs in other electric power tools, it is also necessary to make the weight of the first battery pack 661 equal to or greater than 0.1 kg and equal to or less than 4 kg. More preferably, the weight of the first battery pack 661 is greater than or equal to 1 kg and less than or equal to 4 kg, so that the first battery pack 661 can satisfy the capacity and discharge time demands when the weight of the first battery pack 661 is not excessively heavy.

On the other hand, the ratio of the discharge power of a single first battery pack 661 to the nominal voltage of the first battery pack 661 is greater than or equal to 10 W/V and less than or equal to 25 W/V, and further, the ratio of the discharge power of a single first battery pack 661 to the nominal voltage of the first battery pack 661 is greater than or equal to 12 W/V and less than or equal to 20 W/V. Specifically, the discharge power of the first battery pack 661 is greater than or equal to 500 W and less than or equal to 6500 W. Further, the discharge power of the first battery pack 661 is greater than or equal to 500 W and less than or equal to 3000 W, which enables the first battery pack 661 to adapt to the high power needs of the electric riding lawn mower 600 of the present disclosure. In this example, the power supply device 66 includes a plurality of first battery packs 661, and the plurality of first battery packs 661 provide an overall discharge power of greater than or equal to 2000 W and less than or equal to 4000 W, which enables the electric riding lawn mower 600 to output high power, and last a long time, saving the trouble of repeated charging.

In a horizontal direction along the first straight line 601 or along a rotation axis perpendicular to the second axis 603, the distance L4 between the center C of the battery compartment housing 66a provided on the rear side of the seat 62 and the second axis 603 of the second walking wheel 642 is less than or equal to 500 mm. Alternatively, the horizontal distance between the center of gravity of the electric riding lawn mower 600 with the first battery pack 661 mounted and the center of the rotating shaft of the second travelling wheel 642 is less than or equal to 500 mm. Alternatively, the horizontal distance between the center of some of the first battery compartments 662 and the center of the rotating shaft of the second walking wheel 642 is less than or equal to 500 mm. Alternatively, the horizontal distance between the center of all of the first battery compartments 662 disposed on the rear side of the seat 62 and the rotating shaft of the second travelling wheel 642 is less than or equal to 500 mm. Further, In a horizontal direction along the first straight line 601 or along a rotation axis perpendicular to the second axis 603, the distance L4 between the center C of the battery compartment housing 66a provided on the rear side of the seat 62 and the second axis 603 of the second walking wheel 642 is less than or equal to 300 mm. Alternatively, the horizontal distance between the center of gravity of the electric riding lawn mower 600 with the first battery pack 661 mounted and the center of the rotating shaft of the second travelling wheel 642 is less than or equal to 300 mm. Alternatively, the horizontal distance between the center of some of the first battery compartments 662 and the rotating shaft of the second walking wheel 642 is less than or equal to 300 mm. Alternatively, the horizontal distance between the center of all of the first battery compartments 662 disposed on the rear side of the seat 62 and the rotating shaft of the second travelling wheel 642 is less than or equal to 300 mm. This increases the positive pressure of the second travelling wheel 642 against the ground and the grip of the second travelling wheel 642, and reduces the torque required for the electric riding lawn mower 600 in zero-turns to make zero-turns more flexible. The horizontal distance between one point and another point or line recited in the present disclosure refers to the projection distance between the two on the horizontal plane when the electric riding lawn mower 600 is placed on a horizontal ground. Similarly, the vertical distance between one point and another point or line recited in the present disclosure refers to the projection distance between the two on the vertical plane when the electric riding lawn mower 600 is placed on a horizontal ground.

That is to say, the distance L4 between the center C of entirety constructed by some or all of the first battery compartment 662 provided on the rear side of the seat 62 and the second axis 603 of the second travelling wheel 642 is less than or equal to 300 mm. When all of the first battery compartments 662 in the power supply device 66 are provided with the first battery packs 661, the distance between the center of gravity G3 of the power supply device 66 on the rear side of the seat 62 and the second axis 603 of the second travelling wheel 642 is less than or equal to 300 mm. Therefore, this increases positive pressure of the second travelling wheel 642 on the ground and the friction between the second travelling wheel 642 and the slope surface when the electric riding lawn mower 600 climbs uphill, thereby improving the climbing ability of the riding electric lawn mower 600, and avoiding slippage during walking on the ground or climbing up the hill; in addition, this reduces the torque required for the electric riding lawn mower 600 in zero-turns, allowing more flexible turns to be performed by the electric riding lawn mower 600.

In a direction perpendicular to the first straight line 601 and perpendicular to the second axis 603, the distance between the center C of the battery compartment housing 66a disposed on the rear side of the seat 62 and the second axis 603 of the second travelling wheel 642 is less than or equal to 300 mm, that is, in the up-down direction, the distance between the center C of the battery compartment housing 66a disposed on the rear side of the seat 62 and the second axis 603 of the second travelling wheel 642 is less than or equal to 300 mm. It can be understood that, in a direction perpendicular to the first straight line 601 and perpendicular to the second axis 603, the distance between the center C of entirety constructed by some or all of the first battery compartment 662 provided on the rear side of the seat 62 and the second axis 603 of the second travelling wheel 642 is less than or equal to 300 mm, that is, in the up-down direction, the distance between the center C of entirety constructed by some or all of the first battery compartment 662 provided on the rear side of the seat 62 and the second axis 603 of the second travelling wheel 642 is less than or equal to 300 mm. In other words, the vertical distance between the center of at least some of the first battery compartments 662 and the center of the rotating shaft of the second travelling wheel 642 is less than or equal to 300 mm. Or the distance between the center of gravity of the electric riding lawn mower 600 with the first battery pack 661 mounted and the center of the rotation axis of the second travelling wheel 642 is less than or equal to 300 mm. In other words, the vertical distance between the center C of all the first battery compartments 662 disposed on the rear side of the seat 62 and the rotating shaft of the second travelling wheel 642 is less than or equal to 300 mm. This helps lowering the center of gravity G1 of the entire electric riding lawn mower 600, thereby reduces the possibility of rollover to the back when the electric riding lawn mower 600 climbs uphill, the possibility of rollover to the front when the electric riding lawn mower 600 goes downhill, and the possibility of rollover to the side when the electric riding lawn mower 600 walks on uneven ground.

Further, the distance between the center of at least some of the first battery compartment 662 and the center of the rotation axis of the second walking wheel 642 in the left-right direction is less than 100 mm; in other words, the distance between the center of gravity of the electric riding lawn mower 600 installed with the first battery pack 661 and the center of the rotation axis of the second walking wheel 642 in the transverse direction of the riding type electric lawn mower 600 is less than 100 mm, so that the center of gravity of the whole machine is closer to the center axis 605 of the whole machine, so that the machine is less likely to tip over when travelling transversely or laterally on the slope.

In a direction parallel to the second axis 603, the distance between the center C of the battery compartment housing 66a disposed on the rear side of the seat 62 and the center of the two second travelling wheels 642 is less than or equal to 100 mm; that is, in the left-right direction, the distance between the center C formed by all the numbers of the first battery compartments 662 disposed on the rear side of the seat 62 and the center of the two second travelling wheels 642 is less than or equal to 100 mm. This enables the center of the power supply device 66 to be placed as close as possible to the center axis 605, particularly in the case where the shape of the power supply device 66 is relatively regular, which causes the center of gravity of the power supply device 66 to be placed as close as possible to the center axis 605, to avoid the problem of rollover in the left-right direction when the electric riding lawn mower 600 travels laterally on the slope surface, thereby improving the stability performance of the electric riding lawn mower 600.

As described above, the number of the second travelling wheels 642 is two, and the two second travelling wheels 642 are symmetrically disposed on both sides of a plane of symmetry, and in the present example, the entirety constructed by all of the first battery compartments 662 on the rear side of the seat 62 is symmetrically disposed about the plane of symmetry, thereby improving the balance performance of the whole machine.

Figure 38:
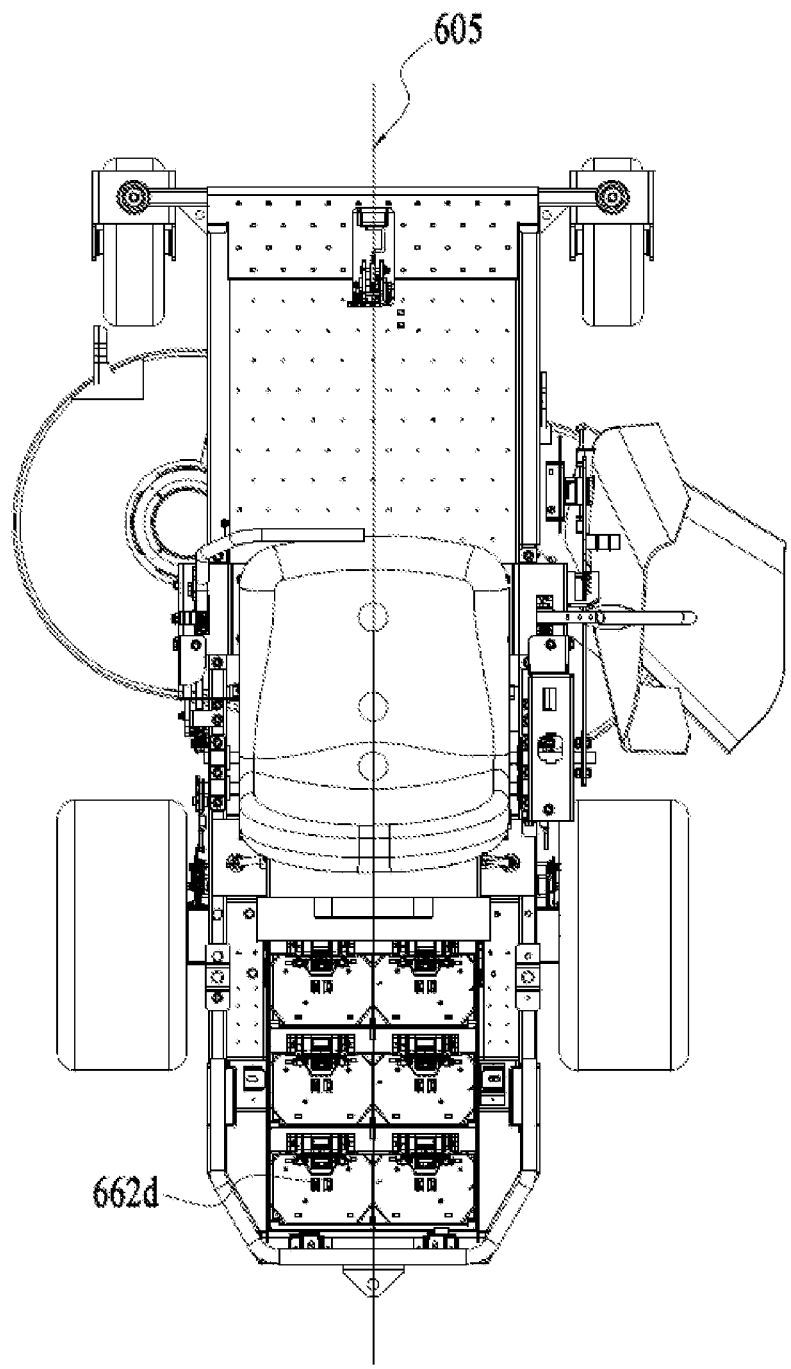
FIG. 38 is a top view of the structure shown in FIG. 37.
Figure 39:
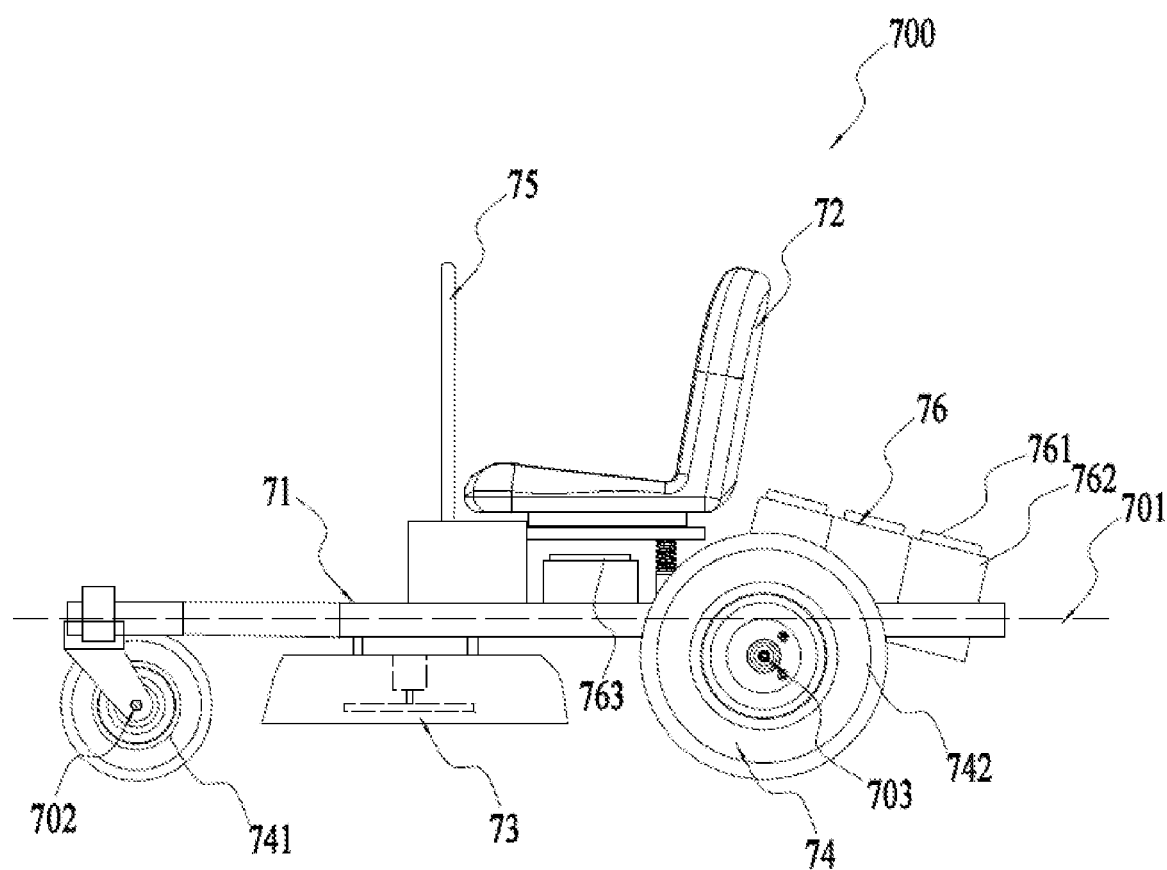
FIG. 39 is a plan view of an electric riding lawn mower of a second embodiment of the present disclosure.

Referring to FIG. 38 or FIG. 39, in the example of the present disclosure, all the battery packs disposed on the rear side of the seat 62 are such that the center of at least some battery packs is located on the right side of the center axis 605 of the electric riding lawn mower 600, and the center of the other battery packs is located on the left side of the center axis 605 of the electric riding lawn mower 600. Here, the center axis 605 of the electric riding lawn mower 600 is parallel to the front-rear direction or the forward direction of the machine. In some other examples of the present disclosure, assuming that the electric riding lawn mower 600 employs at least one large-sized battery pack, a portion of the at least one battery pack disposed on the rear side of the seat 62 is disposed on the right side of the center axis 605 of the electric riding lawn mower 600, and the other portion of the at least one battery pack is disposed on the left side of the center axis 605 of the electric riding lawn mower 600. The battery pack is arranged such that the center of gravity of the electric riding lawn mower 600 is located near the center axis 605 or closer to the center axis 605 of the whole machine, which is advantageous for balancing the center of gravity of the electric riding lawn mower 600.

As shown in FIG. 39, all the battery packs of the electric riding lawn mower 600 are provided, besides on the rear side of the seat 62 as shown in FIG. 38, on the front side of the seat 62. Disposing some battery packs on the front side of the rotating shaft of the second travelling wheel 642, and the other battery packs on the rear side of the rotating shaft of the second travelling wheel 642 increases the positive pressure of the second travelling wheel 642 against the ground and the grip of second travelling wheel 642, and reduces the torque required for the electric riding lawn mower 600 in zero-turns to make zero-turns more flexible. In this example, the battery packs on the front side of the seat 62 may be fixedly mounted to the electric riding lawn mower 600; and the battery packs on the rear side of the seat may be detachably mounted to the electric riding lawn mower 600. In some other examples of the present disclosure, if the battery pack provided in the electric riding lawn mower 600 is a large-sized battery pack, a portion of the large-sized battery pack is located on the front side of the rotating shaft of the second travelling wheel 642, and the other portion of the large-sized battery pack is located on the front side of the rotating shaft of the second travelling wheel 642, so as to increase the positive pressure of the second travelling wheel 642 against the ground and the grip of second travelling wheel 642, and reduce the torque required for the whole machine in zero-turns to make zero-turns more flexible.

In order to prevent the first battery pack 661 from being detached from the first battery compartment 662, a vibration damping device is further disposed between the power supply device 66 and the main frame 61, so that the first battery pack 661 can be prevented from being detached from the first battery compartment 662, thereby improving the effective electrical connection between the first battery pack 661 and the first battery compartment 662.

When the first battery pack 661 is inserted into the first groove 662a, the dimension of the cross section of the first battery pack 661 in a plane perpendicular to the direction of the second straight line 604 along the direction in the first straight line 601 is smaller than the dimension of the cross section along the direction perpendicular to the first straight line 601 and parallel to the plane, that is, when the first battery pack 661 is inserted into the first groove 662a, the first battery pack 661 has a thinner dimension in the direction perpendicular the first straight line 601 than in the direction of the first straight line 601, thereby facilitating the user to grasp the first battery pack 661 to insert the first battery pack 661 into the first groove 662a or pull it out from the first groove in 662a.

The first battery pack 661 may specifically include a first battery pack housing 661b and a plurality of battery cells 661a disposed in the first battery pack housing 661b. The direction in which the battery cells 661a extends in the first battery pack 661 is parallel to the direction of the second line 604 in which the first battery pack 661 is inserted into the first groove 662a.

As shown in FIG. 27, the electric riding lawn mower 600 may further be provided with a grass collecting device 67 for collecting grass, and the grass collecting device 67 may be detachably connected to the main body portion of the electric riding lawn mower 600. The grass collecting device 67 specifically includes a grass collecting basket 671 and a connecting pipe 672; the grass collecting basket 671 is for accommodating the cut grass clippings, and the connecting pipe 672 is connected to the bottom plate and the grass collecting basket 671 to deliver the grass clippings to the grass collecting basket 671. In the present example, the power supply device 66 is disposed on the rear side of the seat, and the power supply device 66 further includes a battery compartment housing 66a. The plurality of first battery packs 661 of the power supply device 66 are arranged substantially in a plane perpendicular to the up-down direction. This allows the shape of the battery compartment housing 66a to be substantially disposed in the plane such that the upper side of the cover 66c of the battery compartment housing 66a and the rear side of the seat 62 have a large free space, which allows the grass collecting basket 671 to be placed on the upper side of the battery compartment housing 66a, thereby saving space, and making the structure of the whole machine more reasonable and more compact. Furthermore, due to its light weight, placing the grass collecting basket 671 on the rear end of the electric riding lawn mower 600 does not have a great impact on the center of gravity of the whole machine. Therefore, it can be understood that the center of gravity of the electric riding lawn mower 600 or the center of gravity of the entirety of the electric riding lawn mower 600 and the user can be understood as either including the grass collecting device 67 or not including the grass collecting device 67.

The electric riding lawn mower 700 of the second example shown in FIG. 39 may have the same main frame 71, seat 72, power output assembly 73, walking assembly 74 and operating assembly 75 as the electric riding lawn mower in the first example. This example only differs from the first example in that the power supply device 76 includes a second battery pack 763 besides the first battery compartment 762 and the first battery pack 761 as in the first example. The parts of the first example that are compatible with this example can be applied to this example, and details are not described herein.

In the present example, the second battery pack 763 can be disposed on the lower side of the seat 72, so that the center of gravity G of the whole machine in the direction along the first straight line 701 can be as close as possible to the seat 72 and the first travelling wheel 741 in order to effectively avoid the problem of tilting up when the electric riding lawn mower 700 climbs uphill; and this also increases the positive pressure of the first travelling wheel 741 against the ground and the grip of the first travelling wheel 741 to prevent the electric riding lawn mower 700 from slippage when walking on the ground; further, especially when the rear end of the electric riding lawn mower 700 is provided with the grass collecting device, the structure of the second battery pack 763 being disposed on the lower side of the seat 72 can effectively reduce the center of gravity G of the electric riding lawn mower 700, thereby improving the stability of the whole machine. Further, the second battery pack 763 is also disposed on the front side of the second travelling wheel 742.

In addition, in the example, the second battery pack 763 may be fixedly mounted to the main frame 71, that is, the second battery pack 763 is not quickly removable by the user without using auxiliary tools, so that the second battery pack 763 can be fixed on the main frame 71 to continuously supply power to the electric riding lawn mower 700, thereby avoiding the situation when both the first battery pack 761 and the second battery pack 763 in the power supply device 76 are removed by the user such that the walking assembly 64 does not have power supply and that the electric riding lawn mower 700 cannot walk. It can be understood that the second battery pack 763 can also be configured to be detachable or pluggable by the user.

The position of the second battery pack 763 is not limited to being disposed on the lower side of the seat 72, in fact, as long as it is distinguished from the position of the first battery pack 761 because of considerations in balance performance or structural adaptation of the whole machine, it is within the scope of this disclosure.

In the present example, only one second battery pack 763 is provided on the lower side of the seat 72. It can be understood that the second battery pack 763 on the lower side of the seat 72 may also be two or more. In the direction perpendicular to the first line 701 and the first axis 702, the distance between the center of gravity of the entirety formed by all the battery packs in the power supply device 66 and the second axis is less than 300 mm, that is, the distance between the center of gravity of the entirety formed by all the first battery packs 761 plus all the second battery packs 763 and the second axis is less than 300 mm, such that the center of gravity of the entire electric riding lawn mower 700 can be lowered, thereby avoiding the problem of rollover on the slope.

In addition, in other examples, it is also possible to configure one or more of the first battery packs 761 disposed on the rear side of the seat 72 to be fixedly mounted to the main frame 71, which also prevents the electric riding lawn mower 700 from the problem of being unable to walk due to the lack of power source.

Figure 40:
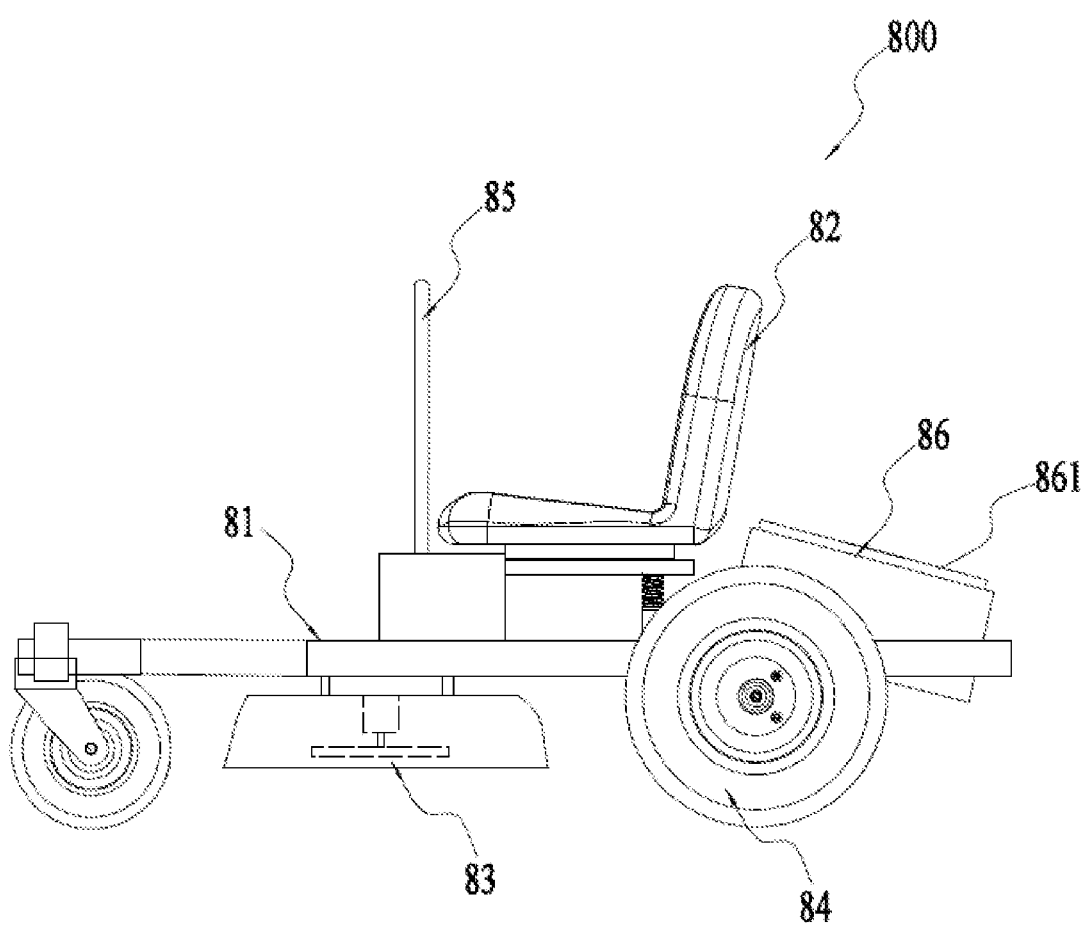
FIG. 40 is a plan view of an electric riding lawn mower of a third embodiment of the present disclosure.
Figure 41:
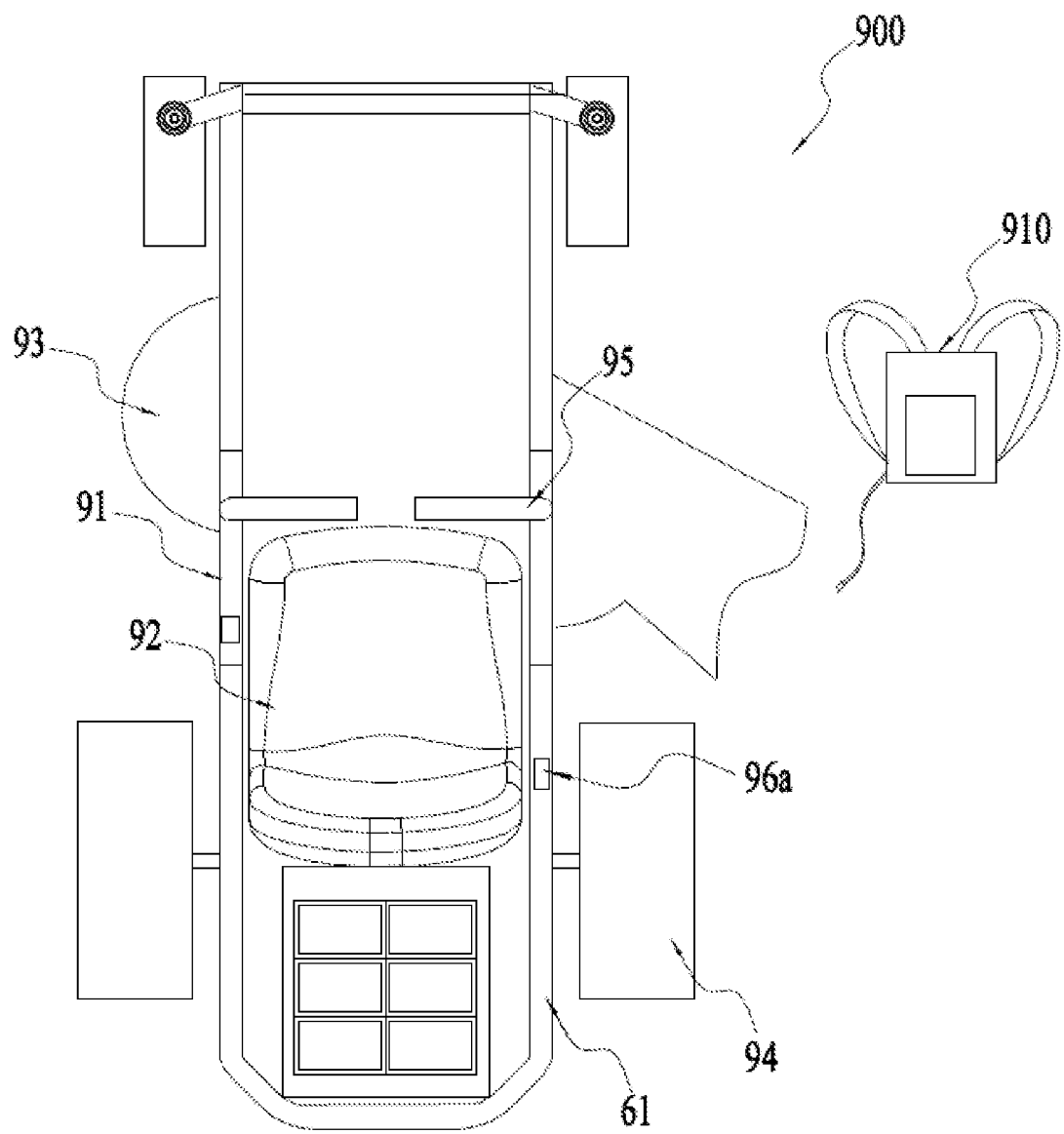
FIG. 41 is a top view of an electric riding lawn mower of a fourth embodiment of the present disclosure.

In the third example shown in FIG. 40, the electric riding lawn mower 800 may have the same main frame 81, seat 82, power output assembly 83, walking assembly 84 and operating assembly 85 as the electric riding lawn mower 600 of the first example. This example only differs from the first example in that the power supply device 86 includes only a first battery pack 861 having a larger capacity, and the first battery pack 861 can be detachably coupled to electric riding lawn mower 800 with a pluggable approach performed by the user. In the fourth example shown in FIG. 41, the electric riding lawn mower 900 may have the same main frame 91, seat 92, power output assembly 93, walking assembly 94 and operating assembly 95 as the electric riding lawn mower 600 of the first example. This example only differs from the first example in that the power supply device includes a power supply interface 96a for connecting a backpack power supply device 910 such that when the user sits in the seat 92, the user can carry the backpack power supply device 910 on the back to facilitate the operation of the electric riding lawn mower 900.

What is claimed is:

1. A riding mower, comprising:
a main body;
a seat mounted to the main body;
a moving wheel set comprising front moving wheels and rear moving wheels that support the main body;
a moving electric motor for driving the moving wheel set;
a mowing assembly comprising a mowing element for mowing grass;
a drive electric motor for driving the mowing assembly to mow the grass;
a first energy storage device comprising multiple battery packs and configured to be capable of supplying power to at least one of the moving electric motor and drive electric motor, wherein the multiple battery packs are configured to be detachably mounted to the main body and further configured to be detachable from the main body to supply power to another garden tool; and
a second energy storage device configured to be capable of supplying power to at least one of the moving electric motor and drive electric motor;
wherein total energy of the second energy storage device is greater than total energy of the first energy storage device.

2. The riding mower of claim 1, wherein a nominal voltage of the second energy storage device is different from a nominal voltage of the first energy storage device.

3. The riding mower of claim 1, wherein a nominal voltage of the second energy storage device is the same as a nominal voltage of the first energy storage device.

4. The riding mower of claim 1, wherein each of the multiple battery packs comprises lithium cell units.

5. The riding mower of claim 1, wherein the second energy storage device is disposed on a rear side of the seat.

6. The riding mower of claim 1, wherein a distance between the second energy storage device and an axle of the rear moving wheels in a front and rear direction is greater than or equal to 0 cm and less than or equal to 100 cm.

7. An outdoor moving vehicle, comprising:
a main body;
a seat mounted to the main body;
a moving wheel set comprising front moving wheels and rear moving wheels that support the main body;
a moving electric motor for driving the moving wheel set;
a first energy storage device comprising multiple battery packs, wherein the multiple battery packs are configured to be detachably mounted to the main body and further configured to be detachable from the main body to supply power to another power tool;
a second energy storage device configured to be capable of supplying power to the moving electric motor
wherein a ratio of the total energy of the second energy storage device to the total energy of the first energy storage device is greater than or equal to 2 and less than or equal to 20.

8. The outdoor moving vehicle of claim 7, wherein the multiple battery packs are configured to be capable of supplying power to the moving electric motor.

9. The outdoor moving vehicle of claim 7, wherein the second energy storage device is disposed on a front side of the seat.

10. The outdoor moving vehicle of claim 9, wherein the multiple battery packs are disposed on a front side of the seat.

11. The outdoor moving vehicle of claim 7, wherein the second energy storage device is disposed on a lower side of the seat.

12. The outdoor moving vehicle of claim 7, wherein a nominal voltage of the second energy storage device is the same as a nominal voltage of the first energy storage device.

13. The outdoor moving vehicle of claim 7, wherein the total capacity of the second energy storage device is greater than or equal to 10 Ah and less than or equal to 500 Ah.

14. An outdoor moving device, comprising:
a main body;
a moving wheel set comprising front moving wheels and rear moving wheels that support the main body;
a moving electric motor for driving the moving wheel set;
a functional assembly for implementing a tool function;
a first energy storage device comprising multiple battery packs, wherein the multiple battery packs are configured to be detachably mounted to the main body and further configured to be detachable from the main body to supply power to another garden tool; and
a second energy storage device configured to be capable of supplying power to the moving electric motor;

wherein the shape of the first energy storage device is different from the shape of the second energy storage device.

15. The outdoor moving device of claim 14, wherein the multiple battery packs are configured to be capable of supplying power to the moving electric motor.

16. The outdoor moving device of claim 14, wherein a nominal voltage of the second energy storage device is different from a nominal voltage of the first energy storage device.

17. The outdoor moving device of claim 14, wherein a nominal voltage of the second energy storage device is the same as a nominal voltage of the first energy storage device.

18. The outdoor moving device of claim 14, further comprising a seat mounted to the main body, wherein at least one of the multiple battery packs are disposed at a rear side of the seat.

19. A riding mower, comprising:
a main body;
a moving wheel set comprising front moving wheels and rear moving wheels that support the main body;
a moving electric motor for driving the moving wheel set;
a mowing assembly comprising a mowing element for mowing grass;
a first energy storage device comprising multiple battery packs, wherein the multiple battery packs are configured to be detachably mounted to the main body and further configured to be detachable from the main body to supply power to another garden tool;
a second energy storage device configured to be capable of supplying power to the moving electric motor;
a first identification terminal configured to match with the second energy storage device; and
a second identification terminal configured to match with the first energy storage device;
wherein the first identification terminal and the second identification terminal are different.

20. The riding mower of claim 19, wherein the first energy storage device is disposed at a first position and the second energy storage device is disposed at a second position different from the first position.

* * * * *